United States Patent
Maeda et al.

(10) Patent No.: US 10,187,406 B2
(45) Date of Patent: Jan. 22, 2019

(54) METHOD FOR SENSING FRAUDULENT FRAMES TRANSMITTED TO IN-VEHICLE NETWORK

(71) Applicant: Panasonic Intellectual Property Corporation of America, Torrance, CA (US)

(72) Inventors: Manabu Maeda, Osaka (JP); Hideki Matsushima, Osaka (JP); Tomoyuki Haga, Nara (JP); Yuji Unagami, Osaka (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 137 days.

(21) Appl. No.: 15/183,398

(22) Filed: Jun. 15, 2016

(65) Prior Publication Data
US 2016/0294855 A1    Oct. 6, 2016

Related U.S. Application Data

(63) Continuation of application No. PCT/JP2015/001602, filed on Mar. 23, 2015.
(Continued)

(30) Foreign Application Priority Data

Feb. 20, 2015 (JP) ................................. 2015-032179

(51) Int. Cl.
*H04L 29/06* (2006.01)
*H04L 12/28* (2006.01)
(Continued)

(52) U.S. Cl.
CPC ...... *H04L 63/1416* (2013.01); *B60R 16/0231* (2013.01); *H04L 12/28* (2013.01);
(Continued)

(58) Field of Classification Search
CPC .. H04L 63/1416; H04L 63/1425; H04L 12/28
See application file for complete search history.

(56) References Cited

U.S. PATENT DOCUMENTS

2013/0073121 A1*  3/2013  Kim ..................... B60R 25/209
                                                              701/2
2013/0303120 A1   11/2013  Kusumoto
(Continued)

FOREIGN PATENT DOCUMENTS

JP        10-107805       4/1998
JP        2003-271205 A   9/2003
(Continued)

OTHER PUBLICATIONS

The Extended European Search Report dated Mar. 2, 2017 for the related European Patent Application No. 15779570.9.
(Continued)

*Primary Examiner* — Jeffrey C Pwu
*Assistant Examiner* — Thong P Truong
(74) *Attorney, Agent, or Firm* — Greenblum & Bernstein, P.L.C.

(57) ABSTRACT

A fraud sensing method for use in an in-vehicle network system including a plurality of electronic control units that communicate with each other via a bus includes detecting that a state of a vehicle satisfies a predetermined condition, and switching, upon detecting that the state of the vehicle satisfies the predetermined condition, an operation mode of a fraud-sensing electronic control unit connected to the bus between a first mode in which a first type of sensing process for sensing a fraudulent message in the bus is performed and
(Continued)

a second mode in which the first type of sensing process is not performed.

21 Claims, 29 Drawing Sheets

Related U.S. Application Data

(60) Provisional application No. 61/980,821, filed on Apr. 17, 2014.

(51) Int. Cl.
*B60R 16/023* (2006.01)
*H04L 29/08* (2006.01)
*H04L 12/40* (2006.01)

(52) U.S. Cl.
CPC .......... *H04L 63/1425* (2013.01); *H04L 67/12* (2013.01); *H04L 2012/40273* (2013.01)

(56) References Cited

U.S. PATENT DOCUMENTS

| | | |
|---|---|---|
| 2013/0326255 A1 | 12/2013 | Kodama et al. |
| 2014/0328352 A1 | 11/2014 | Mabuchi et al. |
| 2015/0066239 A1 | 3/2015 | Mabuchi |
| 2016/0173530 A1* | 6/2016 | Miyake .................. H04L 63/08 726/3 |

FOREIGN PATENT DOCUMENTS

| | | |
|---|---|---|
| JP | 2004-253908 A | 9/2004 |
| JP | 2005-038099 | 2/2005 |
| JP | 2007-038904 | 2/2007 |
| JP | 2013-131907 A | 7/2013 |
| WO | 2012/124207 A1 | 9/2012 |
| WO | 2013/094072 A1 | 6/2013 |

OTHER PUBLICATIONS

Muter M et al: "A structured approach to anomaly detection for in-vehicle networks", Information Assurance and Security (IAS), 2010 Sixth International Conference on, IEEE, Piscataway, NJ, USA, Aug. 23, 2010 (Aug. 23, 2010), pp. 92-98, XP031777189.
International Search Report of PCT application No. PCT/JP2015/001602 dated May 26, 2015.
CAN Specification Version 2.0, 1991, [online] CAN in Automation(CiA), [searched on Nov. 14, 2014], Internet<URL:http://www.can-cia.org/fileadmin/cia/specifications/CAN20A.pdf>.
H. Krawczyk et al., "HMAC: Keyed-Hashing for Message Authentication" Network Working Group, RFC2104, Feb. 1997.

* cited by examiner

FIG. 3
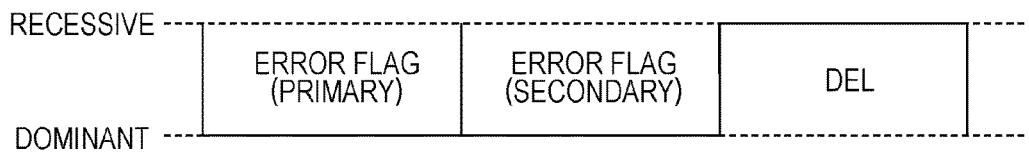
FIG. 4
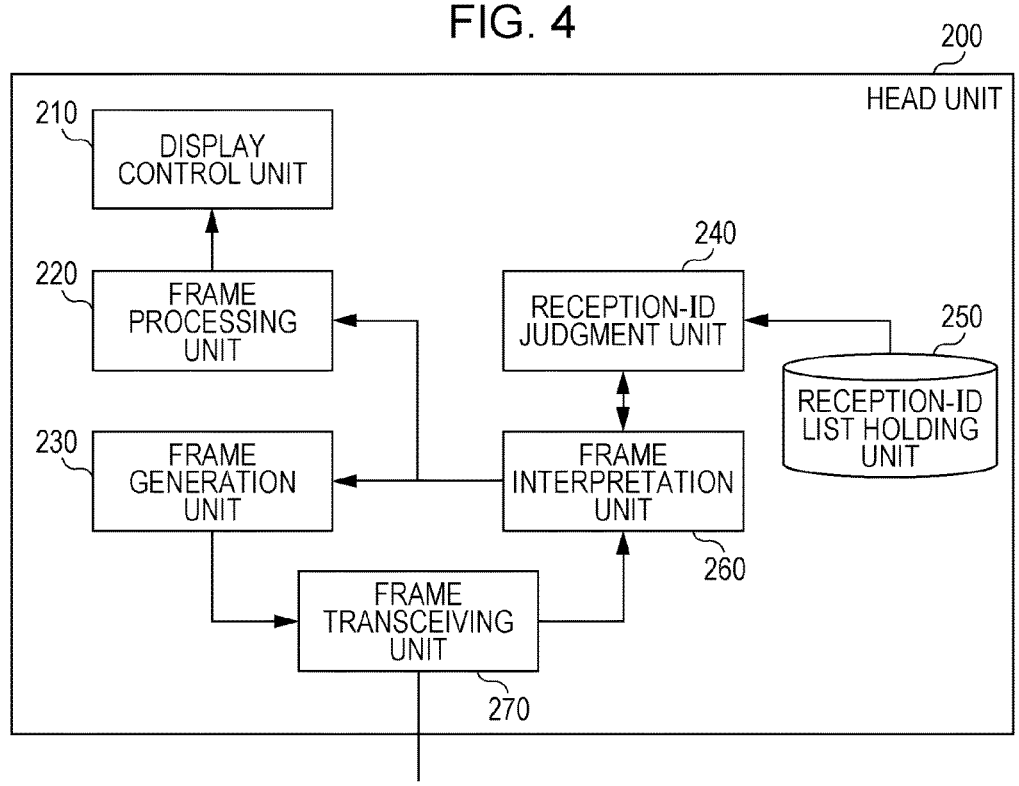
FIG. 5
| RECEPTION-ID LIST |
|---|
| 1 |
| 2 |
| 3 |
| 4 |

| TRANSFER SOURCE | TRANSFER DESTINATION | ID |
|---|---|---|
| 500a | 500b | * |
| 500a | 500c | * |
| 500b | 500a | 3 |
| 500b | 500c | * |
| 500c | 500a | – |
| 500c | 500b | – |

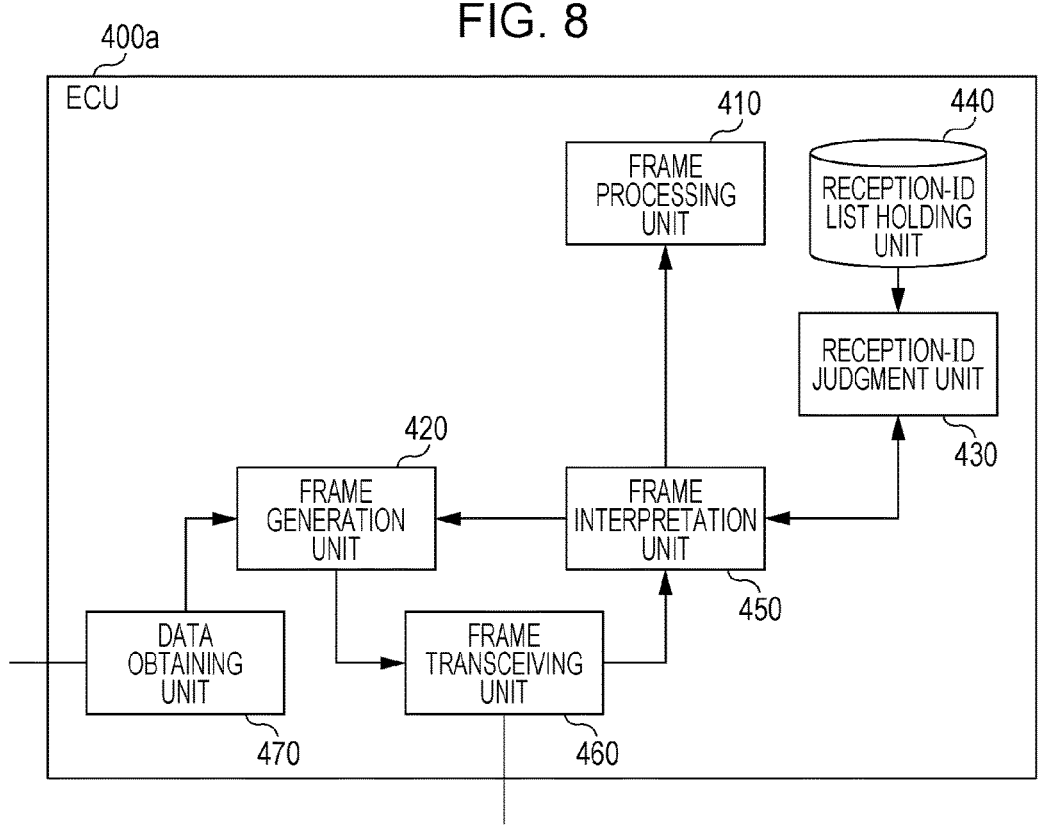

FIG. 11

| ID | DATA |
|---|---|
| 2 | 100 |
| 2 | 90 |
| 2 | 80 |
| 2 | 70 |
| 2 | 60 |
| ... | ... |

FIG. 12

| ID | DATA |
|---|---|
| 3 | 1 |
| 3 | 1 |
| 3 | 0 |
| 3 | 0 |
| 3 | 0 |
| ... | ... |

FIG. 13

| ID | DATA |
|---|---|
| 4 | 0 |
| 4 | 10 |
| 4 | 20 |
| 4 | 30 |
| 4 | 40 |
| ... | ... |

| AUTHORIZED-ID LIST |
|---|
| 1 |
| 2 |
| 3 |

| AUTHORIZED-ID LIST |
|---|
| 1 |
| 2 |
| 3 |
| 4 |

FIG. 17

| ID | FRAUD-SENSING COUNTER |
|---|---|
| 1 | 0 |
| 2 | 0 |
| 3 | 0 |
| 4 | 1 |
| 5 | 0 |
| ... | ... |

| ID | DATA RANGE |
|---|---|
| 1 | 0 TO 180 |
| 2 | 0 TO 100 |
| 3 | 0, 1 |
| 4 | 0 TO 100 |
| ... | ... |

FIG. 26

| ID | DATA |
|---|---|
| 1 | 0 1 0x1a c4 f7 d3 |
| 1 | 1 2 0xf9 3b 65 9e |
| 1 | 2 3 0x34 5c ef 79 |
| 1 | 3 4 0x90 2a e3 dd |
| 1 | 4 5 0x31 2c d5 ee |
| ... | ... |

FIG. 27

| ID | DATA |
|---|---|
| 2 | 100 1 0x34 5d ef 78 |
| 2 | 90 2 0x34 2d d5 ea |
| 2 | 80 3 0x90 8a e8 6b |
| 2 | 70 4 0x4a d4 f7 d8 |
| 2 | 60 5 0xf1 32 7e 6a |
| ... | ... |

FIG. 28

| ID | DATA |
|---|---|
| 3 | 1 1 0x92 d5 e8 3b |
| 3 | 1 2 0x81 a2 c5 ca |
| 3 | 0 3 0xf8 4d 66 9a |
| 3 | 0 4 0x95 a2 3e ac |
| 3 | 0 5 0x1b c5 f6 d1 |
| ... | ... |

| ID | DATA |
|---|---|
| 4 | 0 1 0x9d 20 03 d3 |
| 4 | 10 2 0x3a 2d 5b ef |
| 4 | 20 3 0x4c c8 3b b5 |
| 4 | 30 4 0x5f f1 d2 da |
| 4 | 40 5 0xb1 0b 70 a4 |
| ... | ... |

FIG. 31

| ID | COUNTER |
|---|---|
| 1 | 1 |
| 2 | 10 |
| 3 | 15 |
| 4 | 100 |
| 5 | 0 |
| ... | ... |

METHOD FOR SENSING FRAUDULENT FRAMES TRANSMITTED TO IN-VEHICLE NETWORK

BACKGROUND

1. Technical Field

The present disclosure relates to a technique for sensing fraudulent frames transmitted within an in-vehicle network over which electronic control units perform communication.

2. Description of the Related Art

Systems in recent automobiles accommodate multiple devices called electronic control units (ECUs). A network connecting these ECUs is called an in-vehicle network. There exist multiple in-vehicle network standards. Among all these standards, a standard called CAN (Controller Area Network) specified in ISO 11898-1 is one of the most mainstream in-vehicle network standards (see "CAN Specification 2.0 Part A", [online], CAN in Automation (CiA), [searched Nov. 14, 2014], the Internet (URL:http://www.can-cia.org/fileadmin/cia/specifications/CAN20A.pdf)).

In CAN, each communication path is constituted by two buses, and ECUs connected to the buses are referred to as nodes. Each node connected to a bus transmits and receives a message called a frame. A transmitting node that is to transmit a frame applies a voltage to two buses to generate a potential difference between the buses, thereby transmitting the value "1" called recessive and the value "0" called dominant. When a plurality of transmitting nodes transmit recessive and dominant values at completely the same timing, the dominant value is prioritized and transmitted. A receiving node transmits a frame called an error frame if the format of a received frame is anomalous. In an error frame, 6 consecutive dominant bits are transmitted to notify the transmitting nodes or any other receiving node of frame anomaly.

In CAN, furthermore, there is no identifier that designates a transmission destination or a transmission source. A transmitting node transmits frames each assigned an ID called a message ID (that is, sends signals to a bus), and each receiving node receives only a predetermined message ID (that is, reads a signal from the bus). In addition, the CSMA/CA (Carrier Sense Multiple Access/Collision Avoidance) scheme is adopted, and arbitration based on message IDs is performed for simultaneous transmission of a plurality of nodes so that a frame with the value of message ID being small is preferentially transmitted.

There is also known a technique in which, in a case where a message that is anomalous is transmitted to a CAN bus, a gateway device detects the anomalous message and prevents the anomalous message from being transferred to any other bus to suppress an increase in the load on buses (see Japanese Unexamined Patent Application Publication No. 2007-38904).

Incidentally, a connection of a fraudulent node to a bus in an in-vehicle network and a fraudulent transmission of a frame (message) from the fraudulent node can possibly cause fraudulent control of the vehicle body. To suppress such a possibility, there is a need for sensing of a fraudulent message.

SUMMARY

One non-limiting and exemplary embodiment provides a fraud-sensing electronic control unit (fraud-sensing ECU) for efficient sensing of a fraudulent message to be transmitted to a bus, in order to, for example, reduce consumption of an in-vehicle battery, in an in-vehicle network system in which communication is established in accordance with the CAN protocol or the like. The present disclosure further provides a fraud sensing method for efficient sensing of a fraudulent message, and an in-vehicle network system including a fraud-sensing ECU.

In one general aspect, the techniques disclosed here feature a fraud sensing method according to an aspect of the present disclosure is a fraud sensing method for use in an in-vehicle network system including a plurality of first electronic control units that communicate with each other via one or more buses. The fraud sensing method includes detecting that a state of a vehicle including the in-vehicle network system satisfies a first condition or a second condition, and switching an operation mode of a second electronic control unit connected to the one or more buses (i) from a first mode in which a first type of sensing process for sensing a fraudulent message in the one or more buses is performed to a second mode in which the first type of sensing process is not performed, upon detecting, in the detecting, that the state of the vehicle satisfies the first condition, and (ii) from the second mode to the first mode, upon detecting, in the detecting, that the state of the vehicle satisfies the second condition.

It should be noted that general or specific embodiments may be implemented as a system, an apparatus, an integrated circuit, a computer program, a computer-readable recording medium such as a compact disc read-only memory (CD-ROM), or any selective combination of the system, the apparatus, the integrated circuit, the computer program, and the recording medium.

According to an embodiment of the present disclosure, for example, a transmission of a fraudulent message from a fraudulent node connected to a bus in an in-vehicle network system driven by the power of an in-vehicle battery or the like would be sensible, and the sensing operation is omitted under a certain condition in accordance with the state of the vehicle, which may reduce consumption of the battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating the format of an error frame specified in the CAN protocol;

FIG. 4 is a configuration diagram of a head unit;

FIG. 5 is a diagram illustrating an example of a reception-ID list;

FIG. 8 is a configuration diagram of an ECU according to the first embodiment;

FIG. 9 is a diagram illustrating an example of a reception-ID list;

FIG. 10 is a diagram illustrating an example of an ID and a data field in a frame transmitted from an ECU connected to an engine;

FIG. 11 is a diagram illustrating an example of an ID and a data field in a frame transmitted from an ECU connected to brakes;

FIG. 12 is a diagram illustrating an example of an ID and a data field in a frame transmitted from an ECU connected to a door open/close sensor;

FIG. 13 is a diagram illustrating an example of an ID and a data field in a frame transmitted from an ECU connected to a window open/close sensor;

FIG. 17 is a diagram illustrating an example of the states of fraud-sensing counters for individual message IDs;

FIG. 26 is a diagram illustrating an example of an ID and a data field in a data frame transmitted from an ECU connected to an engine;

FIG. 27 is a diagram illustrating an example of an ID and a data field in a data frame transmitted from an ECU connected to brakes;

FIG. 28 is a diagram illustrating an example of an ID and a data field in a data frame transmitted from an ECU connected to a door open/close sensor;

FIG. 31 is a diagram illustrating an example of counter values for individual message IDs held in a counter holding unit according to the third embodiment;

DETAILED DESCRIPTION

Figure 1:
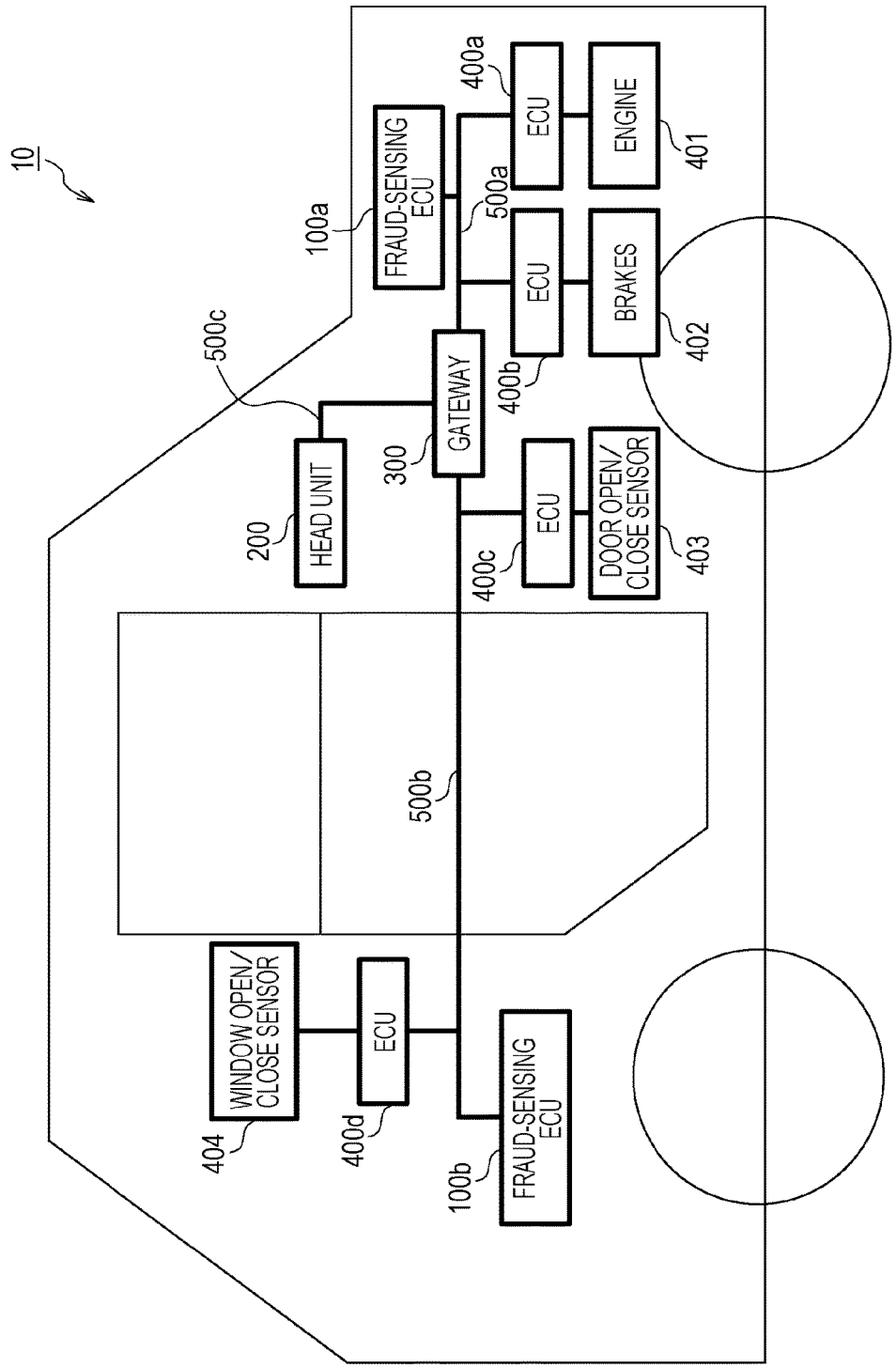
FIG. 1 is a diagram illustrating an overall configuration of an in-vehicle network system according to a first embodiment.

A fraud sensing method according to an aspect of the present disclosure is a fraud sensing method for use in an in-vehicle network system including a plurality of electronic control units that communicate with each other via one or more buses. The fraud sensing method includes detecting that a state of a vehicle provided with the in-vehicle network system satisfies a certain condition, and switching, upon detecting, in the detecting, that the state of the vehicle satisfies the certain condition, an operation mode of a fraud-sensing electronic control unit connected to the bus(es) between a first mode in which a predetermined type of sensing process for sensing a fraudulent message in the bus(es) is performed and a second mode in which the predetermined type of sensing process is not performed. The fraud-sensing electronic control unit (fraud-sensing ECU) is connected to a bus, and has a function of executing a predetermined type of sensing process for sensing a fraudulent message transmitted on the bus. Whether or not a message is fraudulent is judged in a sensing process on the basis of whether or not a predetermined condition is met. For example, in a case where the fraud-sensing ECU is capable of performing only one type of sensing process, whether or not to perform the sensing process is switched depending on the operation mode. This fraud sensing method allows the fraud-sensing ECU to omit a predetermined type of sensing process of a fraudulent message under a certain condition in accordance with the state of the vehicle, and may thus reduce consumption of the battery of the vehicle.

The plurality of electronic control units may perform communication via the bus(es) in accordance with a Controller Area Network (CAN) protocol. This may limit a period during which the fraud-sensing ECU senses a fraud when a fraudulent frame is transmitted from a fraudulent ECU connected to an in-vehicle network system in which communication is established in accordance with the CAN protocol, in accordance with the state of the vehicle, and may thus reduce the amount of power consumption.

In the detecting, one electronic control unit among the plurality of electronic control units may perform the detection described above. In the switching, the one electronic control unit that has performed the detection described above in the detecting may transmit a switching instruction message, and the fraud-sensing electronic control unit may switch the operation mode upon receipt of the switching instruction message. It is sufficient that, for example, the fraud-sensing ECU detect a switching instruction message (that is, a trigger frame that triggers switching of the operation mode) in the second mode in which a sensing process for sensing a fraudulent message is not performed. That is, the fraud-sensing ECU may not necessarily include a detection unit (such as a sensor) for directly detecting the state of the vehicle.

Furthermore, in the detecting, when the one electronic control unit senses a fraudulent message in the bus, it may be determined that the state of the vehicle satisfies the certain condition and the detection described above may be performed. In the switching, when the detection described above is performed in the detecting, the one electronic control unit may transmit a switching instruction message indicating switching to the first mode, and the fraud-sensing electronic control unit may switch the operation mode to the first mode upon receipt of the switching instruction message. Accordingly, upon detecting that a fraudulent message has been transmitted on a certain bus, the fraud-sensing ECU is brought into the first mode (a check mode for sensing a fraudulent message) so that a fraudulent message in a bus to which the fraud-sensing ECU is connected is sensed.

Furthermore, in the detecting, when the one electronic control unit senses no fraudulent message in the bus within a certain period, it may be determined that the state of the vehicle satisfies the certain condition and the detection described above may be performed. In the switching, when the detection described above is performed in the detecting, the one electronic control unit may transmit a switching instruction message indicating switching to the second mode, and the fraud-sensing electronic control unit may switch the operation mode to the second mode upon receipt of the switching instruction message. Accordingly, upon detecting that no fraudulent message has been transmitted on a certain bus within a certain period, the fraud-sensing ECU is brought into the second mode (a standby mode for not sensing a fraudulent message), which may reduce the amount of power consumption.

The certain condition may be start of use of the vehicle. In the switching, the operation mode may be switched to the first mode when the start of the use of the vehicle is detected in the detecting. Examples of the use of the vehicle include movement of the vehicle by a user, and preparation for movement of the vehicle (such as opening a door, entering the vehicle, or activating the engine). In addition, for example, when movement of the vehicle is no longer necessary, the use of the vehicle is finished by, for example, parking the vehicle (such as stopping the engine) or exiting the vehicle. Note that while the vehicle is parked in a location other than a specific parking space such as the user's parking space at home (while the vehicle is parked at a filling station or in any other location away from home), even parking and exiting the vehicle may not mean the end of the use of the vehicle. This enables the fraud-sensing ECU to enter the first mode (a check mode for sensing a fraudulent message) in response to the start of the use of the vehicle, so that a fraudulent message in a bus to which the fraud-sensing ECU is connected can be sensed. Accordingly, for example, even if a fraudulent ECU is added to the in-vehicle network system while the user parks and leaves the vehicle, a fraud can be sensed when a fraudulent message is transmitted from the fraudulent ECU after the user comes back to the vehicle and starts to use the vehicle.

Alternatively, the start of the use of the vehicle may be detected by detecting an activation of an engine installed in the vehicle. This enables the fraud-sensing ECU to be ready to sense a fraudulent message when the engine is activated. Accordingly, for example, even if a fraudulent ECU is added to the in-vehicle network system while the user parks and leaves the vehicle, a fraud can be sensed when a fraudulent message is transmitted from the fraudulent ECU after the user comes back to the vehicle and activates the engine.

The fraud sensing method may further include switching the operation mode to the second mode when a predetermined period of time has elapsed since the start of the use of the vehicle after the operation mode has been switched to the first mode in the switching. This enables the fraud-sensing ECU to enter the second mode (a standby mode for not sensing a fraudulent message) unconditionally or under certain conditions when a predetermined period of time has elapsed since the start of the use of the vehicle, which may reduce the amount of power consumption.

The certain condition may also be that any of the plurality of electronic control units becomes ready to start communication with a device outside the vehicle, and the switching may switch the operation mode to the first mode upon detecting, in the detecting, that any of the plurality of electronic control units becomes ready to start the communication. This enables the fraud-sensing ECU to become ready to sense a fraudulent message when communication with the outside is started. This makes a fraudulent message (frame) quickly sensible if, for example, the head unit and the like in the in-vehicle network system are attacked from an external device and the fraudulent message (frame) comes from the outside. Additionally, the supply of a program or the like from the outside to transmit a fraudulent message may also be addressed.

The certain condition may also be that any of the plurality of electronic control units has completed communication with a device outside the vehicle and has entered a certain state after the completion of the communication, and the switching may switch the operation mode to the second mode upon detecting, in the detecting, that the certain state has been entered after the end of the communication. This enables the sensing of a fraudulent message to be omitted to reduce consumption of the battery when communication with the outside is completed and the transmission of a fraudulent message on a bus becomes less likely to occur. Specific examples of the case where the transmission of a fraudulent message becomes less likely to occur include a case where the communication has been interrupted, and a case where a certain period of time (for example, several minutes) has elapsed since the end of the communication.

In the in-vehicle network system, a plurality of buses may be used for communication of the plurality of electronic control units, and the in-vehicle network system may further include a gateway device having a function of transferring a message between the plurality of buses. In the detecting, one electronic control unit among the plurality of electronic control units which is connected to a bus different from that to which the fraud-sensing electronic control unit is connected may perform the detection described above. In the switching, the one electronic control unit which has performed the detection described above in the detecting may transmit a switching instruction message, and the fraud-sensing electronic control unit may switch the operation mode upon receipt of the switching instruction message transferred to the gateway device. Accordingly, in accordance with a state of the vehicle which has been detected by an ECU connected to one bus in the in-vehicle network system, each fraud-sensing ECU connected to each of one or more other buses can switch its operation mode.

In the detecting, furthermore, an input related to whether or not it is necessary to switch the operation mode may be accepted through a predetermined user interface when the state of the vehicle changes, and when the input indicates that it is necessary to switch the operation mode, it may be determined that the state of the vehicle satisfies the certain condition and the detection described above may be performed. This enables the user's judgment to be reflected in the switching of the operation mode of the fraud-sensing ECU, and allows appropriate switching of the operation mode in accordance with the user's intentions and the like.

In the second mode, a type of sensing process having a different degree to which a fraudulent message is sensible than the predetermined type of sensing process may be performed. For example, in a case where the fraud-sensing ECU is capable of executing both a first type of sensing process with a relatively large amount of processing and a second type of sensing process with a relatively small amount of processing in order to sense a fraudulent message, whether to perform the first type of sensing process or the second type of sensing process is switched depending on the operation mode. This enables the fraud-sensing ECU to omit a predetermined type of sensing process (for example, the first type of sensing process) of a fraudulent message under a certain condition in accordance with the state of the vehicle, and may thus reduce consumption of the battery of the vehicle. The amount of processing in the sensing process performed by the fraud-sensing ECU is not necessarily proportional to the degree to which a fraud is sensible but almost tends to be related to the degree to which a fraudulent message is sensible. It is thus useful that, for example, the operation mode be switched so that, for example, a sensing process with an almost high degree to which a fraud is sensible and with a large amount of processing is executed in a certain case and a sensing process with a smaller amount of processing is performed otherwise.

An in-vehicle network system according to another aspect of the present disclosure is an in-vehicle network system including a plurality of electronic control units that communicate with each other via one or more buses, and a fraud-sensing electronic control unit connected to the bus(es). The in-vehicle network system further includes a detection unit that detects that a state of a vehicle provided with the in-vehicle network system satisfies a certain condition, and a switching unit that switches, upon the detection unit detecting that the state of the vehicle satisfies the certain condition, an operation mode of the fraud-sensing electronic control unit connected to the bus(es) between a first mode in which a predetermined type of sensing process for sensing a fraudulent message in the bus(es) is performed and a second mode in which the predetermined type of sensing process is not performed. This enables the fraud-sensing ECU to omit a predetermined type of sensing process of a fraudulent message under a certain condition in accordance with the state of the vehicle, and may thus reduce consumption of the battery of the vehicle.

A fraud-sensing electronic control unit (fraud-sensing ECU) according to still another aspect of the present disclosure is a fraud-sensing electronic control unit to be connected to a bus used for communication by a plurality of electronic control units that communicate with each other via one or more buses. The fraud-sensing electronic control unit includes one or more memories and circuitry which, in operation, detects that a state of a vehicle provided with the plurality of electronic control units satisfies a certain condition, and switches, upon detecting, in the detecting, that the state of the vehicle satisfies the certain condition, an operation mode of the fraud-sensing electronic control unit between a first mode in which a predetermined type of sensing process for sensing a fraudulent message in the bus(es) is performed and a second mode in which the predetermined type of sensing process is not performed. This enables the fraud-sensing ECU to omit a predetermined type of sensing process of a fraudulent message under a certain condition in accordance with the state of the vehicle, and may thus reduce consumption of the battery of the vehicle.

It should be noted that these general or specific aspects may be implemented as a system, a method, an integrated circuit, a computer program, or a computer-readable recording medium such as a CD-ROM, or may be implemented as any combination of the system, the method, the integrated circuit, the computer program, or the recording medium.

In the following, an in-vehicle network system, a fraud-sensing ECU, and the like according to embodiments will be described with reference to the drawings. Each of the embodiments described below shows a specific example of the present disclosure. Thus, the numerical values, shapes, materials, constituent elements, the arrangement and connection of the constituent elements, steps (processes), the processing order of the steps, etc. shown in the following embodiments are mere examples, and do not limit the scope of the present disclosure. Among the constituent elements in the following embodiments, constituent elements not recited in any one of the independent claims are constituent elements that can be optionally added. In addition, the drawings are schematic and not representative of exact proportions or dimensions.

First Embodiment

An embodiment of the present disclosure will now be described with reference to the drawings in the context of an in-vehicle network system 10 including a fraud-sensing ECU that implements an anti-fraud method for preventing a process based on a fraudulent frame from being executed on any other node (ECU) by using message IDs.

1.1 Overall Configuration of In-Vehicle Network System 10

FIG. 1 is a diagram illustrating an overall configuration of an in-vehicle network system 10 according to a first embodiment. The in-vehicle network system 10 is an example of a network communication system in which communication is established in accordance with the CAN protocol, and is a network communication system in an automobile provided with various devices such as a control device and a sensor. The in-vehicle network system 10 is configured to include buses 500a to 500c, fraud-sensing ECUs 100a and 100b, a head unit 200, a gateway 300, and nodes connected to the buses, called ECUs, such as ECUs 400a to 400d connected to various devices. While the in-vehicle network system 10 may include numerous ECUs other than the ECUs 400a to 400d, which are not illustrated in FIG. 1, the description will be given here focusing on the ECUs 400a to 400d, for convenience. Each ECU is a device including, for example, digital circuits such as a processor (microprocessor) and a memory, analog circuits, a communication circuit, and so forth. The memory is a ROM, a RAM, or the like, and is capable of storing a control program (computer program) executed by the processor. For example, the processor operates in accordance with the control program (computer program), thereby allowing the ECU to implement various functions. The computer program is constituted by a plurality of instruction codes indicating instructions for the processor to achieve a predetermined function. Here, the description is based on the assumption that a fraudulent ECU that transmits a fraudulent frame can possibly be connected to the buses 500a and 500b.

The fraud-sensing ECUs 100a and 100b are ECUs connected to the bus 500a and the bus 500b, respectively, and having a function of determining whether frames transmitted from the ECUs 400a to 400d, etc. are fraudulent or not and transmitting an error frame if the frames are fraudulent.

The ECUs 400a to 400d are each connected to any bus, and are connected to an engine 401, brakes 402, a door open/close sensor 403, and a window open/close sensor 404, respectively. Each of the ECUs 400a to 400d obtains the state of the device connected thereto (such as the engine 401), and periodically transmits a frame (data frame described below) or the like indicating the state to a network (that is, the bus).

The gateway 300 is connected to the bus 500a to which the fraud-sensing ECU 100a, the ECU 400a, and the ECU 400b are coupled, the bus 500b to which the fraud-sensing ECU 100b, the ECU 400c, and the ECU 400d are coupled, and the bus 500c to which the head unit 200 is coupled, and has a function of transferring frames received from the respective buses to other buses. It is also possible to switch for each connected bus between whether or not to transfer a received frame. The gateway 300 is also a kind of ECU.

The head unit 200 has a function of receiving a frame, and has a function of receiving frames transmitted from the ECUs 400a to 400d and displaying various states on a display (not illustrated) to present the states to a user. The head unit 200 is also a kind of ECU.

In the in-vehicle network system 10, each ECU exchanges frames in accordance with the CAN protocol. There are the following frames in the CAN protocol: a data frame, a remote frame, an overload frame, and an error frame. The description will first focus on the data frame and the error frame, for convenience of illustration.

1.2 Data Frame Format

A description will now be given of the data frame, which is a frame used in a network compliant with the CAN protocol.

Figure 2:
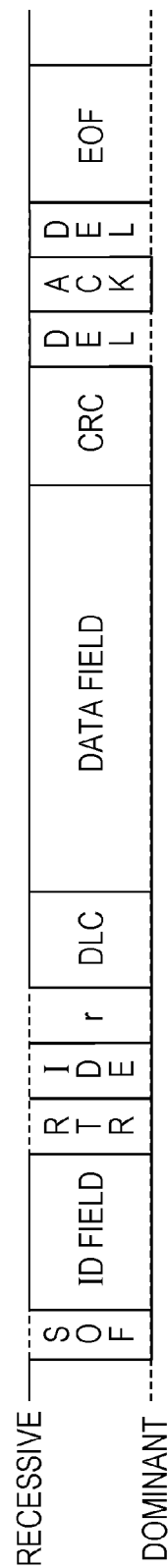
FIG. 2 is a diagram illustrating the format of a data frame specified in the CAN protocol.

FIG. 2 is a diagram illustrating the format of a data frame specified in the CAN protocol. In this figure there is illustrated a data frame in the standard ID format specified in the CAN protocol. The data frame is made up of the following fields: SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of one dominant bit. The recessive value is set for a state where a bus is idle, and is changed to the dominant value by the SOF to indicate the start of frame transmission.

The ID field is a field made up of 11 bits for storing an ID (message ID) that is a value indicating a type of data. It is designed such that a high priority is placed on a frame whose ID has a small value in order to use the ID field to arbitrate communication when a plurality of nodes simultaneously start transmission.

The RTR is a value for identifying a data frame and a remote frame, and is made up of one dominant bit for a data frame.

The IDE and "r" are both made up of one dominant bit.

The DLC is made up of 4 bits, and is a value indicating the length of the data field. The IDE, "r", and the DLC are collectively referred to as a control field.

The data field is a value made up of up to 64 bits, indicating the content of data to be transmitted. The length is adjustable every 8 bits. The specification of data to be sent is not specified in the CAN protocol and is defined in the in-vehicle network system 10. Accordingly, the specification is dependent on the type of vehicle, the manufacturer (producer), and so forth.

The CRC sequence is made up of 15 bits. The CRC sequence is calculated by using transmission values of the SOF, the ID field, the control field, and the data field.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot when transmitting the frame. A receiving node sets the dominant value in the ACK slot and transmits the frame if the receiving node has been able to correctly receive the frame up to the CRC sequence. Since the dominant value overrides the recessive value, if the ACK slot is constituted by the dominant value after transmission, the transmitting node can confirm that any receiving node has been successful in receiving the frame.

The ACK delimiter is a delimiter made up of one recessive bit, indicating the end of the ACK.

The EOF is made up of 7 recessive bits, and indicates the end of the data frame.

1.3 Error Frame Format

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error. A node that has sensed an error transmits 6 consecutive dominant bits in order to inform any other node of the occurrence of the error. This transmission violates a bit-stuffing rule (in which the same value should not be transmitted over 6 or more consecutive bits) in the CAN protocol, and induces the transmission of an error frame (secondary) from any other node.

The error flag (secondary) is made up of 6 consecutive dominant bits, which is used to inform any other node of the occurrence of an error. All the nodes that have received the error flag (primary) and sensed the violation of the bit-stuffing rule transmit an error flag (secondary).

The error delimiter "DEL" is made up of 8 consecutive recessive bits, and indicates the end of the error frame.

1.4 Configuration of Head Unit 200

The head unit 200 is a kind of ECU disposed on, for example, an instrument panel or the like of an automobile, including a display device such as a liquid crystal display (LCD) for displaying information to be viewed by a driver, an input unit that accepts the operation of the driver, and so forth.

FIG. 4 is a configuration diagram of the head unit 200. The head unit 200 is configured to include a frame transceiving unit 270, a frame interpretation unit 260, a reception-ID judgment unit 240, a reception-ID list holding unit 250, a frame processing unit 220, a display control unit 210, and a frame generation unit 230. These constituent elements are functional ones, and each of their functions is implemented by an element in the head unit 200, such as a communication circuit, an LCD, a processor that executes a control program stored in a memory, or a digital circuit.

The frame transceiving unit 270 transmits and receives a frame compliant with the CAN protocol to and from the bus 500c. The frame transceiving unit 270 receives a frame from the bus 500c bit-by-bit, and transfers the frame to the frame interpretation unit 260. Further, the frame transceiving unit 270 transmits the content of a frame of which the frame transceiving unit 270 has been notified by the frame generation unit 230 to the bus 500c bit-by-bit.

The frame interpretation unit 260 receives the values of the frame from the frame transceiving unit 270, and interprets and maps the values into the respective fields in the frame formats specified in the CAN protocol. The frame interpretation unit 260 transfers a value judged to correspond to the ID field to the reception-ID judgment unit 240. In accordance with a determination result sent from the reception-ID judgment unit 240, the frame interpretation unit 260 determines whether to transfer the value in the ID field and the data field that appears after the ID field to the frame processing unit 220 or to abort reception of the frame (that is, abort interpretation of the frame) after the determination result has been received. Further, the frame interpretation unit 260 notifies the frame generation unit 230 that the frame generation unit 230 is requested to transmit an error frame if the frame is judged not to comply with the CAN protocol, for example, if the values of the CRC do not match or if an item whose value should be fixed to the dominant value has the recessive value. Further, when an error frame is received, that is, when an error frame is interpreted to have started from a value in the received frame, the frame interpretation unit 260 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The reception-ID judgment unit 240 receives the value in the ID field sent from the frame interpretation unit 260, and determines whether or not to receive the respective fields of the frame after the ID field, in accordance with a list of message IDs held in the reception-ID list holding unit 250. The reception-ID judgment unit 240 notifies the frame interpretation unit 260 of the determination result.

The reception-ID list holding unit 250 holds a reception-ID list that is a list of IDs (message IDs) which the head unit 200 receives. FIG. 5 is a diagram illustrating an example of the reception-ID list. The head unit 200 receives a frame (message) whose message ID is "1" from the ECU 400a connected to the engine 401, a frame whose message ID is "2" from the ECU 400b connected to the brakes 402, a frame whose message ID is "3" from the ECU 400c connected to the door open/close sensor 403, and a frame whose message ID is "4" from the ECU 400d connected to the window open/close sensor 404.

On the basis of the content of the received frame (for example, the content of the message ID and the data field), for example, the frame processing unit 220 forms an image to be displayed on the LCD and notifies the display control unit 210 of the image. The frame processing unit 220 may hold the content of the received data field and select and notify an image to be displayed on the LCD (for example, an image for displaying the vehicle speed, an image for displaying the open or closed state of a window, etc.) in accordance with the operation of the driver which has been accepted through the input unit.

The display control unit 210 displays, on the LCD or the like, the content of which the display control unit 210 has been notified by the frame processing unit 220.

In accordance with a notification of instructions from the frame interpretation unit 260 to transmit an error frame, the frame generation unit 230 forms an error frame and notifies the frame transceiving unit 270 of the error frame for transmission.

1.5 Example Reception-ID List 1

FIG. 5 is a diagram illustrating an example of a reception-ID list held in each of the head unit 200, the gateway 300, the ECU 400c, and the ECU 400d. The reception-ID list illustrated by way of example in this figure is used to selectively receive and process a frame including a message ID that is an ID (message ID) whose value is any of "1", "2", "3", and "4". For example, the reception-ID list holding unit 250 of the head unit 200 holds the reception-ID list illustrated in FIG. 5. In this case, for a frame whose message ID is none of "1", "2", "3", and "4", the interpretation of the frame subsequent to the ID field by the frame interpretation unit 260 is aborted.

1.6 Configuration of Gateway 300

Figures 6, 7:
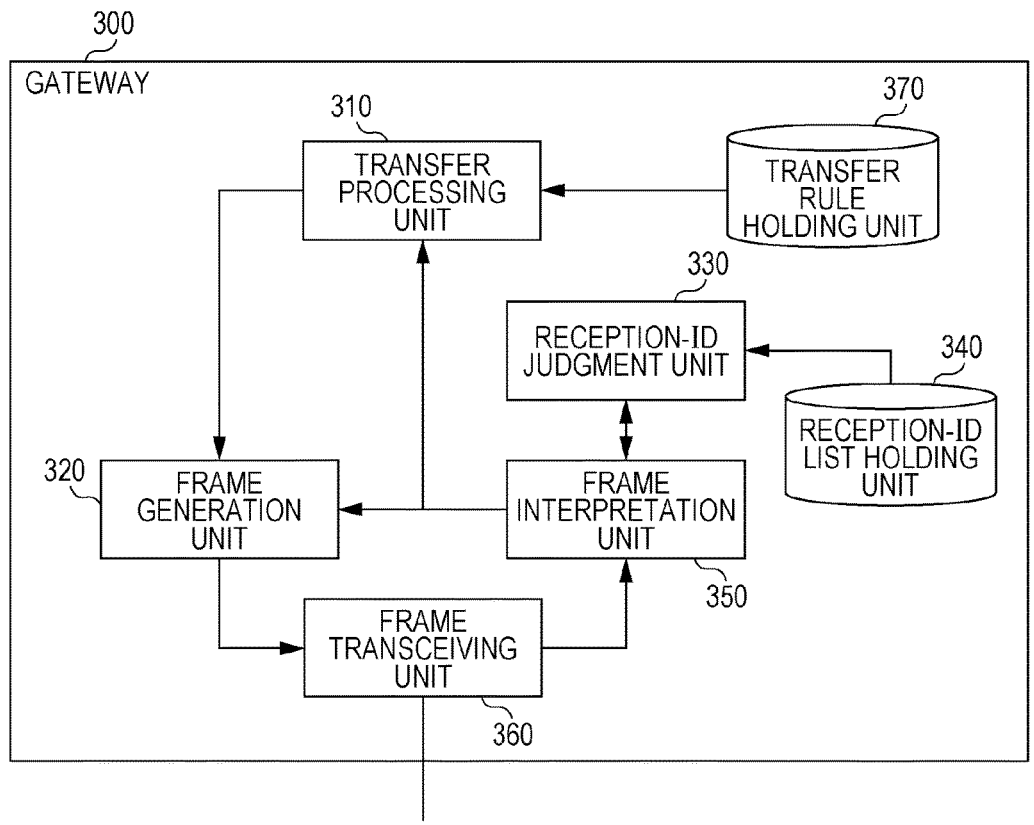
FIG. 6 is a configuration diagram of a gateway.
FIG. 7 is a diagram illustrating an example of transfer rules.

FIG. 6 is a configuration diagram of the gateway 300. The gateway 300 is configured to include a frame transceiving unit 360, a frame interpretation unit 350, a reception-ID judgment unit 330, a reception-ID list holding unit 340, a frame generation unit 320, a transfer processing unit 310, and a transfer rule holding unit 370. These constituent elements are functional ones, and each of their functions is implemented by an element in the gateway 300, such as a communication circuit, a processor that executes a control program stored in a memory, or a digital circuit.

The frame transceiving unit 360 transmits and receives a frame compliant with the CAN protocol to and from each of the buses 500a, 500b, and 500c. The frame transceiving unit 360 receives a frame from a bus bit-by-bit, and transfers the frame to the frame interpretation unit 350. Further, the frame transceiving unit 360 transmits the content of the frame to the buses 500a, 500b, and 500c bit-by-bit on the basis of the frame and bus information indicating a bus at the transfer destination of which the frame transceiving unit 360 has been notified by the frame generation unit 320.

The frame interpretation unit 350 receives the values of the frame from the frame transceiving unit 360, and interprets and maps the values into the respective fields in the frame formats specified in the CAN protocol. The frame interpretation unit 350 transfers a value judged to correspond to the ID field to the reception-ID judgment unit 330. In accordance with a determination result sent from the reception-ID judgment unit 330, the frame interpretation unit 350 determines whether to transfer the value in the ID field and the data field (data) that appears after the ID field to the transfer processing unit 310 or to abort reception of the frame (that is, abort interpretation of the frame) after the determination result has been received. Further, the frame interpretation unit 350 notifies the frame generation unit 320 that the frame generation unit 320 is requested to transmit an error frame if the frame is judged not to comply with the CAN protocol. Further, when an error frame is received, that is, when an error frame is interpreted to have started from a value in the received frame, the frame interpretation unit 350 discards the subsequent part of the frame, that is, aborts interpretation of the frame.

The reception-ID judgment unit 330 receives the value in the ID field sent from the frame interpretation unit 350, and determines whether or not to receive the respective fields of the frame after the ID field, in accordance with a list of message IDs held in the reception-ID list holding unit 340. The reception-ID judgment unit 330 notifies the frame interpretation unit 350 of the determination result.

The reception-ID list holding unit 340 holds a reception-ID list (see FIG. 5) that is a list of IDs (message IDs) which the gateway 300 receives.

The transfer processing unit 310 determines a bus to which transfer is made in accordance with transfer rules held in the transfer rule holding unit 370 on the basis of the message ID of the received frame, and notifies the frame generation unit 320 of bus information indicating the bus to which transfer is made and the message ID and data sent from the frame interpretation unit 350. Note that the gateway 300 does not transfer an error frame received from a certain bus to any other bus.

The transfer rule holding unit 370 holds transfer rules that are information representing rules for the transfer of frames to the respective buses. FIG. 7 is a diagram illustrating an example of the transfer rules.

In accordance with a notification of instructions to transmit an error frame, which is sent from the frame interpretation unit 350, the frame generation unit 320 forms an error frame and notifies the frame transceiving unit 360 of the error frame for transmission. Further, the frame generation unit 320 forms a frame by using the message ID and data sent from the transfer processing unit 310, and notifies the frame transceiving unit 360 of the frame and the bus information.

1.7 Example Transfer Rules

FIG. 7 illustrates an example of transfer rules held in the gateway 300. The transfer rules associate buses at transfer sources, buses at transfer destinations, and IDs (message IDs) to be transferred with one another. In FIG. 7, "*" indicates that a frame is transferred regardless of the message ID. In this figure, furthermore, "-" indicates no frame to be transferred. The illustrated example indicates that the frames received from the bus 500a are set to be transferred to the bus 500b and the bus 500c regardless of the message ID. It also indicates that the frames received from the bus 500b are set so that all the frames are transferred to the bus 500c whereas only a frame whose message ID is "3" is transferred to the bus 500a. It also indicates that the frames received from the bus 500c are set not to be transferred to the bus 500a or the bus 500b.

1.8 Configuration of ECU 400a

FIG. 8 is a configuration diagram of the ECU 400a. The ECU 400a is configured to include a frame transceiving unit 460, a frame interpretation unit 450, a reception-ID judgment unit 430, a reception-ID list holding unit 440, a frame processing unit 410, a frame generation unit 420, and a data obtaining unit 470. These constituent elements are functional ones, and each of their functions is implemented by an element in the ECU 400a, such as a communication circuit, a processor that executes a control program stored in a memory, or a digital circuit.

The frame transceiving unit 460 transmits and receives a frame compliant with the CAN protocol to and from the bus 500a. The frame transceiving unit 460 receives a frame from the bus 500a bit-by-bit, and transfers the frame to the frame interpretation unit 450. Further, the frame transceiving unit 460 transmits the content of a frame of which the frame transceiving unit 460 has been notified by the frame generation unit 420 to the bus 500a.

The frame interpretation unit 450 receives the values of the frame from the frame transceiving unit 460, and interprets and maps the values into the respective fields in the frame formats specified in the CAN protocol. The frame interpretation unit 450 transfers a value judged to correspond to the ID field to the reception-ID judgment unit 430. In accordance with a determination result sent from the reception-ID judgment unit 430, the frame interpretation unit 450 determines whether to transfer the value in the ID field and the data field that appears after the ID field to the frame processing unit 410 or to abort reception of the frame (that is, abort interpretation of the frame) after the determination result has been received. Further, the frame interpretation unit 450 notifies the frame generation unit 420 that the frame generation unit 420 is requested to transmit an error frame if the frame is judged not to comply with the CAN protocol. Further, when an error frame is received, that is, when an error frame is interpreted to have started from a value in the received frame, the frame interpretation unit 450 discards the subsequent part of the frame, that is, aborts interpretation of the frame.

The reception-ID judgment unit 430 receives the value in the ID field sent from the frame interpretation unit 450, and determines whether or not to receive the respective fields of the frame after the ID field, in accordance with a list of message IDs held in the reception-ID list holding unit 440. The reception-ID judgment unit 430 notifies the frame interpretation unit 450 of the determination result.

The reception-ID list holding unit 440 holds a reception-ID list that is a list of IDs (message IDs) which the ECU 400a receives. FIG. 9 is a diagram illustrating an example of the reception-ID list.

The frame processing unit 410 performs a process related to a function that is different for each ECU in accordance with the data of the received frame. For example, the ECU 400a connected to the engine 401 has a function of sounding an alarm when a door is open while the vehicle speed is over 30 km per hour. The ECU 400a includes, for example, a speaker or the like for sounding an alarm. The frame processing unit 410 of the ECU 400a manages data (for example, information indicating the state of the doors) received from any other ECU, and performs processes such as a process for sounding an alarm in a certain condition on the basis of the average speed per hour obtained from the engine 401.

The data obtaining unit 470 obtains data indicating the state of the elements connected to the ECUs, such as devices and sensors, and notifies the frame generation unit 420 of the data.

In accordance with a notification of instructions to transmit an error frame, which is sent from the frame interpretation unit 450, the frame generation unit 420 forms an error frame and notifies the frame transceiving unit 460 of the error frame for transmission. Further, the frame generation unit 420 adds a predetermined message ID to the value of the data sent from the data obtaining unit 470 to form a frame, and notifies the frame transceiving unit 460 of the frame.

Each of the ECUs 400b to 400d also has a configuration basically similar to that of the ECU 400a described above. However, the reception-ID list held in the reception-ID list holding unit 440 may have content different from one ECU to another. The ECU 400b holds the reception-ID list illustrated by way of example in FIG. 9, and the ECU 400c and the ECU 400d hold the reception-ID list illustrated by way of example in FIG. 5. Furthermore, the content of the process of the frame processing unit 410 differs from one ECU to another. For example, the content of the process of the frame processing unit 410 in the ECU 400c includes a process related to a function of sounding an alarm if a door is opened while the brakes are released. For example, the frame processing units 410 in the ECU 400b and the ECU 400d do not perform a special process. Each ECU may have functions other than those described for illustrative purposes here. The content of respective frames transmitted from the ECUs 400a to 400d will be described below with reference to FIGS. 10 to 13.

1.9 Example Reception-ID List 2

FIG. 9 is a diagram illustrating an example of a reception-ID list held in each of the ECU 400a and the ECU 400b. The reception-ID list illustrated by way of example in this figure is used to selectively receive and process a frame including a message ID that is an ID (message ID) whose value is any of "1", "2", and "3". For example, the reception-ID list holding unit 440 of the ECU 400a holds the reception-ID list illustrated in FIG. 9. In this case, for a frame whose message ID is none of "1", "2", and "3", the interpretation of the frame subsequent to the ID field by the frame interpretation unit 450 is aborted.

1.10 Example Transmission Frame from Engine-Related ECU 400a

FIG. 10 is a diagram illustrating an example of an ID (message ID) and a data field (data) in a frame transmitted from the ECU 400a connected to the engine 401. The ECU 400a transmits a frame whose message ID is "1". The data represents the average speed per hour (km/h), taking a value in the range from a minimum speed of 0 (km/h) to a maximum speed of 180 (km/h), and has a length of 1 byte. FIG. 10 illustrates, from top to bottom, message IDs and data corresponding to frames transmitted sequentially from the ECU 400a, by way of example, and depicts acceleration, increasing the speed from 0 km/h in increments of 1 km/h.

1.11 Example Transmission Frame from Brake-Related ECU 400b

FIG. 11 is a diagram illustrating an example of an ID (message ID) and a data field (data) in a frame transmitted from the ECU 400b connected to the brakes 402. The ECU 400b transmits a frame whose message ID is "2". The data represents the degree to which the brakes are applied, expressed as a percentage (%), and has a length of 1 byte. A percentage of 0(%) indicates a state where the brakes are not applied at all and 100(%) indicates a state where the brakes are maximally applied. FIG. 11 illustrates, from top to bottom, message IDs and data corresponding to frames transmitted sequentially from the ECU 400b, by way of example, and depicts a gradual easing off of the brakes from 100%.

1.12 Example Transmission Frame from Door-Open/Close-Sensor-Related ECU 400c

FIG. 12 is a diagram illustrating an example of an ID (message ID) and a data field (data) in a frame transmitted from the ECU 400c connected to the door open/close sensor 403. The ECU 400c transmits a frame whose message ID is "3". The data represents the open or closed state for the door, and has a length of 1 byte. The data has the value "1" for a door-open state and the value "0" for a door-closed state. FIG. 12 illustrates, from top to bottom, message IDs and data corresponding to frames transmitted sequentially from the ECU 400c, by way of example, and depicts a gradual transition from the door-open state to the closed state.

1.13 Example Transmission Frame from Window-Open/Close-Sensor-Related ECU 400d

FIG. 13 is a diagram illustrating an example of an ID (message ID) and a data field (data) in a frame transmitted from the ECU 400d connected to the window open/close sensor 404. The ECU 400d transmits a frame whose message ID is "4". The data represents the open or closed state for the window, expressed as a percentage (%), and has a length of 1 byte. A percentage of 0(%) indicates a state where the window is completely closed and 100(%) indicates a state where the window is completely open. FIG. 13 illustrates, from top to bottom, message IDs and data corresponding to frames transmitted sequentially from the ECU 400d, by way of example, and depicts a gradual transition from the window-closed state to the open state.

1.14 Configuration of Fraud-Sensing ECU 100a

Figures 14, 15, 16:
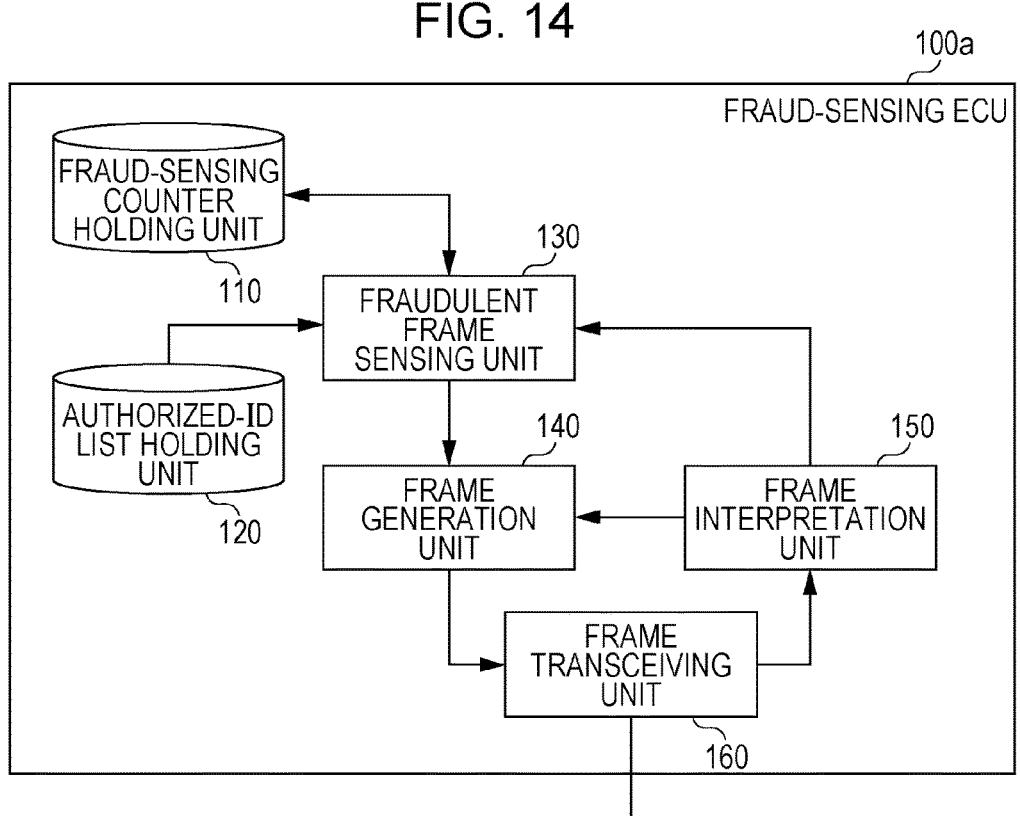
FIG. 14 is a configuration diagram of a fraud-sensing ECU according to the first embodiment.
FIG. 15 is a diagram illustrating an example of an authorized-ID list held in the fraud-sensing ECU.
FIG. 16 is a diagram illustrating an example of an authorized-ID list held in the fraud-sensing ECU.

FIG. 14 is a configuration diagram of the fraud-sensing ECU 100a. The fraud-sensing ECU 100a is configured to include a frame transceiving unit 160, a frame interpretation unit 150, a fraudulent frame sensing unit 130, an authorized-ID list holding unit 120, a fraud-sensing counter holding unit 110, and a frame generation unit 140. These constituent elements are functional ones, and each of their functions is implemented by an element in the fraud-sensing ECU 100a, such as a communication circuit, a processor that executes a control program stored in a memory, or a digital circuit. While the fraud-sensing ECU 100b also has a configuration basically similar to that described above, the content of list information (authorized-ID list) held in the authorized-ID list holding unit 120 is different between the fraud-sensing ECU 100a and the fraud-sensing ECU 100b.

The frame transceiving unit 160 transmits and receives a frame compliant with the CAN protocol to and from the bus 500a. That is, the frame transceiving unit 160 serves as a so-called receiving unit that receives a frame when frame transmission on a bus is started, and serves as a so-called transmitting unit that transmits an error frame and the like to a bus. That is, the frame transceiving unit 160 receives a frame from the bus 500a bit-by-bit, and transfers the frame to the frame interpretation unit 150. Further, the frame transceiving unit 160 transmits the content of a frame of which the frame transceiving unit 160 has been notified by the frame generation unit 140 to the bus 500a.

The frame interpretation unit 150 receives the values of the frame from the frame transceiving unit 160, and interprets and maps the values into the respective fields in the frame formats specified in the CAN protocol. The frame interpretation unit 150 transfers a value judged to correspond to the ID field to the fraudulent frame sensing unit 130. Further, the frame interpretation unit 150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 150 discards the subsequent part of the frame, that is, aborts interpretation of the frame.

The fraudulent frame sensing unit 130 receives the value in the ID field sent from the frame interpretation unit 150, and determines whether or not the value in the ID field meets a predetermined condition indicating a fraud. That is, the fraudulent frame sensing unit 130 functions as a so-called determination unit that determines whether or not the content of a predetermined field in a received frame meets a predetermined condition indicating a fraud. The predetermined condition indicating a fraud is a condition in which the value in the ID field is not found in the list of message IDs held in the authorized-ID list holding unit 120. That is, the fraudulent frame sensing unit 130 determines whether the sent value (message ID) of the ID field is fraudulent or not, in accordance with the list of message IDs held in the authorized-ID list holding unit 120. If a message ID which is not found in this list (that is, an authorized-ID list described below) is received, the fraudulent frame sensing unit 130 notifies the fraud-sensing counter holding unit 110 of the received message ID in order to increment the number of times a fraud has been sensed. If a message ID which is not found in the authorized-ID list is received, the fraudulent frame sensing unit 130 further notifies the frame generation unit 140 that the frame generation unit 140 is requested to transmit an error frame. Further, when the number of times a fraud has been sensed reaches a certain number or more, the fraudulent frame sensing unit 130 is notified of this by the fraud-sensing counter holding unit 110, and notifies the frame generation unit 140 that the frame generation unit 140 is requested to transmit an error display message (frame) indicating the presence of a fraudulent ECU that issues the corresponding message ID. The message ID of the error display message is determined in advance, and the head unit 200 is configured to receive the message (frame) of the message ID and to provide error display. Although the error display message is not described herein for convenience of illustration, the message ID of the error display message is listed in the reception-ID lists held in the gateway 300 and the head unit 200 and in the authorized-ID list described below. Note that the message ID for the error display message is not illustrated in FIG. 15 and FIG. 16.

The authorized-ID list holding unit 120 holds an authorized-ID list that is a list defining in advance message IDs included in frames to be transmitted on the bus 500a in the in-vehicle network system 10 (see FIG. 15 and FIG. 16).

The fraud-sensing counter holding unit 110 holds a fraud-sensing counter for counting the number of times sensing has been performed for each message ID, and, upon being notified of a message ID by the fraudulent frame sensing unit 130, increments (increases) the corresponding fraud-sensing counter. When a fraud-sensing counter reaches a certain number (a predetermined number of times sensing has been performed) or more, the fraud-sensing counter holding unit 110 notifies the fraudulent frame sensing unit 130 that the certain number has been exceeded. Examples of the term "certain number (predetermined number of times sensing has been performed)", as used herein, include a value determined in accordance with handling rules for a transmission error counter in the CAN protocol. In the CAN protocol, the transmission error counter counts up by 8 each time an ECU blocks transmission by using an error frame. As a result, when a transmission error counter in a transmitting node counts up to 128, the transmitting node is specified to transition to a passive state so that frame transmission is no longer performed. Accordingly, setting the certain number to 17, which is larger than 128/8 (=16), allows an error display message to be transmitted from the fraud-sensing ECU 100a when the presence of a transmitting node (fraudulent ECU) that ignores a rule related to a transmission error counter in the CAN protocol is estimated. If a fraudulent ECU that transmits a fraudulent frame follows a rule related to a transmission error counter in the CAN protocol, the transmission of an error frame from the fraud-sensing ECU 100a causes the transmission error counter of the fraudulent ECU to increment by 8. In this case, when the transmission error counter of the fraudulent ECU increases up to 128 due to the repeated transmission of a fraudulent frame, the fraudulent ECU transitions to the passive state to stop a fraudulent frame from being transmitted from the fraudulent ECU.

In accordance with a notification of instructions to transmit an error frame, which is sent from the frame interpretation unit 150, the frame generation unit 140 forms an error frame and notifies the frame transceiving unit 160 of the error frame for transmission. In addition, in accordance with a notification of instructions to transmit an error frame, which is sent from the fraudulent frame sensing unit 130, the frame generation unit 140 forms an error frame and notifies the frame transceiving unit 160 of the error frame for transmission. In accordance with a notification of instructions to transmit an error display message, which is sent from the fraudulent frame sensing unit 130, furthermore, the frame generation unit 140 notifies the frame transceiving unit 160 of an error display message for transmission.

1.15 Example Authorized-ID List in Fraud-Sensing ECU 100a

FIG. 15 is a diagram illustrating an example of an authorized-ID list held in the authorized-ID list holding unit 120 of the fraud-sensing ECU 100a. The authorized-ID list illustrated by way of example in this figure indicates that a frame including a message ID that is an ID (message ID) whose value is any of "1", "2", and "3" may be allowed to flow into the bus 500a.

1.16 Example Authorized-ID List in Fraud-Sensing ECU 100b

FIG. 16 is a diagram illustrating an example of an authorized-ID list held in the authorized-ID list holding unit 120 of the fraud-sensing ECU 100b. The authorized-ID list illustrated by way of example in this figure indicates that a frame including a message ID that is an ID (message ID) whose value is any of "1", "2", "3", and "4" may be allowed to flow into the bus 500b.

1.17 Example Fraud-Sensing-Counter Saving List

Figure 17:
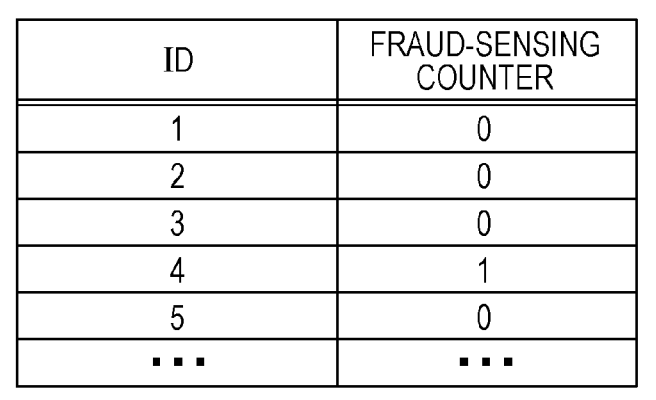

FIG. 17 is a diagram illustrating an example of the states of fraud-sensing counters for individual message IDs. The illustrated example indicates that only a fraud-sensing counter whose message ID is "4" has sensed a fraud once while no fraud has been sensed for the other message IDs. That is, the illustrated example indicates a case where the fraud-sensing ECU 100a has sensed a transmission of a message (frame) with message ID "4", which would not have flowed into the bus 500a, and the fraud-sensing counter corresponding to the message ID "4" has been incremented by 1.

1.18 Sequence for Fraudulent-Frame Sensing

A description will now be given of the operation of the fraud-sensing ECU 100a, the ECU 400a, the ECU 400b, the gateway 300, and so forth connected to the bus 500a in the in-vehicle network system 10 having the configuration described above in a case where a fraudulent ECU is connected to the bus 500a.

Figure 18:
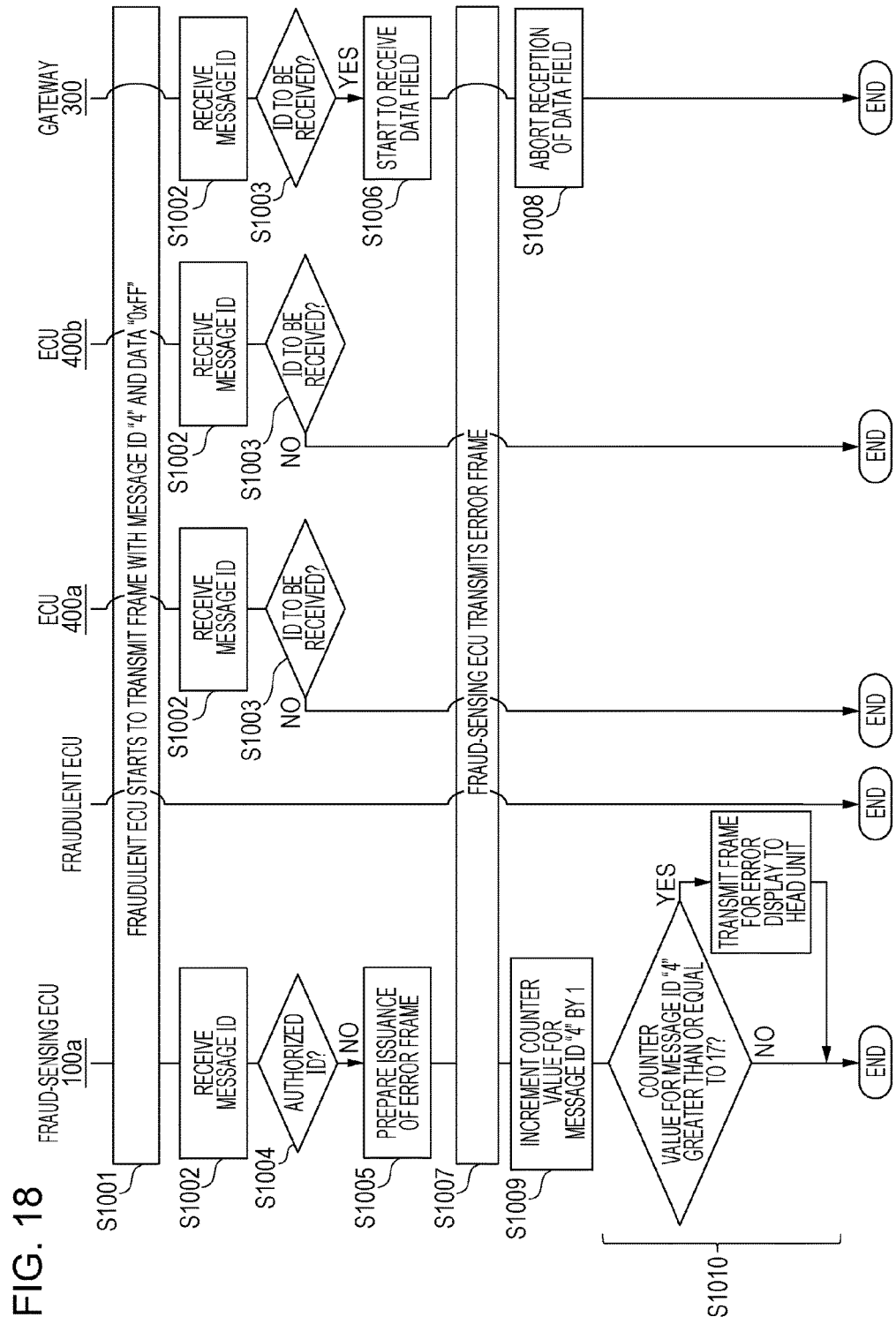
FIG. 18 is a sequence diagram illustrating an example operation for sensing a fraudulent frame and preventing execution of the fraudulent frame in the first embodiment.

FIG. 18 is a sequence diagram illustrating an example operation for, in response to sensing of a fraudulent frame (message) by the fraud-sensing ECU 100a, preventing any other ECU from performing a process corresponding to the fraudulent frame. In this figure, an example is illustrated in which a fraudulent ECU transmits a data frame whose message ID is "4" and data field (data) is "255 (0xFF)" to the bus 500a. Here, respective sequences represent individual process procedures (steps) performed by various devices.

First, a fraudulent ECU starts to transmit a data frame whose message ID is "4" and data is "255 (0xFF)" (sequence S1001). The values of the bits included in the frame are sequentially delivered to the bus 500a in the order of the SOF, the ID field (message ID), etc. in accordance with the data frame format described above.

When the fraudulent ECU completes the delivery of the frame up to the ID field (message ID) to the bus 500a, each of the fraud-sensing ECU 100a, the ECU 400a, the ECU 400b, and the gateway 300 receives a message ID (sequence S1002).

Each of the ECU 400a, the ECU 400b, and the gateway 300 checks the message ID by using the reception-ID list held therein (sequence S1003). At this time, the fraud-sensing ECU 100a checks the message ID by using the authorized-ID list held therein (sequence S1004). That is, the fraud-sensing ECU 100a determines whether or not the content of the ID field in the transmitted frame meets a predetermined condition (in which the content is not listed in the authorized-ID list) indicating a fraud.

In sequence S1003, the ECU 400a and the ECU 400b terminate reception since the respectively held reception-ID lists do not include "4" (see FIG. 9). That is, a frame that the fraudulent ECU continuously transmits is no longer interpreted, nor is the process corresponding to the frame performed. In sequence S1003, furthermore, the gateway 300 continues reception since the held reception-ID list includes "4" (see FIG. 5). In sequence S1004, the fraud-sensing ECU 100a judges that the message ID is fraudulent since the held authorized-ID list does not include "4", and then starts to prepare the issuance of an error frame (sequence S1005).

Subsequently to sequence S1003, the gateway 300 continues the reception of the frame. For example, while the fraud-sensing ECU 100a is preparing the issuance of an error frame, the part subsequent to the ID field, namely, the RTR and the control field (IDE, r, DLC), is sequentially delivered to the bus 500a from the fraudulent ECU, and then the data field is sequentially delivered bit-by-bit. The gateway 300 receives the RTR and the control field (IDE, r, DLC), and then starts the reception of the data field (sequence S1006).

Then, the preparation of the issuance of an error frame is completed, and the fraud-sensing ECU 100a transmits an error frame (sequence S1007). The transmission of the error frame is performed before the transmission of the end of the fraudulent frame (for example, before the transmission of the end of the CRC sequence). In the illustrated example operation, the error frame is transmitted in the middle of the data field. The transmission of the error frame is started, thus allowing the middle part of the data field in the frame being transmitted from the fraudulent ECU to be overwritten with the error frame (a bit sequence of the prioritized dominant value) on the bus 500a.

The gateway 300 which has received the error frame transmitted in sequence S1007 aborts reception of the frame being transmitted from the fraudulent ECU during the reception of the data field (sequence S1008). That is, the data field from the fraudulent ECU has been overwritten with the error frame, and the gateway 300 detects the error frame and thus does not continue the reception of the frame being transmitted from the fraudulent ECU.

The fraud-sensing ECU 100a increments the fraud-sensing counter corresponding to the message ID "4" of the data frame for which the error frame has been transmitted (sequence S1009).

If the fraud-sensing counter corresponding to the message ID "4" becomes greater than or equal to 17 as a result of the increment, the fraud-sensing ECU 100a transmits a frame indicating error display (error display message) so that the frame can be received by the head unit 200 (sequence S1010). Consequently, the frame processing unit 220 of the head unit 200 performs a process for providing error display, and an error notification is issued via an LCD or the like. The error notification may be issued via, in place of display on an LCD or the like, audio output, light emission, or the like.

1.19 Advantageous Effects of First Embodiment

A fraud-sensing ECU illustrated in the first embodiment determines whether a transmitted frame (data frame) is a fraudulent frame or not by using an authorized-ID list in terms of the ID field of the frame. This enables the occurrence of a fraud to be determined based on the ID field in the data frame, and can thus prevent existing nodes (that is, ECUs other than a fraud-sensing ECU and a fraudulent ECU) from interpreting a fraudulent frame and from performing a process corresponding to the frame. In addition, it is only required to receive the data frame up to the ID field subsequent to the SOF at the beginning of the data frame to perform determination, thereby making it possible to reduce bus traffic, compared to the case where determination is performed after the receipt of the latter part or the like of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for judgment of a fraudulent frame can minimize the effect on the existing network configuration, resulting in the amount of processing and the amount of power consumption being reduced in the entire system.

Note that it may be switchable whether one or more fraud-sensing ECUs in the in-vehicle network system 10 described above are to perform sensing or not. Additionally, each fraud-sensing ECU may be configured not to sense a fraudulent message inly when the vehicle is in a certain state, for example, when a certain period has elapsed since the start of the use of the vehicle. This can keep the amount of power consumption low, and can reduce consumption of an in-vehicle battery that is a power supply of the in-vehicle network system 10.

Second Embodiment

An embodiment of the present disclosure will now be described in the context of an in-vehicle network system 11 including a fraud-sensing ECU that implements an anti-fraud method for preventing a process based on a fraudulent frame from being executed on any other node (ECU) on the basis of a data range allowed for each message ID.

2.1 Overall Configuration of In-Vehicle Network System 11

Figure 19:
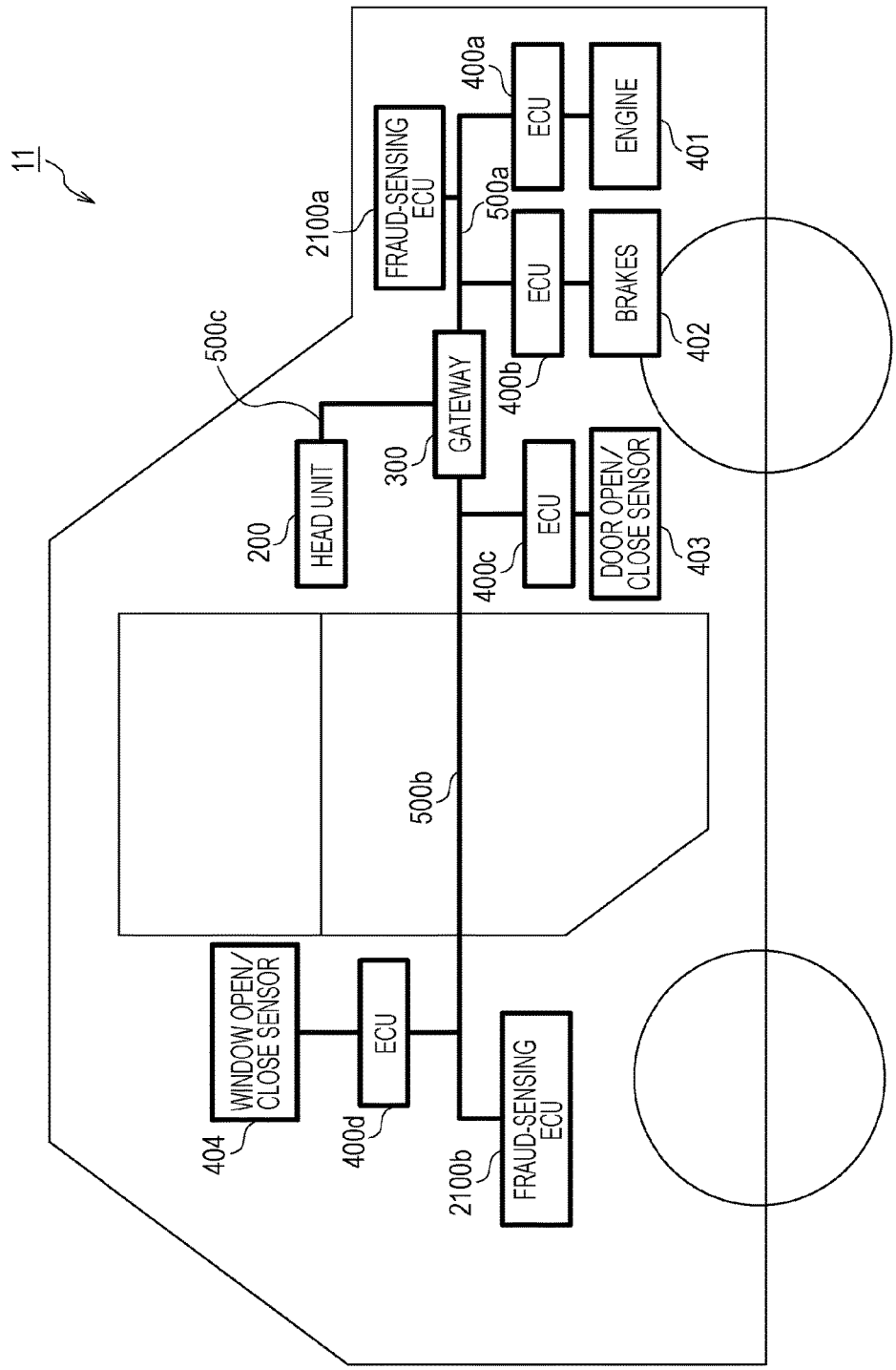
FIG. 19 is a diagram illustrating an overall configuration of an in-vehicle network system according to a second embodiment.

FIG. 19 is a diagram illustrating an overall configuration of an in-vehicle network system 11 according to a second embodiment. The in-vehicle network system 11 is obtained by partially modifying the in-vehicle network system 10 illustrated in the first embodiment. The in-vehicle network system 11 is configured to include buses 500a to 500c, fraud-sensing ECUs 2100a and 2100b, a head unit 200, a gateway 300, and nodes connected to the buses, called ECUs, such as ECUs 400a to 400d connected to various devices. Of the constituent elements of the in-vehicle network system 11, constituent elements having functions similar to those in the first embodiment are designated by the same numerals and are not described.

The fraud-sensing ECUs 2100a and 2100b are ECUs connected to the bus 500a and the bus 500b, respectively, and having a function of determining whether frames transmitted from the ECUs 400a to 400d, etc. are fraudulent or not and transmitting an error frame if the frames are fraudulent.

2.2 Configuration of Fraud-Sensing ECU 2100a

Figures 20, 21:
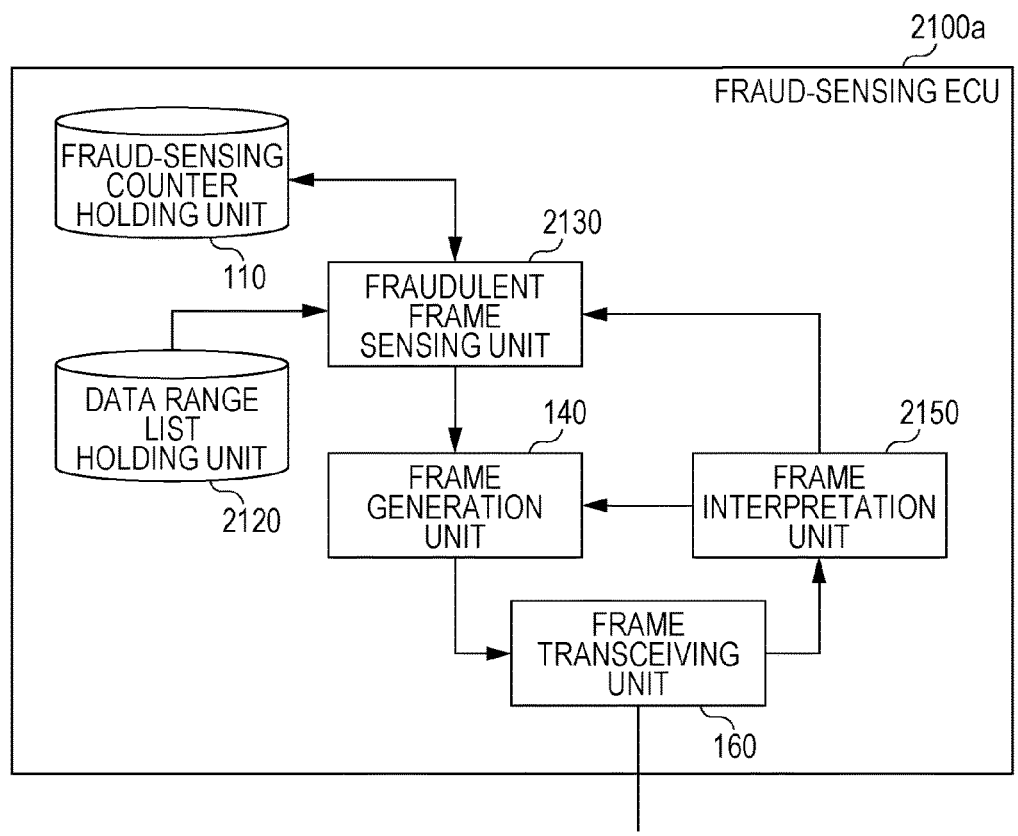
FIG. 20 is a configuration diagram of a fraud-sensing ECU according to the second embodiment.
FIG. 21 is a diagram illustrating an example of a data range list held in the fraud-sensing ECU.

FIG. 20 is a configuration diagram of the fraud-sensing ECU 2100a. The fraud-sensing ECU 2100a is configured to include a frame transceiving unit 160, a frame interpretation unit 2150, a fraudulent frame sensing unit 2130, a data range list holding unit 2120, a fraud-sensing counter holding unit 110, and a frame generation unit 140. These constituent elements are functional ones, and each of their functions is implemented by an element in the fraud-sensing ECU 2100*a*, such as a communication circuit, a processor that executes a control program stored in a memory, or a digital circuit. The fraud-sensing ECU 2100*a* is obtained by partially modifying the fraud-sensing ECU 100*a* illustrated in the first embodiment, and constituent elements having functions similar to those in the first embodiment are designated by the same numerals and are not described. The fraud-sensing ECU 2100*b* also has a configuration similar to that of the fraud-sensing ECU 2100*a*.

The frame interpretation unit 2150 is obtained by modifying the frame interpretation unit 150 illustrated in the first embodiment, and is configured to receive values of a frame from the frame transceiving unit 160 and to interpret and map the values into the respective fields in the frame formats specified in the CAN protocol. The frame interpretation unit 2150 transfers a value (data) judged to correspond to the data field when the frame is judged to be a data frame, together with the ID (message ID) in the ID field, to the fraudulent frame sensing unit 2130. Further, the frame interpretation unit 2150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 2150 discards the subsequent part of the frame, that is, aborts interpretation of the frame.

The fraudulent frame sensing unit 2130 is obtained by modifying the fraudulent frame sensing unit 130 illustrated in the first embodiment, and is configured to receive the message ID and the value in the data field (data) sent from the frame interpretation unit 2150 and to determine whether or not these values meet a predetermined condition indicating a fraud. That is, the fraudulent frame sensing unit 2130 functions as a so-called determination unit that determines whether or not the content of a predetermined field in a received frame meets a predetermined condition indicating a fraud. The predetermined condition indicating a fraud is a condition in which the data is not within a data range listed in a data range list held in the data range list holding unit 2120 in association with the message ID. The fraudulent frame sensing unit 2130 determines whether or not a fraud has occurred, in accordance with a data range list held in the data range list holding unit 2120, which is a list defining data ranges for individual message IDs. If data in a range which is not defined in the data range list is received, the fraudulent frame sensing unit 2130 notifies the fraud-sensing counter holding unit 110 of the received message ID in order to increment the number of times a fraud has been sensed. The control performed to, when the number of times a fraud has been sensed reaches a certain number or more, transmit an error display message so that the error display message can be received by the head unit 200 has been described in the first embodiment, and is not described here. If data in a range which is not defined in the data range list is received, the fraudulent frame sensing unit 2130 notifies the frame generation unit 140 that the frame generation unit 140 is requested to transmit an error frame.

The data range list holding unit 2120 holds a data range list that is a list defining in advance ranges allowed for data (the values in the data fields) included in data frames transmitted on a bus in the in-vehicle network system 11 (see FIG. 21).

2.3 Example Data Range List

FIG. 21 is a diagram illustrating an example of the data range list held in the data range list holding unit 2120 of the fraud-sensing ECU 2100*a*. In the data range list, each ID (message ID) is associated with a data range allowed as the value in the data field (data) in a data frame with the message ID. In the example illustrated in FIG. 21, the data range "0 to 180" is set to be normal for a data frame whose message ID is "1", the data range "0 to 100" for a data frame whose message ID is "2" or "4", and the data range "0, 1" for a data frame whose message ID is "3".

2.4 Sequence for Fraudulent-Frame Sensing

A description will now be given of the operation of the fraud-sensing ECU 2100*a*, the ECU 400*a*, the ECU 400*b*, the gateway 300, and so forth connected to the bus 500*a* in the in-vehicle network system 11 having the configuration described above in a case where a fraudulent ECU is connected to the bus 500*a*.

Figure 22:
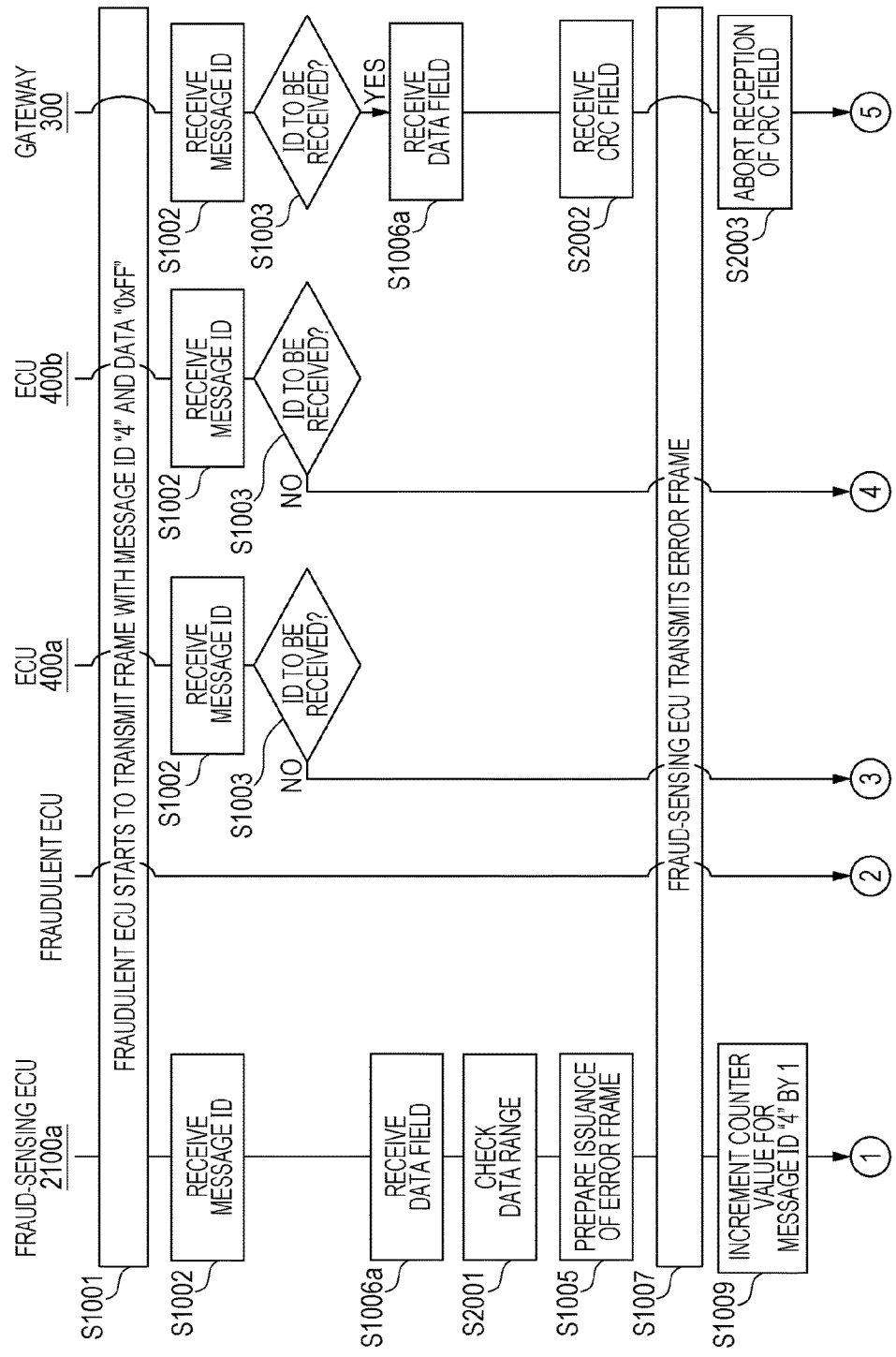
FIG. 22 is a sequence diagram illustrating an example operation for sensing a fraudulent frame and preventing execution of the fraudulent frame in the second embodiment (continued in FIG. 23)
Figure 23:
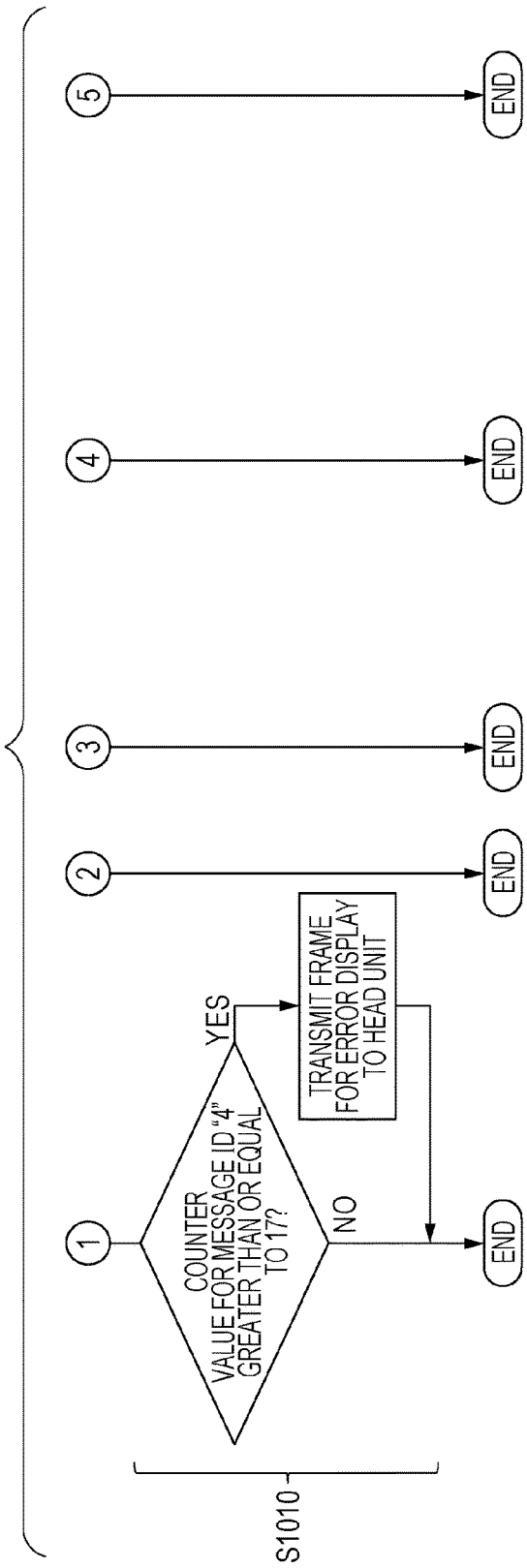
FIG. 23 is a sequence diagram illustrating the example operation for sensing a fraudulent frame and preventing execution of the fraudulent frame in the second embodiment (continued from FIG. 22)

FIG. 22 and FIG. 23 illustrate a sequence diagram illustrating an example operation for, in response to sensing of a fraudulent frame (message) by the fraud-sensing ECU 2100*a*, preventing any other ECU from performing a process corresponding to the fraudulent frame. In FIG. 22 and FIG. 23, as in FIG. 18 given in the first embodiment, an example is illustrated in which a fraudulent ECU transmits a data frame whose message ID is "4" and data field (data) is "255 (0xFF)" to the bus 500*a*. The same sequences as the sequences illustrated in the first embodiment are designated by the same numerals, and are described here in a simplified way.

First, a fraudulent ECU starts to transmit a fraudulent data frame (sequence S1001). Each of the fraud-sensing ECU 2100*a*, the ECU 400*a*, the ECU 400*b*, and the gateway 300 receives a message ID (sequence S1002). Each of the ECU 400*a*, the ECU 400*b*, and the gateway 300 checks the message ID by using the reception-ID list held therein (sequence S1003). The ECU 400*a* and the ECU 400*b* terminate reception since the respectively held reception-ID lists do not include "4" (see FIG. 9). The gateway 300 continues reception and receives the data field since the held reception-ID list includes "4" (see FIG. 5) (sequence S1006*a*). Likewise, the fraud-sensing ECU 2100*a* also receives the data field (sequence S1006*a*).

Subsequently to sequence S1006*a*, the fraud-sensing ECU 2100*a* checks the data in the data field by using the data range list (see FIG. 21) (sequence S2001). That is, the fraud-sensing ECU 2100*a* determines whether or not the content of the ID field in the transmitted frame meets a predetermined condition (in which the content is not within the ranges of data contained in the data range list) indicating a fraud. The fraud-sensing ECU 2100*a* judges that the data frame is fraudulent since the data range list does not contain the value of "255 (0xFF)" corresponding to the ID "4", and then starts to prepare the issuance of an error frame (sequence S1005).

While the fraud-sensing ECU 2100*a* is preparing the issuance of an error frame, the CRC field (the CRC sequence and the CRC delimiter), which is a part subsequent to the data field, is sequentially delivered bit-by-bit to the bus 500*a* from the fraudulent ECU. The gateway 300 starts the reception of the CRC field (sequence S2002).

Then, the preparation of the issuance of an error frame is completed, and the fraud-sensing ECU 2100*a* transmits an error frame (sequence S1007). The transmission of the error frame is started, thus allowing the middle part of the CRC sequence in the frame being transmitted from the fraudulent ECU to be overwritten with the error frame (a bit sequence of the prioritized dominant value) on the bus 500*a*.

The gateway 300 which has received the error frame transmitted in sequence S1007 aborts reception of the data frame being transmitted from the fraudulent ECU during the reception of the CRC field including the CRC sequence (sequence S2003). That is, the CRC sequence from the fraudulent ECU has been overwritten with the error frame, and the gateway 300 detects the error frame and thus does not continue the reception of the data frame being transmitted from the fraudulent ECU.

The fraud-sensing ECU 2100a increments the fraud-sensing counter corresponding to the ID "4" of the data frame for which the error frame has been transmitted (sequence S1009). If the fraud-sensing counter corresponding to the ID "4" becomes greater than or equal to 17 as a result of the increment, the fraud-sensing ECU 2100a transmits an error display message (sequence S1010).

2.5 Advantageous Effects of Second Embodiment

A fraud-sensing ECU illustrated in the second embodiment determines whether a transmitted frame is a fraudulent frame or not by using a data range list in terms of the ID field and the data field in the frame (data frame). This enables the occurrence of a fraud to be determined based on a combination of the ID field and the data field in a data frame, and can thus prevent existing ECUs (that is, ECUs other than a fraud-sensing ECU and a fraudulent ECU) from interpreting a fraudulent frame and from performing a process corresponding to the frame. In addition, it is only required to receive the data frame up to the data field to perform determination, thereby making it possible to reduce bus traffic, compared to the case where determination is performed after the receipt of the latter part of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for judgment of a fraudulent frame can minimize the effect on the existing network configuration, resulting in the amount of processing and the amount of power consumption being reduced in the entire system.

Note that it may be switchable whether one or more fraud-sensing ECUs in the in-vehicle network system 11 described above are to perform sensing or not. Additionally, each fraud-sensing ECU may be configured not to sense a fraudulent message inly when the vehicle is in a certain state, for example, when a certain period has elapsed since the start of the use of the vehicle. This can keep the amount of power consumption low.

Third Embodiment

An embodiment of the present disclosure will now be described in the context of an in-vehicle network system 12 including a fraud-sensing ECU that implements an anti-fraud method for preventing a process based on a fraudulent frame from being executed on any other node (ECU) by using a message authentication code (MAC) calculated based on a message ID, data, and a counter value.

3.1 Overall Configuration of In-Vehicle Network System 12

Figure 24:
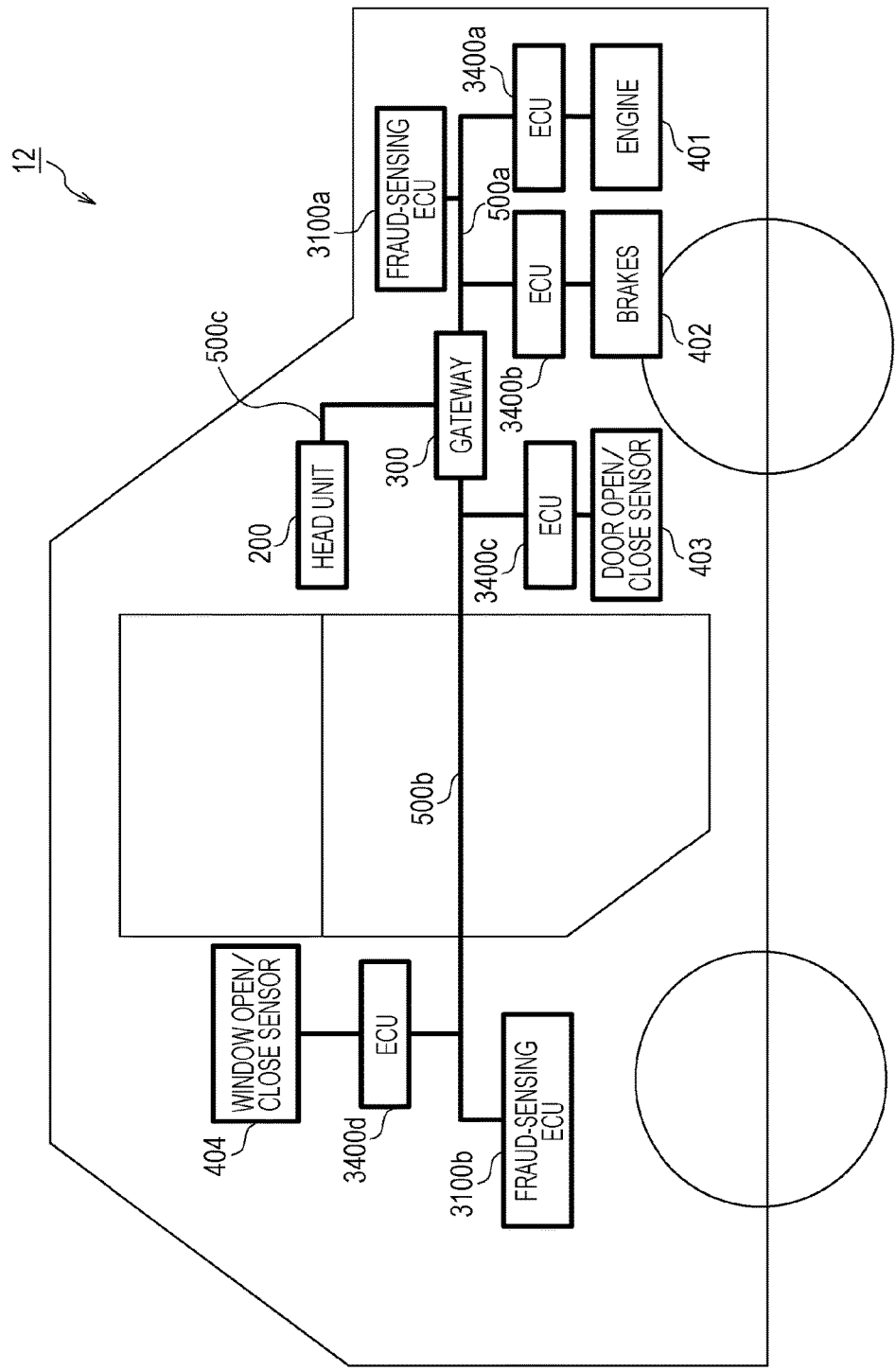
FIG. 24 is a diagram illustrating an overall configuration of an in-vehicle network system according to a third embodiment.

FIG. 24 is a diagram illustrating an overall configuration of an in-vehicle network system 12 according to a third embodiment. The in-vehicle network system 12 is obtained by partially modifying the in-vehicle network system 10 illustrated in the first embodiment. The in-vehicle network system 12 is configured to include buses 500a to 500c, fraud-sensing ECUs 3100a and 3100b, a head unit 200, a gateway 300, and nodes connected to the buses, called ECUs, such as ECUs 3400a to 3400d connected to various devices. Of the constituent elements of the in-vehicle network system 12, constituent elements having functions similar to those in the first embodiment are designated by the same numerals and are not described.

The fraud-sensing ECUs 3100a and 3100b are ECUs connected to the bus 500a and the bus 500b, respectively, and having a function of determining whether frames transmitted from the ECUs 3400a to 3400d, etc. are fraudulent or not and transmitting an error frame if the frames are fraudulent.

The ECUs 3400a to 3400d are each connected to any bus, and are connected to the engine 401, the brakes 402, the door open/close sensor 403, and the window open/close sensor 404, respectively. Each of the ECUs 3400a to 3400d obtains the state of the device connected thereto (such as the engine 401), and periodically transmits a data frame indicating the state to a network (that is, the bus). The data frame to be transmitted has a data field which is assigned a message authentication code (MAC) derived from a message ID, a data value, and a counter value incremented for each transmission through computation.

3.2 Configuration of ECU 3400a

Figure 25:
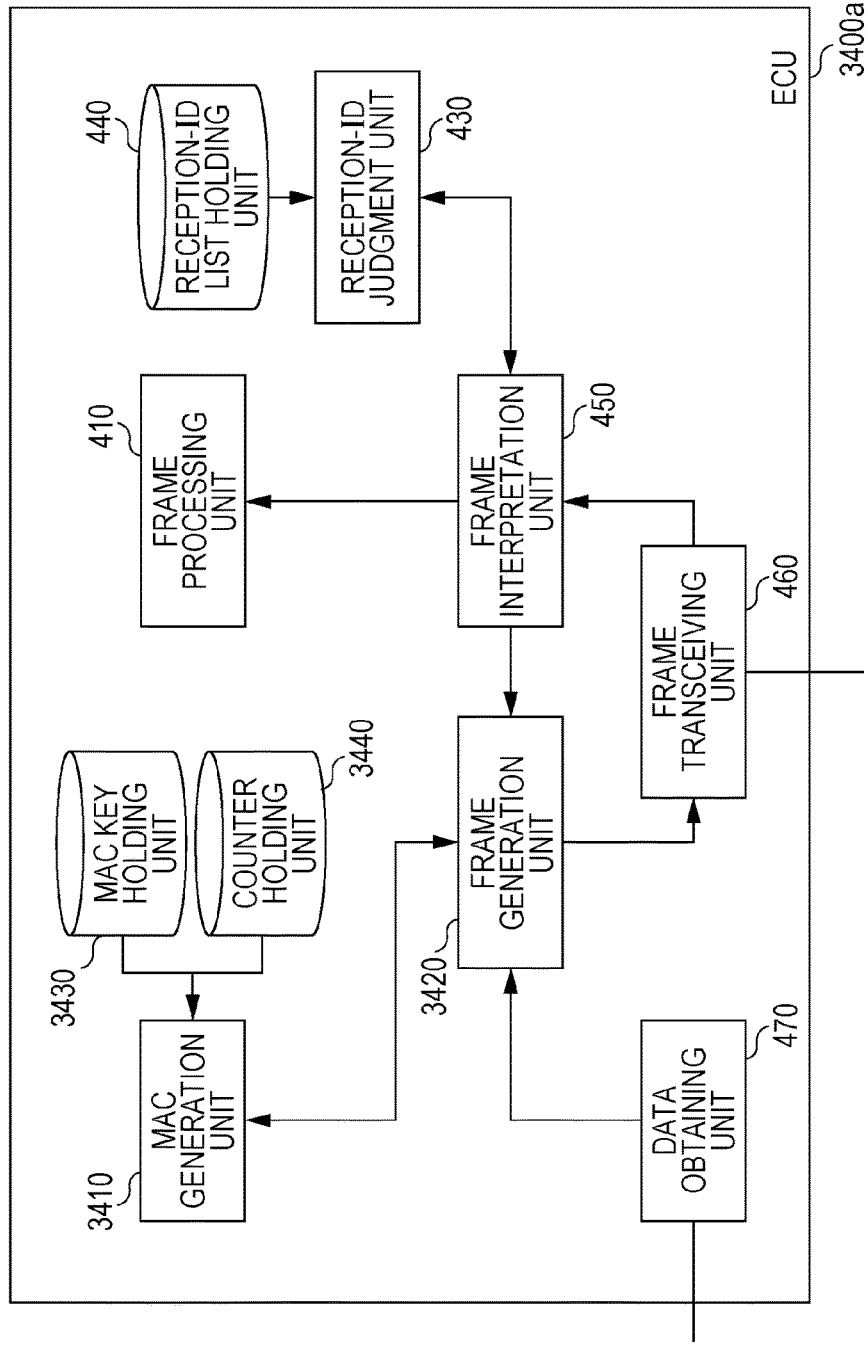
FIG. 25 is a configuration diagram of an ECU according to the third embodiment.

FIG. 25 is a configuration diagram of the ECU 3400a. The ECU 3400a is configured to include a frame transceiving unit 460, a frame interpretation unit 450, a reception-ID judgment unit 430, a reception-ID list holding unit 440, a frame processing unit 410, a frame generation unit 3420, a data obtaining unit 470, a MAC generation unit 3410, a MAC key holding unit 3430, and a counter holding unit 3440. These constituent elements are functional ones, and each of their functions is implemented by an element in the ECU 3400a, such as a communication circuit, a processor that executes a control program stored in a memory, or a digital circuit. The ECU 3400a is obtained by partially modifying the ECU 400a illustrated in the first embodiment, and constituent elements having functions similar to those in the first embodiment are designated by the same numerals and are not described.

The frame generation unit 3420 is obtained by partially modifying the frame generation unit 420 illustrated in the first embodiment. In accordance with a notification of instructions to transmit an error frame, which is sent from the frame interpretation unit 450, the frame generation unit 3420 forms an error frame and notifies the frame transceiving unit 460 of the error frame for transmission. Further, the frame generation unit 3420 notifies the MAC generation unit 3410 of the value of the data sent from the data obtaining unit 470 and a predetermined message ID, and receives a calculated MAC. The frame generation unit 3420 forms a frame in such a manner that the frame includes the predetermined message ID, the value of the data sent from the data obtaining unit 470, and the MAC received from the MAC generation unit 3410 (see FIG. 26), and notifies the frame transceiving unit 460 of the frame.

The MAC generation unit 3410 calculates (derives through computation) a MAC by using a MAC key held in the MAC key holding unit 3430 for a value (composite value) obtained by combining the message ID and the value of the data sent from the frame generation unit 3420 with a counter value held in the counter holding unit 3440, and notifies the frame generation unit 3420 of the MAC obtained as a result of the calculation. Here, HMAC (Hash-based Message Authentication Code) (see RFC 2104 HMAC: Keyed-Hashing for Message Authentication) is adopted as a MAC computation method, and the first 4 bytes of a value obtained as a result of the computation with a value obtained by padding the composite value described above to a predetermined block (for example, 4 bytes) using a MAC key are regarded as a MAC. While the composite value used for calculating a MAC uses here a message ID, the value of data, and a counter value held in the counter holding unit 3440, any one or a combination of two of these three values may be used to calculate a MAC.

The MAC key holding unit 3430 holds a MAC key necessary for computing a MAC.

The counter holding unit 3440 holds a counter value necessary for computing a MAC. The counter value is incremented each time a data frame is properly transmitted from the frame transceiving unit 460.

The ECUs 3400b to 3400d are obtained by partially modifying the ECUs 400b to 400d illustrated in the first embodiment, respectively, and each have a configuration basically similar to that of the ECU 3400a described above. However, the reception-ID list held in the reception-ID list holding unit 440 may have content different from one ECU to another. For example, the ECU 3400a and the ECU 3400b hold the reception-ID list illustrated by way of example in FIG. 9, and the ECU 3400c and the ECU 3400d hold the reception-ID list illustrated by way of example in FIG. 5. In addition, as illustrated in the first embodiment, the content of the process of the frame processing unit 410 differs from one ECU to another. The content of frames respectively transmitted from the ECUs 3400a to 3400d will now be described with reference to FIGS. 26 to 29.

3.3 Example Transmission Frame from Engine-Related ECU 3400a

FIG. 26 is a diagram illustrating an example of an ID (message ID) and a data field (data) in a data frame transmitted from the ECU 3400a connected to the engine 401. The ECU 3400a transmits a frame whose message ID is "1". In this figure, the data is delimited with spaces in blocks of 1 byte, in which the first 1 byte represents the average speed per hour (km/h), the following 1 byte represents the counter value, and the following 4 bytes represent the MAC. In the example illustrated in FIG. 26, the MAC is expressed in hexadecimal form. The average speed per hour (km/h) in the first 1 byte takes a value in the range from a minimum speed of 0 (km/h) to a maximum speed of 180 (km/h). FIG. 26 illustrates, from top to bottom, message IDs and data corresponding to frames transmitted sequentially from the ECU 3400a, by way of example, and depicts a gradual increase in counter value and acceleration, increasing the average speed per hour from 0 km/h in increments of 1 km/h.

3.4 Example Transmission Frame from Brake-Related ECU 3400b

FIG. 27 is a diagram illustrating an example of an ID (message ID) and a data field (data) in a data frame transmitted from the ECU 3400b connected to the brakes 402. The ECU 3400b transmits a frame whose message ID is "2". In this figure, the data is delimited with spaces in blocks of 1 byte, in which the first 1 byte represents the degree to which the brakes are applied, expressed as a percentage (%), the following 1 byte represents the counter value, and the following 4 bytes represent the MAC. In the example illustrated in FIG. 27, the MAC is expressed in hexadecimal form. In the degree to which the brakes are applied in the first 1 byte, a state where the brakes are not applied at all is represented by 0(%) and a state where the brakes are maximally applied is represented by 100(%). FIG. 27 illustrates, from top to bottom, message IDs and data corresponding to frames transmitted sequentially from the ECU 3400b, by way of example, and depicts a gradual increase in counter value and a gradual easing off of the brakes from 100%.

3.5 Example Transmission Frame from Door-Open/Close-Sensor-Related ECU 3400c

FIG. 28 is a diagram illustrating an example of an ID (message ID) and a data field (data) in a data frame transmitted from the ECU 3400c connected to the door open/close sensor 403. The ECU 3400c transmits a frame whose message ID is "3". In this figure, the data is delimited with spaces in blocks of 1 byte, in which the first 1 byte represents the open or closed state for the door, the following 1 byte represents the counter value, and the following 4 bytes represent the MAC. In the example illustrated in FIG. 28, the MAC is expressed in hexadecimal form. In the open or closed state for the door in the first 1 byte, the door-open state is represented by "1" and the door-closed state is represented by "0". FIG. 28 illustrates, from top to bottom, message IDs and data corresponding to frames transmitted sequentially from the ECU 3400c, by way of example, and depicts a gradual increase in counter value and a gradual transition from the door-open state to the closed state.

3.6 Example Transmission Frame from Window-Open/Close-Sensor-Related ECU 3400d

Figures 29, 30:
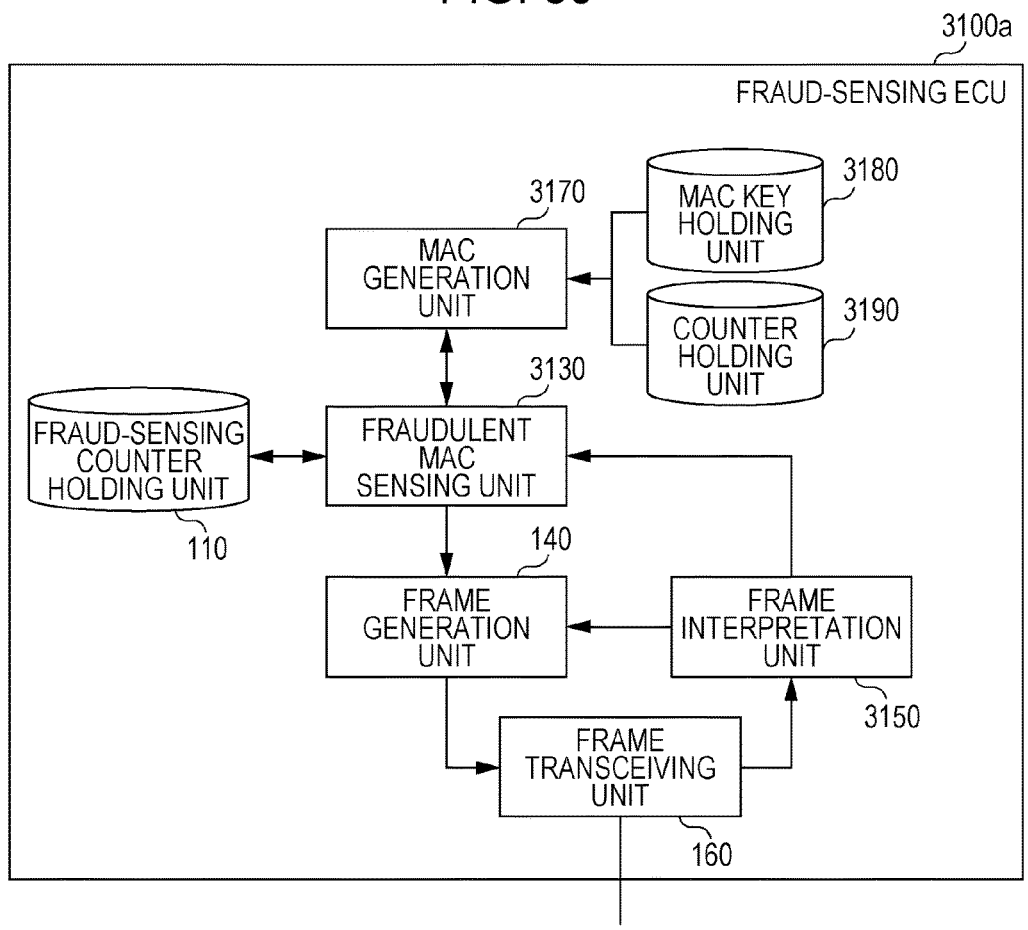
FIG. 29 is a diagram illustrating an example of an ID and a data field in a data frame transmitted from an ECU connected to a window open/close sensor.
FIG. 30 is a configuration diagram of a fraud-sensing ECU according to the third embodiment.

FIG. 29 is a diagram illustrating an example of an ID (message ID) and a data field (data) in a data frame transmitted from the ECU 3400d connected to the window open/close sensor 404. The ECU 3400d transmits a frame whose message ID is "4". In this figure, the data is delimited with spaces in blocks of 1 byte, in which the first 1 byte represents the open or closed state for the window, expressed as a percentage (%), the following 1 byte represents the counter value, and the following 4 bytes represent the MAC. In the example illustrated in FIG. 29, the MAC is expressed in hexadecimal form. In the open or closed state for the window in the first 1 byte, a state where the window is completely closed is represented by 0(%) and a state where the window is completely open is represented by 100(%). FIG. 29 illustrates, from top to bottom, message IDs and data corresponding to frames transmitted sequentially from the ECU 3400d, by way of example, and depicts a gradual increase in counter value and a gradual transition from the window-closed state to the open state.

3.7 Configuration of Fraud-Sensing ECU 3100a

FIG. 30 is a configuration diagram of the fraud-sensing ECU 3100a. The fraud-sensing ECU 3100a is constituted by a frame transceiving unit 160, a frame interpretation unit 3150, a fraudulent MAC sensing unit 3130, a MAC key holding unit 3180, a counter holding unit 3190, a frame generation unit 140, a MAC generation unit 3170, and a fraud-sensing counter holding unit 110. These constituent elements are functional ones, and each of their functions is implemented by an element in the fraud-sensing ECU 3100a, such as a communication circuit, a processor that executes a control program stored in a memory, or a digital circuit. The fraud-sensing ECU 3100a is obtained by partially modifying the fraud-sensing ECU 100a illustrated in the first embodiment, and constituent elements having functions similar to those in the first embodiment are designated by the same numerals and are not described. The fraud-sensing ECU 3100b also has a similar configuration.

The frame interpretation unit 3150 is obtained by modifying the frame interpretation unit 150 illustrated in the first embodiment, and is configured to receive values of a frame from the frame transceiving unit 160 and to interpret and map the values into the respective fields in the frame formats specified in the CAN protocol. The frame interpretation unit 3150 transfers a value (data) judged to correspond to the data field when the frame is judged to be a data frame, together with the ID (message ID) in the ID field, to the fraudulent MAC sensing unit 3130. Further, the frame interpretation unit 3150 notifies the frame generation unit 140 that the frame generation unit 140 is requested to transmit an error frame if the frame is judged not to comply with the CAN protocol. Further, when an error frame is received, that is, when an error frame is interpreted to have started from a value in the received frame, the frame interpretation unit 3150 discards the subsequent part of the frame, that is, aborts interpretation of the frame.

The fraudulent MAC sensing unit 3130 has a function of receiving the message ID and the value in the data field (data) sent from the frame interpretation unit 3150 and verifying the MAC in the data field. The fraudulent MAC sensing unit 3130 notifies the MAC generation unit 3170 of the message ID and the value in the data field, which have been sent, and obtains a MAC generated by the MAC generation unit 3170. The fraudulent MAC sensing unit 3130 determines whether or not the data in the data field meets a predetermined condition indicating a fraud. That is, the fraudulent MAC sensing unit 3130 functions as a so-called determination unit that determines whether or not the content of a predetermined field in a received frame meets a predetermined condition indicating a fraud. The predetermined condition indicating a fraud is failure of verification in a preset verification process procedure (a procedure including the generation of a MAC, the comparison of MACs, and so forth), that is, a condition in which the MAC included in the data does not match the MAC generated by the MAC generation unit 3170. The fraudulent MAC sensing unit 3130 compares the MAC obtained from the MAC generation unit 3170 with the MAC in the data field to determine whether or not a fraud has occurred (that is, verify the MAC). If a match is not found as a result of the comparison between the values of the two MACs, the fraudulent MAC sensing unit 3130 notifies the fraud-sensing counter holding unit 110 of the received message ID in order to increment the number of times a fraud has been sensed. The control performed to, when the number of times a fraud has been sensed reaches a certain number or more, transmit an error display message so that the error display message can be received by the head unit 200 has been described in the first embodiment, and is not described here. If a match is not found as a result of the comparison between the values of the two MACs, furthermore, the fraudulent MAC sensing unit 3130 notifies the frame generation unit 140 that the frame generation unit 140 is requested to transmit an error frame. If a match is found as a result of the comparison between the MAC values, the fraudulent MAC sensing unit 3130 notifies the MAC generation unit 3170 that the MAC generation unit 3170 is requested to increment the counter value corresponding to the message ID, which is held in the counter holding unit 3190.

The MAC generation unit 3170 obtains the corresponding MAC key from the MAC key holding unit 3180 by using the message ID sent from the fraudulent MAC sensing unit 3130, and obtains the corresponding counter from the counter holding unit 3190. The MAC generation unit 3170 calculates (derives through computation) a MAC by using the MAC key obtained from the MAC key holding unit 3180 for the value in the data field (the value in the first 1 byte) sent from the fraudulent MAC sensing unit 3130 and the counter value obtained from the counter holding unit 3190, and notifies the fraudulent MAC sensing unit 3130 of the calculated MAC. The fraud-sensing ECUs 3100a and 3100b and the ECUs 3400a to 3400d use the same algorithm to calculate a MAC by using a MAC key.

The MAC key holding unit 3180 holds a MAC key necessary for computing a MAC in association with each message ID. The MAC keys held in the MAC key holding unit 3180 have different values for the respective message IDs associated therewith. If it is assumed that a single transmitting node transmits frames each corresponding to one of a plurality of message IDs, MAC keys used for ECUs and fraud-sensing ECUs may be keys different for each transmitting node. The MAC keys may also be configured such that, for example, the same value is used for frames to be transmitted on the same bus, the same key (value) is used even on different buses, the same key is used per vehicle, the same key is used for the same type of vehicle, the same key is used for each same producer, or the same key is used for different producers.

The counter holding unit 3190 holds, for each message ID, a counter value necessary for computing a MAC value. The counter value is incremented when a frame is properly received (that is, when the MACs match as a result of comparison by the fraudulent MAC sensing unit 3130).

3.8 Example of Counter Values

Figure 31:
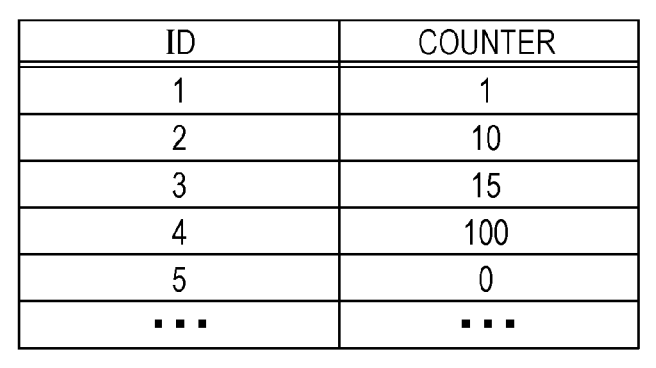

FIG. 31 is a diagram illustrating an example of counter values for the individual message IDs held in the counter holding unit 3190. In this figure, the counter whose message ID is "1" indicates 1 count, the counter whose message ID is "2" indicates 10 counts, the counter whose message ID is "3" indicates 15 counts, and the counter whose message ID is "4" indicates 100 counts. The counter value corresponding to each of the message IDs represents the number of times a frame including the message ID has been properly received.

3.9 Sequence for Fraudulent-Frame Sensing

A description will now be given of the operation of the fraud-sensing ECU 3100a, the ECU 3400a, the ECU 3400b, the gateway 300, and so forth connected to the bus 500a in the in-vehicle network system 12 having the configuration described above in a case where a fraudulent ECU is connected to the bus 500a.

Figure 32:
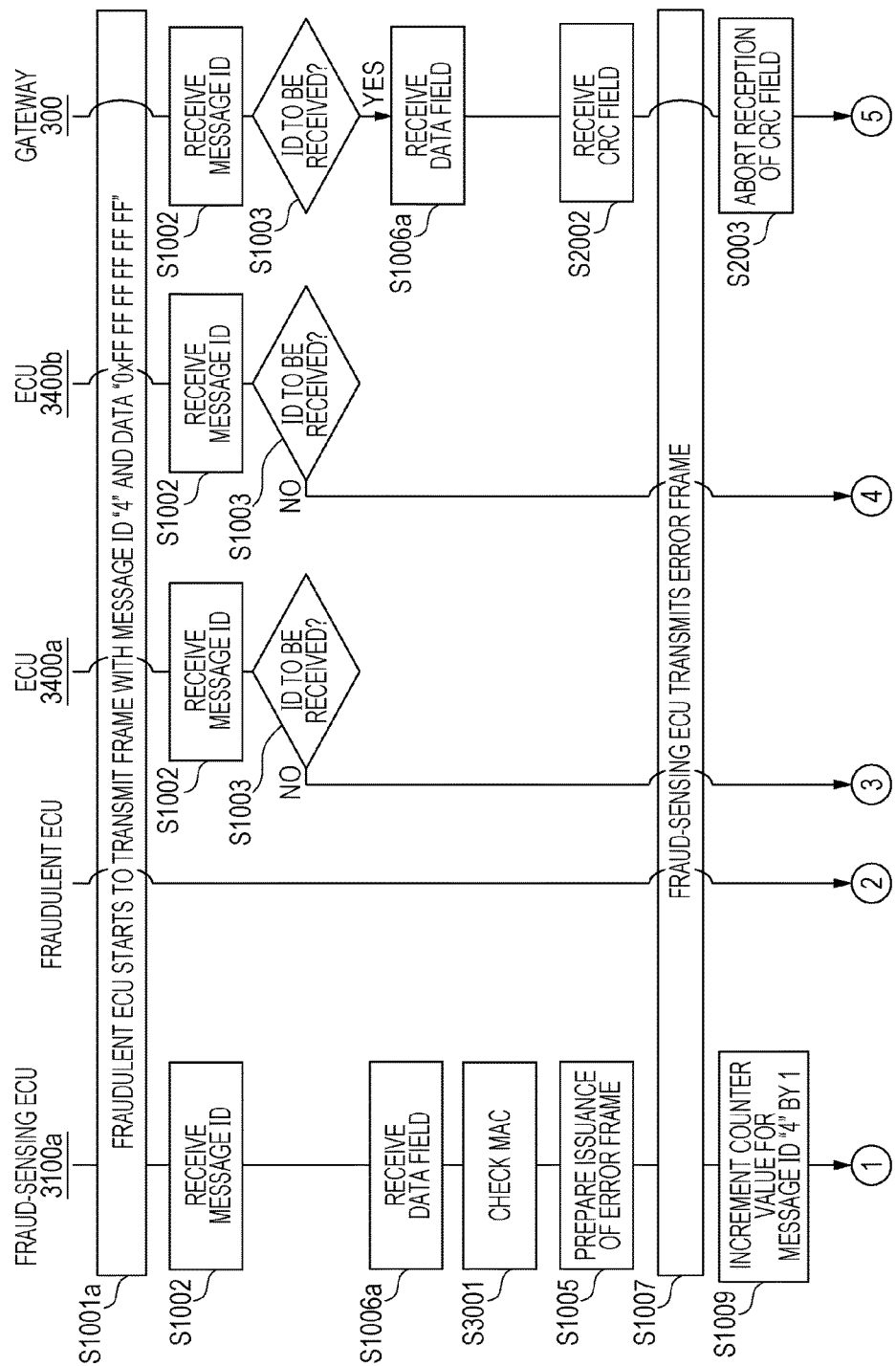
FIG. 32 is a sequence diagram illustrating an example operation for sensing a fraudulent frame and preventing execution of the fraudulent frame in the third embodiment (continued in FIG. 33)
Figure 33:
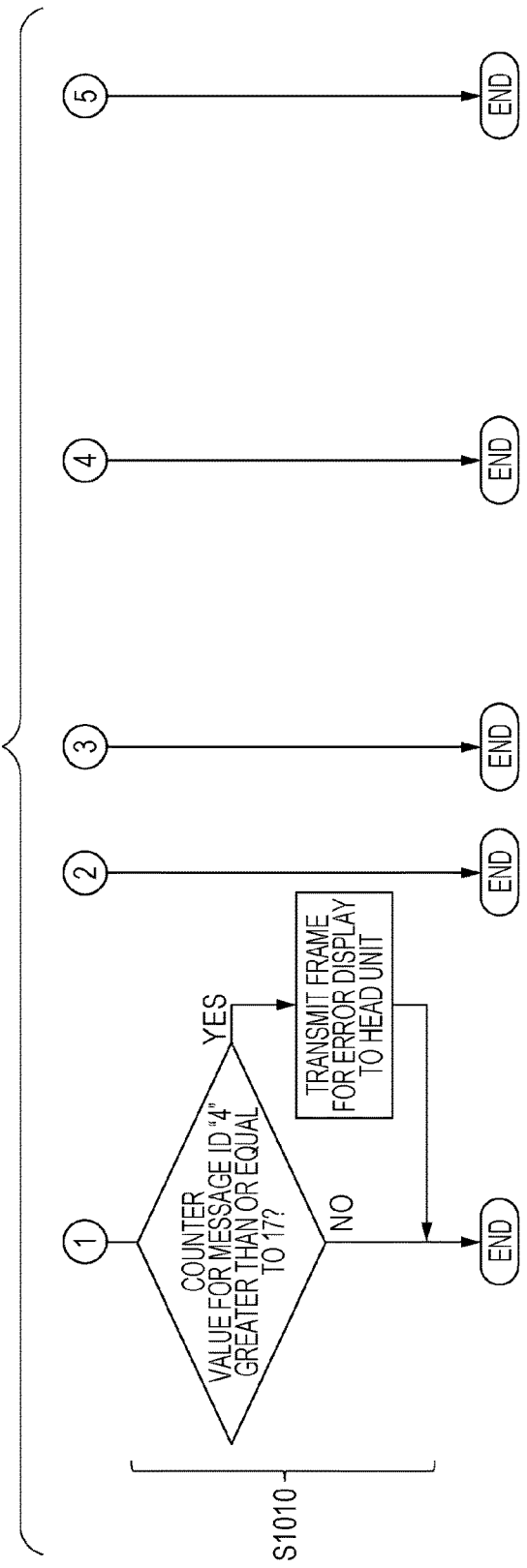
FIG. 33 is a sequence diagram illustrating an example operation for sensing a fraudulent frame and preventing execution of the fraudulent frame in the third embodiment (continued from FIG. 32)

FIG. 32 and FIG. 33 illustrate a sequence diagram illustrating an example operation for, in response to sensing of a fraudulent frame (message) by the fraud-sensing ECU 3100a, preventing any other ECU from performing a process corresponding to the fraudulent frame. In FIG. 32 and FIG. 33, as in FIG. 18 given in the first embodiment and FIG. 22 and FIG. 23 given in the second embodiment, an example is illustrated in which a fraudulent ECU is connected to the bus 500a. This fraudulent ECU transmits a data frame whose message ID is "4" and data field (data) is "0xFF FF FF FF FF FF" (6 bytes). The same sequences as the sequences illustrated in the first embodiment or 2 are designated by the same numerals, and are described here in a simplified way.

First, a fraudulent ECU starts to transmit the fraudulent data frame described above (sequence S1001a). Each of the fraud-sensing ECU 3100a, the ECU 3400a, the ECU 3400b, and the gateway 300 receives a message ID (sequence S1002). Each of the ECU 3400a, the ECU 3400b, and the gateway 300 checks the message ID by using the reception-ID list held therein (sequence S1003). The ECU 3400a and the ECU 3400b terminate reception since the respectively held reception-ID lists do not include "4" (see FIG. 9). The gateway 300 continues reception and receives the data field since the held reception-ID list includes "4" (see FIG. 5) (sequence S1006a). Likewise, the fraud-sensing ECU 3100a also receives the data field (sequence S1006a).

Subsequently to sequence S1006a, the fraud-sensing ECU 3100a verifies (checks) the MAC included in the data in the data field (sequence S3001). That is, the fraud-sensing ECU 3100a determines whether or not the content of the ID field in the transmitted frame meets a predetermined condition (failure of verification of the MAC) indicating a fraud. The fraud-sensing ECU 3100a verifies the MAC by comparing the MAC, which is the last 4 bytes for the 6-byte data "0xFF FF FF FF FF FF" in the data field in the data frame transmitted from the fraudulent ECU, with a MAC determined by using the MAC key and the counter corresponding to the message ID "4". Here, a match is not found as a result of the comparison and verification fails. Thus, the fraud-sensing ECU 3100a judges that the data frame is fraudulent, and then starts to prepare the issuance of an error frame (sequence S1005).

While the fraud-sensing ECU 3100a is preparing the issuance of an error frame, the gateway 300 starts the reception of the CRC field (sequence S2002).

Then, the preparation of the issuance of an error frame is completed, and the fraud-sensing ECU 3100a transmits an error frame (sequence S1007). The transmission of the error frame is started, thus allowing the middle part of the CRC sequence in the frame being transmitted from the fraudulent ECU to be overwritten with the error frame on the bus 500a.

The gateway 300 which has received the error frame transmitted in sequence S1007 aborts reception of the data frame being transmitted from the fraudulent ECU during the reception of the CRC field including the CRC sequence (sequence S2003).

The fraud-sensing ECU 3100a increments the fraud-sensing counter corresponding to the ID "4" of the data frame for which the error frame has been transmitted (sequence S1009). If the fraud-sensing counter corresponding to the ID "4" becomes greater than or equal to 17 as a result of the increment, the fraud-sensing ECU 3100a transmits an error display message (sequence S1010).

3.10 Advantageous Effects of Third Embodiment

A fraud-sensing ECU illustrated in the third embodiment determines whether a transmitted frame is a fraudulent frame or not by verifying a MAC included in a data field of a frame (data frame). This can prevent existing ECUs (that is, ECUs other than a fraud-sensing ECU and a fraudulent ECU) from interpreting a fraudulent frame and from performing a process corresponding to the frame. In addition, it is only required to receive the data frame up to the data field to perform determination, thereby making it possible to reduce bus traffic, compared to the case where determination is performed after the receipt of the latter part of the data frame.

In addition, the fraud-sensing ECU counts the number of times an error frame has been transmitted, by using fraud-sensing counters, and can thus detect that a transmission error counter in a node that transmits a fraudulent message ID has reached an upper limit value at which the transition to the passive state is required according to the CAN protocol in response to receipt of an error frame. This makes it possible to determine whether or not a node that transmits a fraudulent message ID is compatible with the specification of an error counter in the CAN protocol.

In addition, the use of only a fraud-sensing ECU as a node for the verification of a MAC can eliminate the need for an ECU other than the fraud-sensing ECU to perform verification, resulting in the amount of processing and the amount of power consumption being reduced in the entire system.

Note that it may be switchable whether one or more fraud-sensing ECUs in the in-vehicle network system 12 described above are to perform sensing or not. Additionally, each fraud-sensing ECU may be configured not to sense a fraudulent message inly when the vehicle is in a certain state, for example, when a certain period has elapsed since the start of the use of the vehicle. This can keep the amount of power consumption low.

Fourth Embodiment

An embodiment of the present disclosure will now be described in the context of an in-vehicle network system 13 that implements a fraud sensing method for switching the operation mode of a fraud-sensing ECU as to whether or not to perform a specific sensing process for sensing a fraudulent message (frame) in accordance with the state of the vehicle.

4.1 Overall Configuration of In-Vehicle Network System 13

Figure 34:
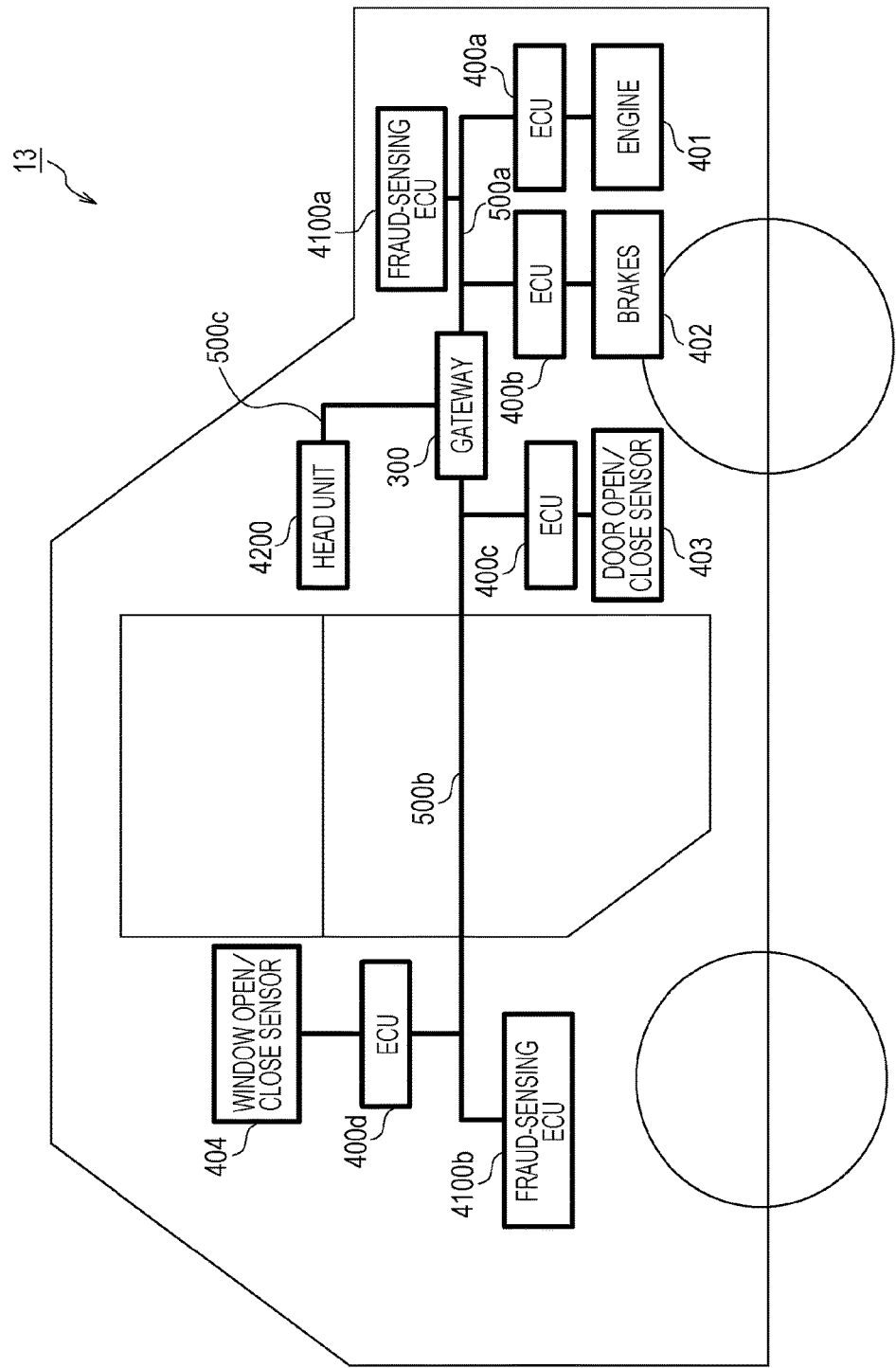
FIG. 34 is a diagram illustrating an overall configuration of an in-vehicle network system according to a fourth embodiment.

FIG. 34 is a diagram illustrating an overall configuration of an in-vehicle network system 13 according to a fourth embodiment. The in-vehicle network system 13 is obtained by partially modifying the in-vehicle network system 10 illustrated in the first embodiment. The in-vehicle network system 13 is configured to include buses 500a to 500c, fraud-sensing ECUs 4100a and 4100b, a head unit 4200, a gateway 300, and nodes connected to the buses, called ECUs, such as ECUs 400a to 400d connected to various devices. Of the constituent elements of the in-vehicle network system 13, constituent elements having functions similar to those in the first embodiment are designated by the same numerals and are not described.

The fraud-sensing ECUs 4100a and 4100b are ECUs connected to the bus 500a and the bus 500b, respectively, and having a function of determining whether frames (messages) transmitted from the ECUs 400a to 400d, etc. are fraudulent or not and transmitting an error frame if the frames are fraudulent. The fraud-sensing ECUs 4100a and 4100b are obtained by partially modifying the fraud-sensing ECUs 100a and 100b illustrated in the first embodiment, respectively. The fraud-sensing ECUs 4100a and 4100b have, as operation modes, a check mode (sensing mode) in which it is determined whether frames (messages) transmitted from the ECUs 400a to 400d are fraudulent or not, and a standby mode in which it is not determined whether frames (message) transmitted from the ECUs 400a to 400d are fraudulent or not. Further, the fraud-sensing ECUs 4100a and 4100b have a function of switching the operation mode in response to instructions (trigger frame) from the head unit 4200. The trigger frame is a switching instruction message that triggers switching of the operation mode. When the operation mode is switched to the standby mode, a certain process related to the sensing of a fraudulent message is not performed, making effects, such as a reduced amount of processing and reduced power consumption, more feasible than in the check mode.

The head unit 4200 has a function of transmitting and receiving a frame, and a function of receiving frames transmitted from the ECUs 400a to 400d and displaying various states on a display (not illustrated) to present the states to a user. The head unit 4200 is obtained by partially modifying the head unit 200 illustrated in the first embodiment. The head unit 4200 has a function of determining whether, for example, frames transmitted from the ECUs 400a to 400d are fraudulent or not and instructing the fraud-sensing ECUs 4100a and 4100b to switch to the check mode if a fraudulent frame is transmitted. That is, the head unit 4200 has a function of, when the state of the vehicle satisfies a certain condition, transmitting a trigger frame to the fraud-sensing ECUs 4100a and 4100b to give instructions to change the operation mode. The certain condition is a condition for determining the possibility of occurrence of an event that influences the need for a fraud-sensing ECU to sense a fraudulent message. Examples of the certain condition for switching the operation mode to the check mode include a case where the transmission of a fraudulent message is sensed in an in-vehicle network system installed in a vehicle, a case where the use of the vehicle is started, and a case where communication with a device outside the vehicle is ready to be started. Examples of the certain condition for switching the operation mode to the standby mode include one or a combination of a case where no fraudulent message is sensed within a certain period, a case where a certain period of time has elapsed since a vehicle started to be used, and a case where a certain state has been entered after the communication with a device outside the vehicle has been completed.

In this embodiment, it is assumed that the gateway 300 transfers a trigger frame between the buses 500a to 500c.

4.2 Configuration of Head Unit 4200

Figure 35:
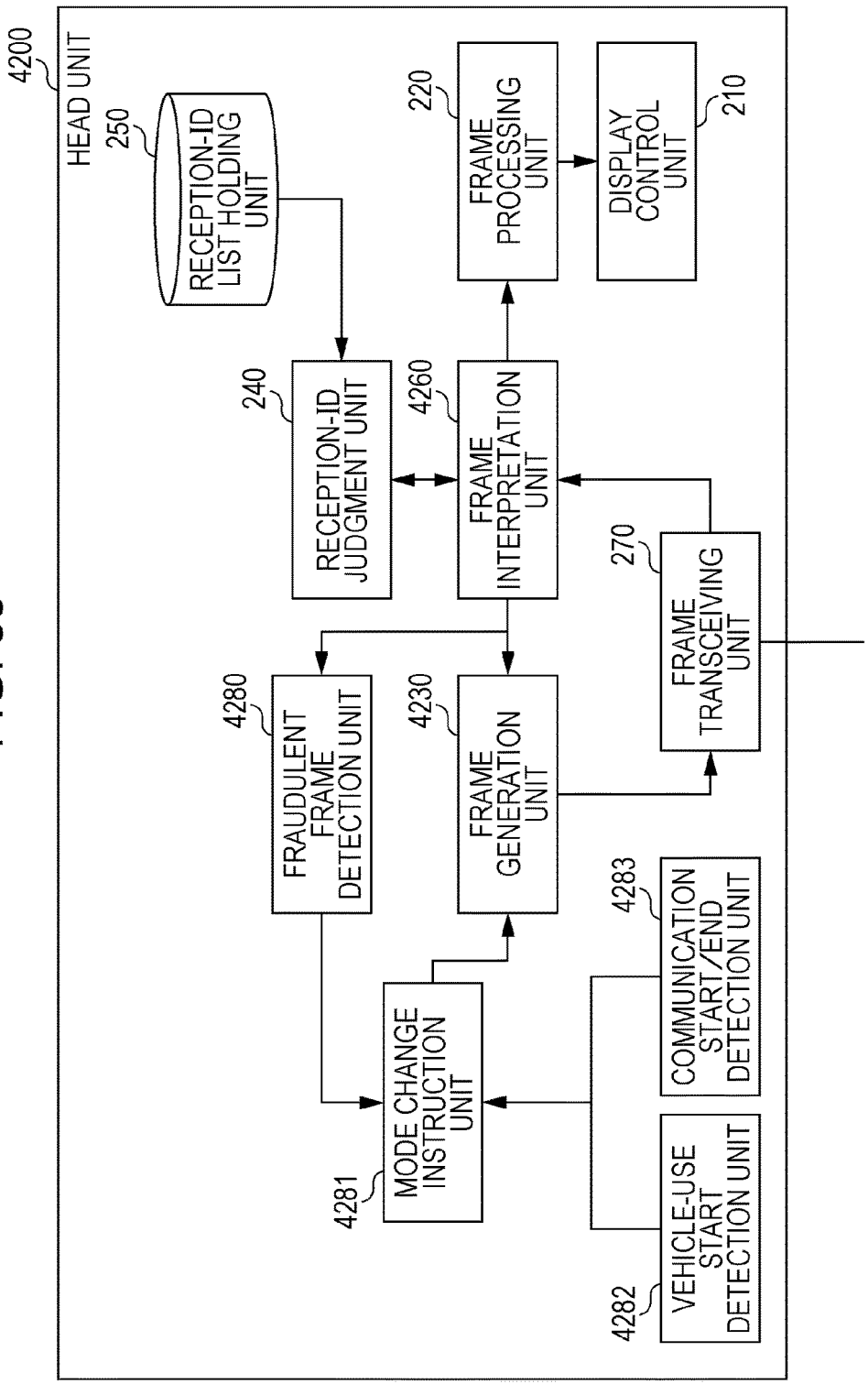
FIG. 35 is a configuration diagram of a head unit according to the fourth embodiment.

FIG. 35 is a configuration diagram of the head unit 4200. The head unit 4200 is configured to include a frame transceiving unit 270, a frame interpretation unit 4260, a reception-ID judgment unit 240, a reception-ID list holding unit 250, a frame processing unit 220, a display control unit 210, a frame generation unit 4230, a fraudulent frame detection unit 4280, a mode change instruction unit 4281, a vehicle-use start detection unit 4282, and a communication start/end detection unit 4283. These constituent elements are functional ones, and each of their functions is implemented by an element in the head unit 4200, such as a communication circuit, an LCD, a processor that executes a control program stored in a memory, or a digital circuit. Constituent elements having functions similar to those in the first embodiment are designated by the same numerals and are not described.

The frame interpretation unit 4260 is obtained by partially modifying the frame interpretation unit 260 illustrated in the first embodiment. The frame interpretation unit 4260 receives values of a frame from the frame transceiving unit 270, and interprets and maps the values into the respective fields in the frame formats specified in the CAN protocol. The frame interpretation unit 4260 transfers a value judged to correspond to the ID field to the reception-ID judgment unit 240. In accordance with a determination result sent from the reception-ID judgment unit 240, the frame interpretation unit 4260 determines whether to transfer the value in the ID field and the data field that appears after the ID field to the frame processing unit 220 and the fraudulent frame detection unit 4280 or to abort reception of the frame (that is, abort interpretation of the frame) after the determination result has been received. Further, the frame interpretation unit 4260 notifies the frame generation unit 4230 that the frame generation unit 4230 is requested to transmit an error frame if the frame is judged not to comply with the CAN protocol. Further, when an error frame is received, that is, when an error frame is interpreted to have started from a value in the received frame, the frame interpretation unit 4260 discards the subsequent part of the frame, that is, aborts interpretation of the frame. For example, in a case where an error frame is interpreted to have started in the middle of the data frame, the interpretation of the data frame is aborted and a particular process is not performed according to the data frame.

The frame transceiving unit 270 transmits and receives a frame compliant with the CAN protocol to and from the bus 500c. The frame transceiving unit 270 receives a frame from the bus 500c bit-by-bit, and transfers the frame to the frame interpretation unit 4260. Further, the frame transceiving unit 270 transmits the content of a frame of which the frame transceiving unit 270 has been notified by the frame generation unit 4230 to the bus 500c bit-by-bit.

The reception-ID judgment unit 240 receives the value in the ID field sent from the frame interpretation unit 4260, and determines whether or not to receive the respective fields of the frame after the ID field, in accordance with a list of message IDs held in the reception-ID list holding unit 250. The reception-ID judgment unit 240 notifies the frame interpretation unit 4260 of the determination result.

Similarly to the frame generation unit 230 in the first embodiment, in accordance with a notification of instructions from the frame interpretation unit 4260 to transmit an error frame, the frame generation unit 4230 forms an error frame and notifies the frame transceiving unit 270 of the error frame for transmission. In addition, in accordance with a request from the mode change instruction unit 4281 to transmit a trigger frame, the frame generation unit 4230 forms a trigger frame and notifies the frame transceiving unit 270 of the trigger frame for transmission.

The fraudulent frame detection unit 4280 receives the value in the ID field and the value in the data field sent from the frame interpretation unit 4260, and detects a fraudulent frame when the fraudulent frame is transmitted on the bus 500c. Upon detecting a fraudulent frame, the fraudulent frame detection unit 4280 requests the mode change instruction unit 4281 to notify the fraud-sensing ECUs 4100a and 4100b of instructions to transition to the check mode. If no fraudulent frame is detected within a certain period after the request for a notification of instructions to transition to the check mode, the fraudulent frame detection unit 4280 may request the mode change instruction unit 4281 to notify the fraud-sensing ECUs 4100a and 4100b of instructions to transition to the standby mode. The method by which the fraudulent frame detection unit 4280 detects a fraudulent frame is the same as the method of the fraudulent frame sensing unit 130 in the first embodiment, for example. Alternatively, for example, the method by which the fraudulent frame detection unit 4280 detects a fraudulent frame may be the same as the method of the fraudulent frame sensing unit 2130 in the second embodiment or the method of the fraudulent MAC sensing unit 3130 in the third embodiment, or may be any other method.

The mode change instruction unit 4281 has a function of requesting the frame generation unit 4230 to transmit a trigger frame to the fraud-sensing ECUs 4100a and 4100b to instruct the fraud-sensing ECUs 4100a and 4100b to change their operation mode. When the state of the vehicle satisfies a certain condition, the mode change instruction unit 4281 requests the frame generation unit 4230 to transmit a trigger frame, in response to a request from the fraudulent frame detection unit 4280, the vehicle-use start detection unit 4282, or the communication start/end detection unit 4283. The trigger frame is a switching instruction message that triggers switching the operation mode of a fraud-sensing ECU. Trigger frames include a trigger frame for providing instructions to transition from the standby mode to the check mode, and a trigger frame for providing instructions to transition from the check mode to the standby mode, and both are identified by, for example, a message ID in the ID field, an identifier provided in the data field, or the like. When a trigger frame is transmitted, the gateway 300 transfers the trigger frame between buses and each fraud-sensing ECU receives the trigger frame.

The vehicle-use start detection unit 4282 detects the start of the use of the vehicle, and requests the mode change instruction unit 4281 to notify the fraud-sensing ECUs 4100a and 4100b of instructions to transition to the check mode. The vehicle-use start detection unit 4282 achieves the detection of the start of the use of the vehicle by, for example, sensing the release of door lock, the opening of a door, the activation of the engine, or the like by using a message or the like from each ECU. Consequently, for example, if a fraudulent ECU is installed in a vehicle parked in a parking space, thereafter, when the vehicle starts to be used, the fraud-sensing ECUs 4100a and 4100b are brought into the check mode so that the fraudulent ECU can be detected. Even before the start of the use of the vehicle, the in-vehicle network system can be put into operation if power is supplied from the battery or the like. Further, the vehicle-use start detection unit 4282 detects the passage of a certain period of time after the start of the use of the vehicle has been detected, and requests the mode change instruction unit 4281 to notify the fraud-sensing ECUs 4100a and 4100b of instructions to transition to the standby mode. The certain period of time is a period of time (for example, several minutes) longer than expected to be required for a fraudulent ECU to transmit a fraudulent message after the start of the use of the vehicle if the fraudulent ECU has been connected to a bus in the in-vehicle network system before the start of the use of the vehicle.

The communication start/end detection unit 4283 detects that the head unit 4200 has started communicating with the outside, and requests the mode change instruction unit 4281 to notify the fraud-sensing ECUs 4100a and 4100b of instructions to transition to the check mode. Consequently, for example, if a fraudulent frame is fraudulently transmitted on a bus in the in-vehicle network system from the outside through communication via the head unit 4200, the fraud can be detected by the fraud-sensing ECUs 4100a and 4100b that are in the check mode. It is anticipated that communication from the outside might cause a control program for the head unit 4200 to be fraudulently rewritten and cause the fraudulent frame detection unit 4280, the mode change instruction unit 4281, etc. to malfunction. Instructing the fraud-sensing ECUs 4100a and 4100b to transition to the check mode before communication with the outside makes a fraudulent frame detectable even if the fraudulent frame detection unit 4280, the mode change instruction unit 4281, or the like is subjected to malfunction. Further, the communication start/end detection unit 4283 detects that the head unit 4200 has entered a certain state after communication with the outside has been completed, and requests the mode change instruction unit 4281 to notify the fraud-sensing ECUs 4100a and 4100b of instructions to transition to the standby mode. The certain state after communication with the outside has been completed is, for example, a state where communication with the outside has been completed. The certain state after communication with the outside has been completed may also be a state where a certain period of time has elapsed since communication with the outside was completed. This can address a situation such as the transmission of a fraudulent frame after the completion of communication with the outside in accordance with a control program which has been fraudulently rewritten through the communication with the outside. In this case, the certain period of time is a period of time (for example, several minutes) longer than expected to be required for a fraudulent message to be transmitted through the execution of a fraudulent program after communication with the outside has been completed in a case where the fraudulent program or the like is supplied from the outside through communication with the outside.

The mode change instruction unit 4281 may cooperate with the fraudulent frame detection unit 4280, the vehicle-use start detection unit 4282, and the communication start/end detection unit 4283 to request the frame generation unit 4230 to transmit a trigger frame for providing instructions to transition to the standby mode only in a situation where no fraudulent message is sensed within a certain period, a situation where a certain period of time has elapsed since the start of the use of the vehicle, and a situation where the vehicle has entered a certain state after communication with a device outside the vehicle has been completed. The mode change instruction unit 4281 may hold a predetermined rule that is a standard for judgment of what condition is to be satisfied in accordance with the state of the vehicle in order to request transmission of a trigger frame. The rule may be constituted by a single rule or plural rules. In addition, the rule may be set at the time of the shipment of the head unit 4200, at the time of the shipment of a vehicle in which the in-vehicle network system is to be installed, at the time of sale, or the like. The head unit 4200 may obtain and update the rule from the outside through communication. Alternatively, the head unit 4200 may be configured such that a recording medium that holds the rule is removably set in the head unit 4200. The rule may be based on the assumption that states such as being parked, stopped, filled, charged, and communicating with the outside are sensed as the states of the vehicle. Only a specific fraud-sensing ECU may be instructed to change the operation mode, by operation such as making the content of a trigger frame (for example, in the data field) include, for example, information identifying individual fraud-sensing ECUs. For example, a rule may be set in which it is judged that a trigger frame for instructing only the fraud-sensing ECU 4100b to transition to the check mode is transmitted when a fraudulent frame is detected while the vehicle is parked and is communicating with the outside and when a request is sent from the fraudulent frame detection unit 4280 to notify the fraud-sensing ECUs 4100a and 4100b of instructions to transition to the check mode. This is an example of a rule based on the consideration that a fraudulent frame that might influence the operation of the engine 401 or the brakes 402 will not be transmitted while the vehicle is parked or, even if a fraudulent frame is transmitted, no problem will occur so long as the vehicle is parked. In a case where a trigger frame is configured to instruct a specific fraud-sensing ECU to change the operation mode, the gateway 300 may transfer the trigger frame only to a bus necessary to transmit the trigger frame to the specific fraud-sensing ECU.

4.3 Configuration of Fraud-Sensing ECU 4100a

Figure 36:
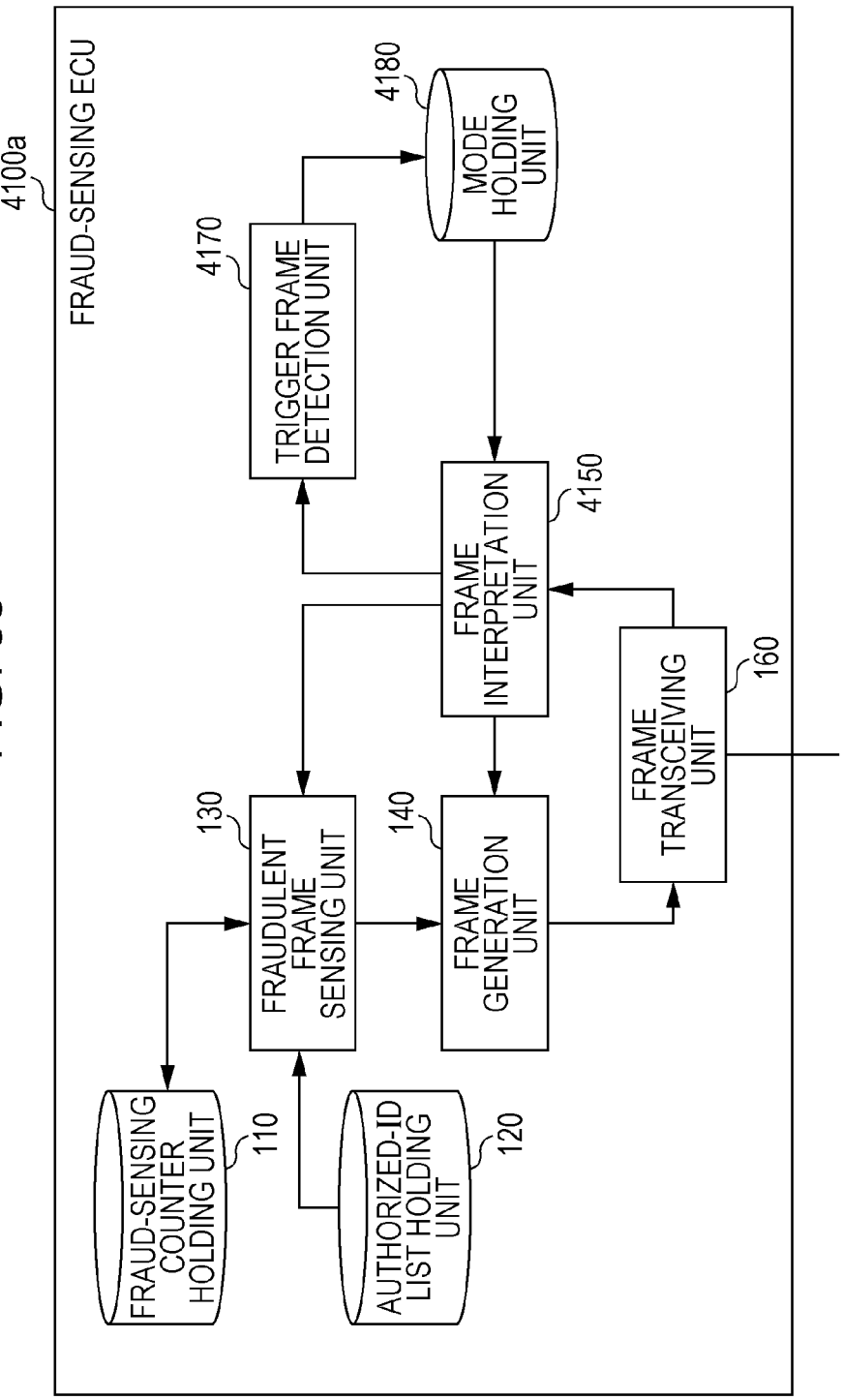
FIG. 36 is a configuration diagram of a fraud-sensing ECU according to the fourth embodiment.

FIG. 36 is a configuration diagram of the fraud-sensing ECU 4100a. The fraud-sensing ECU 4100a is configured to include a frame transceiving unit 160, a frame interpretation unit 4150, a fraudulent frame sensing unit 130, an authorized-ID list holding unit 120, a fraud-sensing counter holding unit 110, a frame generation unit 140, a trigger frame detection unit 4170, and a mode holding unit 4180. These constituent elements are functional ones, and each of their functions is implemented by an element in the fraud-sensing ECU 4100a, such as a communication circuit, a processor that executes a control program stored in a memory, or a digital circuit. Constituent elements having functions similar to those in the first embodiment are designated by the same numerals and are not described. The fraud-sensing ECU 4100b also has a configuration basically similar to that described above.

Similarly to the frame interpretation unit 150 in the first embodiment, the frame interpretation unit 4150 receives values of a frame from the frame transceiving unit 160, and interprets and maps the values into the respective fields in the frame formats specified in the CAN protocol. Further, the frame interpretation unit 4150 obtains the operation mode of the fraud-sensing ECU 4100a from the mode holding unit 4180, and judges the transfer destination of the received values of the frame in accordance with the operation mode. For example, when the fraud-sensing ECU 4100a is in the check mode, the frame interpretation unit 4150 transfers the value in the ID field to the fraudulent frame sensing unit 130 and the trigger frame detection unit 4170, and transfers the value in the data field subsequent to the ID field to the trigger frame detection unit 4170. When the fraud-sensing ECU 4100a is in the standby mode, the frame interpretation unit 4150 transfers the value in the ID field and the value in the subsequent data field to only the trigger frame detection unit 4170. This allows the fraudulent frame sensing unit 130 to sense a fraud only when the operation mode is the check mode. That is, the process related to the sensing of a fraud by the fraudulent frame sensing unit 130 is not performed when the operation mode is the standby mode.

The trigger frame detection unit 4170 judges whether or not the frame received by the fraud-sensing ECU 4100a matches the trigger frame transmitted from the head unit 4200. If the frame received by the fraud-sensing ECU 4100a is the trigger frame, the trigger frame detection unit 4170 records the check mode or the standby mode, serving as an operation mode, on the mode holding unit 4180. That is, if the received frame is a trigger frame that provides instructions to transition from the standby mode to the check mode, the trigger frame detection unit 4170 records the check mode. If the received frame is a trigger frame that provides instructions to transition from the check mode to the standby mode, the trigger frame detection unit 4170 records the standby mode.

The mode holding unit 4180 has a function of holding which of the standby mode and the check mode the operation mode of the corresponding device (the fraud-sensing ECU 4100a) is, in a storage medium such as a memory.

4.4 Sequence for Transition to Check Mode

A description will now be given of the operation of the head unit 4200 and the fraud-sensing ECU 4100a when a fraudulent frame (message) is transmitted on the bus 500c in the in-vehicle network system 13 having the configuration described above.

Figure 37:
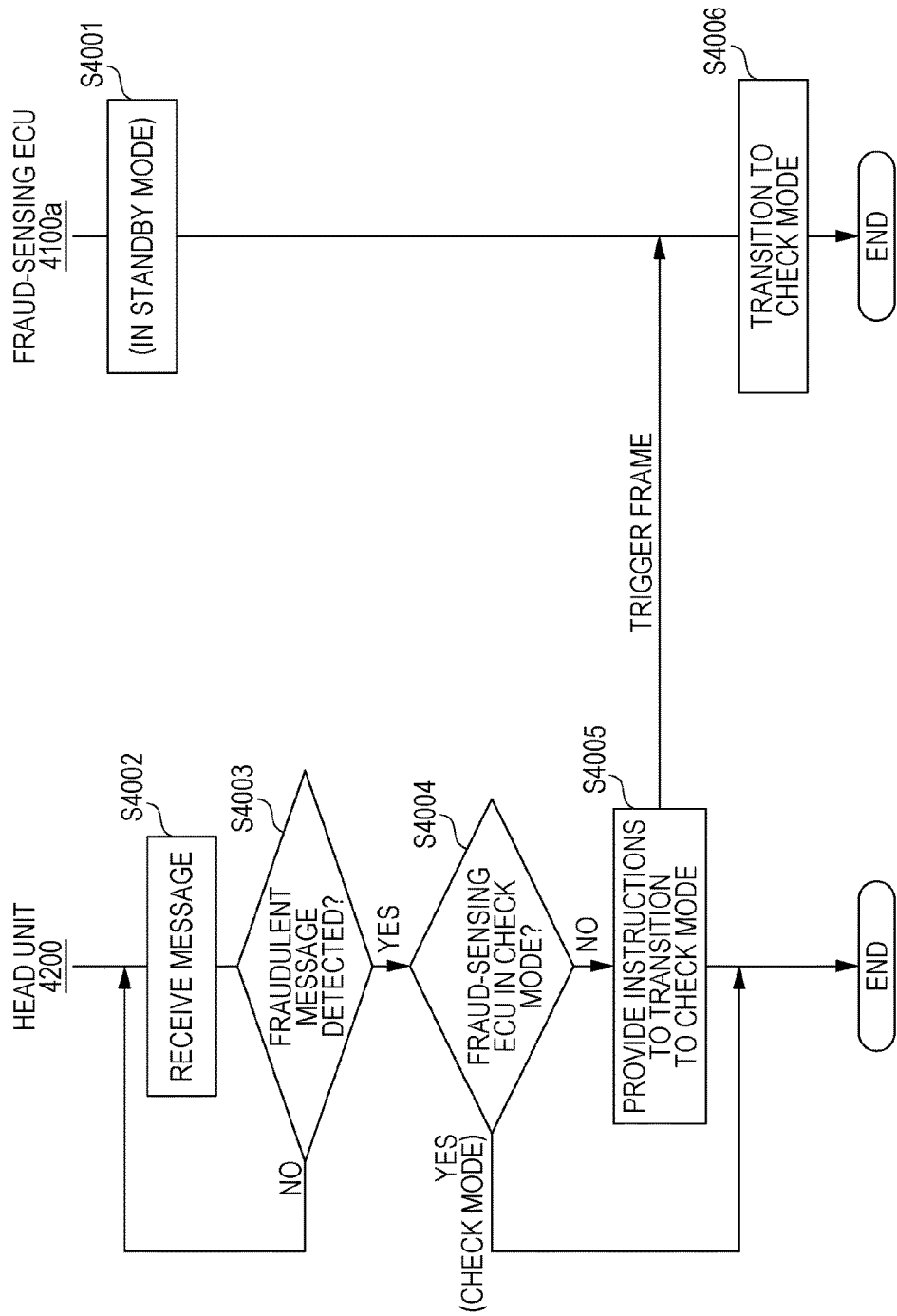
FIG. 37 is a diagram illustrating an example of sequences for transition to a check mode in the fourth embodiment.

FIG. 37 is a sequence diagram illustrating an example operation in which the head unit 4200 senses a fraudulent message and instructs the fraud-sensing ECU 4100a to transition to the check mode, and the fraud-sensing ECU 4100a transitions to the check mode.

At the starting stage of this example operation, the fraud-sensing ECU 4100a has entered the standby mode (sequence S4001). For example, as a result of the fraud-sensing ECU 4100a having received a trigger frame that provides instructions to transition to the standby mode prior to this stage, the fraud-sensing ECU 4100a is in the standby mode. In the fraud-sensing ECU 4100a, in this case, the fraudulent frame sensing unit 130 is not sensing a fraudulent message.

The head unit 4200 receives a frame (message) transmitted on the bus 500c (sequence S4002).

The head unit 4200 checks whether the message received by the fraudulent frame detection unit 4280 is a fraudulent message or not (sequence S4003). If the message is not a fraudulent message, the process returns to the process procedure for receiving a message (sequence S4002).

Upon detecting that the received message is a fraudulent message, the head unit 4200 judges whether or not the operation mode of the fraud-sensing ECU 4100a is already the check mode, based on the previous history of instructions given to the fraud-sensing ECU 4100a (sequence S4004). For example, a fraudulent message may be transmitted from a fraudulent ECU connected to a bus. The head unit 4200 grasps the operation modes of the individual fraud-sensing ECUs by, for example, holding a history of instructions when instructing the fraud-sensing ECU 4100a and the like to transition to the check mode or to transition to the standby mode by using a trigger frame.

If it is judged that the operation mode of the fraud-sensing ECU 4100a is not the check mode (is the standby mode), the head unit 4200 provides instructions to transition to the check mode (sequence S4005). Specifically, the head unit 4200 transmits a trigger frame that provides instructions to transition to the check mode. If it is judged in sequence S4004 that the operation mode of the fraud-sensing ECU 4100a is already the check mode, the head unit 4200 skips the process procedure of providing instructions to transition to the check mode and ends the operation.

The trigger frame that provides instructions to transition to the check mode, which is transmitted from the head unit 4200 to the bus 500c, is transferred to the buses 500a and 500b through the gateway 300.

The fraud-sensing ECU 4100a receives the trigger frame transmitted to the bus 500a and transitions the operation mode to the check mode (sequence S4006). At this time, in the fraud-sensing ECU 4100a, the fraudulent frame sensing unit 130 initiates the sensing of a fraudulent message. That is, in the check mode, the fraud-sensing ECU 4100a is ready to implement an anti-fraud method for preventing any other node (ECU) from executing a process based on a fraudulent frame. Accordingly, as illustrated in the first embodiment, even if a fraudulent message is transmitted on a bus to which the fraud-sensing ECU 4100a is connected, a process according to the fraudulent message can be prevented from being performed (see FIG. 18).

While the description has focused here on the fraud-sensing ECU 4100a among the fraud-sensing ECUs, for example, the fraud-sensing ECU 4100b can also switch its operation mode to the check mode in response to the trigger frame transmitted in sequence S4005. In addition, the head unit 4200 may omit the judgment in sequence S4004 and provide instructions to transition to the check mode in sequence S4005. In a case where the judgment in sequence S4004 is omitted, the operation modes of the individual fraud-sensing ECUs may not necessarily be grasped and the holding of the history of instructions can be omitted. However, sequence S4004 is useful to block the flow of an unnecessary trigger frame into a bus.

Besides sequence S4003 given here, the transition to the check mode takes place, for example, when the communication start/end detection unit 4283 detects the start of communication with the outside or when the vehicle-use start detection unit 4282 detects the start of the use of the vehicle.

4.5 Sequence for Transition to Standby Mode (at End of Communication with Outside)

A description will now be given of the operation of the head unit 4200 and the fraud-sensing ECU 4100*a* in a case where the head unit 4200 completes communication with the outside.

Figure 38:
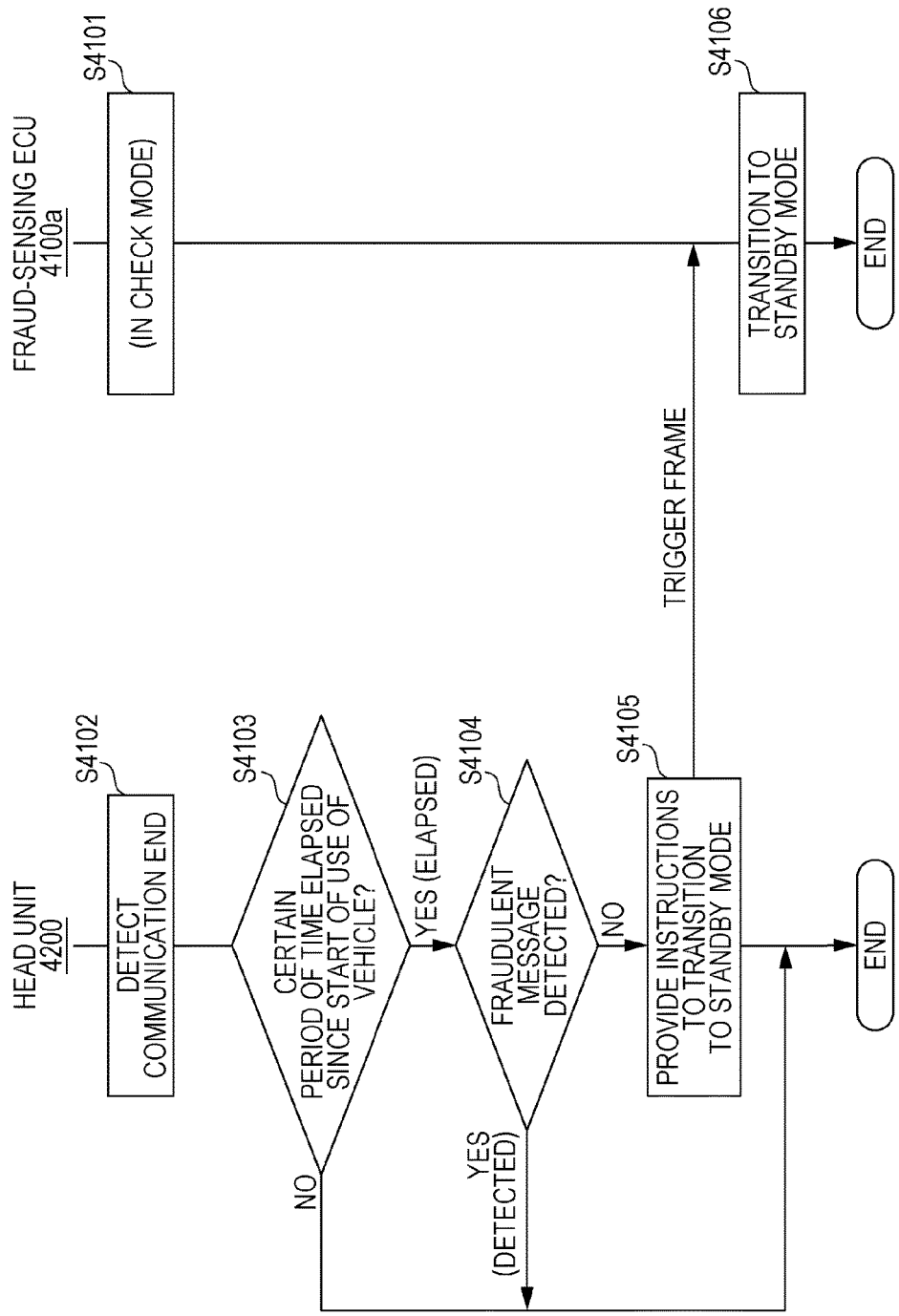
FIG. 38 is a diagram illustrating an example of sequences for transition to a standby mode in the fourth embodiment.

FIG. 38 is a sequence diagram illustrating an example operation in which the head unit 4200 senses the completion of communication with the outside and instructs the fraud-sensing ECU 4100*a* to transition to the standby mode, and the fraud-sensing ECU 4100*a* transitions to the standby mode.

At the starting stage of this example operation, the fraud-sensing ECU 4100*a* has entered the check mode (sequence S4101). For example, as a result of the fraud-sensing ECU 4100*a* having received a trigger frame that provides instructions to transition to the check mode, prior to this stage, when the head unit 4200 starts communication with the outside, the fraud-sensing ECU 4100*a* is in the check mode. In the fraud-sensing ECU 4100*a*, in this case, the fraudulent frame sensing unit 130 is ready to sense a fraudulent message.

When the communication start/end detection unit 4283 detects the completion of communication with the outside (sequence S4102), the head unit 4200 judges whether or not a certain period of time has elapsed since the start of the use of the vehicle (sequence S4103). If the certain period of time has not elapsed since the start of the use of the vehicle, a trigger frame that provides instructions to transition to the standby mode is not transmitted since the transition to the standby mode is not permitted (that is, sequences S4104 and S4105 are skipped).

If the certain period of time has elapsed since the start of the use of the vehicle, the head unit 4200 judges whether or not a fraudulent message has been detected (sequence S4104). If a fraudulent message has been detected after the transmission of a trigger frame that provides instructions to transition to the check mode, a trigger frame that provides instructions to transition to the standby mode is not transmitted since the transition to the standby mode is not permitted (that is, sequence S4105 is skipped).

If it is judged in sequence S4104 that no fraudulent message has been detected, the head unit 4200 provides instructions to transition to the standby mode (sequence S4105). Specifically, the head unit 4200 transmits a trigger frame that provides instructions to transition to the standby mode.

The trigger frame that provides instructions to transition to the standby mode, which is transmitted from the head unit 4200 to the bus 500*c*, is transferred to the buses 500*a* and 500*b* through the gateway 300.

The fraud-sensing ECU 4100*a* receives the trigger frame transmitted to the bus 500*a* and transitions the operation mode to the standby mode (sequence S4106). At this time, in the fraud-sensing ECU 4100*a*, the fraudulent frame sensing unit 130 stops sensing of a fraudulent message.

While the description has focused here on the fraud-sensing ECU 4100*a* among the fraud-sensing ECUs, for example, the fraud-sensing ECU 4100*b* can also switch its operation mode to the standby mode in response to the trigger frame transmitted in sequence S4105.

4.6 Sequence for Transition to Standby Mode (when Certain Period of Time has Elapsed Since Start of Use of Vehicle)

A description will now be given of the operation of the head unit 4200 and the fraud-sensing ECU 4100*a* in a case where a certain period of time has elapsed since the start of the use of the vehicle.

Figure 39:
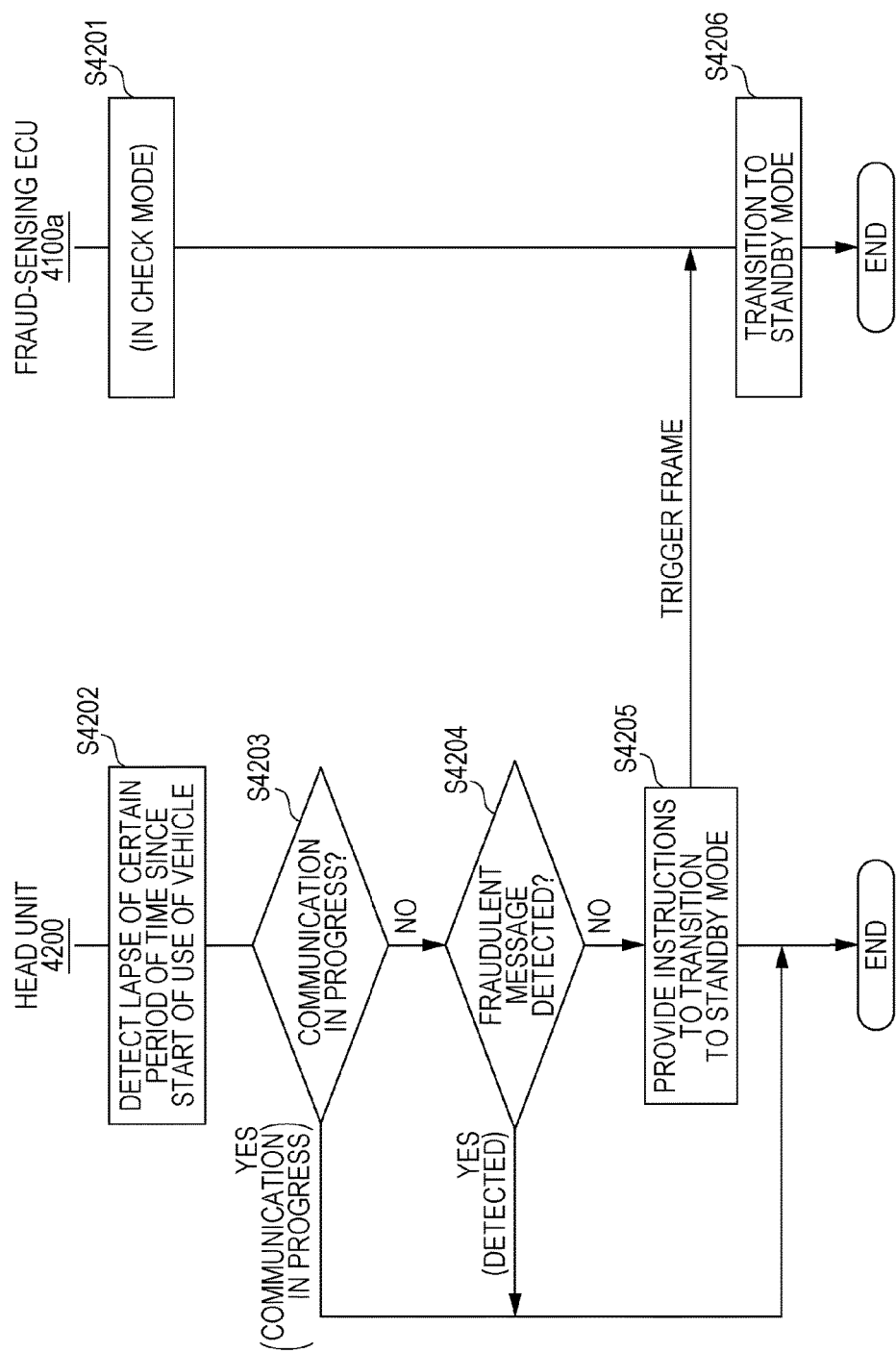
FIG. 39 is a diagram illustrating an example of sequences for transition to the standby mode in the fourth embodiment.

FIG. 39 is a sequence diagram illustrating an example operation in which the head unit 4200 senses the passage of a certain period of time after the start of the use of the vehicle and instructs the fraud-sensing ECU 4100*a* to transition to the standby mode, and the fraud-sensing ECU 4100*a* transitions to the standby mode.

At the starting stage of this example operation, the fraud-sensing ECU 4100*a* has entered the check mode (sequence S4201). For example, as a result of the fraud-sensing ECU 4100*a* having received a trigger frame that provides instructions to transition to the check mode, prior to this stage, when the head unit 4200 detects the start of the use of the vehicle, the fraud-sensing ECU 4100*a* is in the check mode. In the fraud-sensing ECU 4100*a*, in this case, the fraudulent frame sensing unit 130 is ready to sense a fraudulent message.

When the vehicle-use start detection unit 4282 detects that a certain period of time has elapsed since the start of the use of the vehicle (sequence S4202), the head unit 4200 judges whether or not communication with the outside is in progress (sequence S4203). If communication with the outside is in progress, a trigger frame that provides instructions to transition to the standby mode is not transmitted since the transition to the standby mode is not permitted (that is, sequences S4204 and S4205 are skipped).

If communication with the outside is not in progress, the head unit 4200 judges whether or not a fraudulent message has been detected (sequence S4204). If a fraudulent message has been detected after the transmission of a trigger frame that provides instructions to transition to the check mode, a trigger frame that provides instructions to transition to the standby mode is not transmitted since the transition to the standby mode is not permitted (that is, sequence S4205 is skipped).

If it is judged in sequence S4204 that no fraudulent message has been detected, the head unit 4200 provides instructions to transition to the standby mode (sequence S4205). Specifically, the head unit 4200 transmits a trigger frame that provides instructions to transition to the standby mode.

The trigger frame that provides instructions to transition to the standby mode, which is transmitted from the head unit 4200 to the bus 500*c*, is transferred to the buses 500*a* and 500*b* through the gateway 300.

The fraud-sensing ECU 4100*a* receives the trigger frame transmitted to the bus 500*a* and transitions the operation mode to the standby mode (sequence S4206). At this time, in the fraud-sensing ECU 4100*a*, the fraudulent frame sensing unit 130 stops sensing of a fraudulent message.

While the description has focused here on the fraud-sensing ECU 4100*a* among the fraud-sensing ECUs, for example, the fraud-sensing ECU 4100*b* can also switch its operation mode to the standby mode in response to the trigger frame transmitted in sequence S4205.

4.7 Advantageous Effects of Fourth Embodiment

In the in-vehicle network system 13, the fraud-sensing ECUs 4100*a* and 4100*b* switch their operation mode between a check mode in which a fraudulent message is sensed and a standby mode in which no fraudulent message is sensed, in accordance with the state of the vehicle. This allows the sensing of a fraudulent message to be performed only when necessary in accordance with the state of the vehicle, enabling a reduction in the amount of power consumption. In addition, the fraud-sensing ECUs 4100*a* and 4100*b* can obtain the timing for switching the operation mode in accordance with a trigger frame from the head unit 4200, without using a mechanism for directly sensing the state of the vehicle.

Other Embodiments

As described above, the first to fourth embodiments have been described as illustrative examples of the technique according to the present disclosure. However, the technique according to the present disclosure is not limited to these embodiments and is also applicable to embodiments in which modifications, replacements, additions, omissions, and others are made as desired. For example, the following modifications are also included in embodiments of the present disclosure.

(1) While the embodiments described above provide an example in which frames are periodically transmitted from the ECUs 400a to 400d or the ECUs 3400a to 3400d, each frame may be transmitted as an event that provides notification of a state change. For example, each ECU may transmit a frame only when the open or closed state for the door is changed, rather than periodically transmitting the open or closed state for the door. Alternatively, each ECU may periodically transmit a frame and also transmit a frame when a state change occurs.

(2) While the third embodiment provides an example in which a MAC is calculated based on a data value and a counter value, a MAC may be calculated based on only a data value. Alternatively, a MAC may be calculated based on only a counter value. Furthermore, the size of the MAC included in a frame is not limited to 4 bytes and may be different from one transmission to another. Likewise, the size of the data value, such as the average speed per hour, and the size of the counter value are also not limited to 1 byte. In addition, each frame may not necessarily include a counter value.

(3) While the third embodiment provides an example in which a counter value is incremented for each transmission, the counter value may be a value that is incremented automatically with time. Alternatively, the value of the point in time itself may be used instead of that of a counter. That is, generation of a MAC based on a variable changing each time a data frame is transmitted (such as a counter or a point in time) can make fraudulent interpretation of the MAC difficult. In the third embodiment, furthermore, the MAC generation unit 3170 in a fraud-sensing ECU calculates a MAC value by using a message ID, the first 1 byte in the data field, and a counter value in the counter holding unit 3190. Instead of this, a MAC value may be calculated by using a message ID, the first 1 byte in the data field, and a counter value that is the following 1 byte in the data field. In addition, a counter value in the counter holding unit 3190 may be updated so as to match the counter value in a data field determined not to be fraudulent.

(4) In the embodiments described above, a data frame in the CAN protocol is configured in the standard ID format. The data frame may be in an extended ID format. In the extended ID format, an ID (message ID) is expressed in 29 bits in which the base ID at the ID position in the standard ID format and an ID extension are combined. This 29-bit ID may be handled as an ID (message ID) in the embodiments described above.

(5) In the embodiments described above, HMAC is used as a MAC calculation algorithm. Alternatively, CBC-MAC (Cipher Block Chaining Message Authentication Code) or CMAC (Cipher-based MAC) may be used. In addition, padding used in MAC computation may be any type of padding in which the data size of a block is necessary for computation, such as zero padding or that in ISO10126, PKCS#1, PKCS#5, or PKCS#7. Furthermore, also in the method of changing the size to that of a block such as 4 bytes, padding may be provided either at the beginning, end, or in the middle. Furthermore, data used for MAC calculation may not necessarily be data that is consecutive (for example, continuous data of 4 bytes), but may be a composite one configured through bit-by-bit collection in accordance with a specific rule.

(6) The CAN protocol illustrated in the embodiments described above may have a broad meaning including its derivative protocols, such as TTCAN (Time-Triggered CAN) and CAN FD (CAN with Flexible Data Rate).

(7) While the embodiments described above provide an example in which a fraudulent ECU is connected to a bus, existing ECUs such as the ECUs 400a to 400d or the ECUs 3400a to 3400d may act as fraudulent ECUs for some reason. Even in this case, as illustrated in the embodiments described above, a fraud-sensing ECU appropriately senses a fraudulent frame and transmits an error frame, and can thus prevent any other ECU from processing the fraudulent frame.

(8) In the second embodiment, a data range list in which message IDs and allowed data ranges are associated with each other is used for determination of whether or not a fraud has occurred based on whether or not data of a received data frame is included in a data range allowed for each message ID. Alternatively, a data range (for example, "0 to 180") allowed in common for any message ID may be defined without any message ID being included in the data range list, and determination of whether or not a fraud has occurred may be performed regardless of the message ID. In addition, a data range list held in a fraud-sensing ECU may be configured such that message IDs that may be transmitted on a bus to which the fraud-sensing ECU is connected are associated with data ranges. Accordingly, the data range list can also be used as the authorized-ID list illustrated in the first embodiment. Using this, a fraud-sensing ECU illustrated in the second embodiment may also check (sequence S1004) a message ID illustrated in the first embodiment.

(9) Instead of a data range list illustrated in the second embodiment in which message IDs and allowed data ranges are associated with each other, a data length list in which message IDs and allowed data lengths are associated may be used by a fraud-sensing ECU. In this case, the fraud-sensing ECU determines whether or not the value of the control field in a received data frame meets a predetermined condition indicating a fraud. The predetermined condition indicating a fraud is a condition in which the data length (DLC) in the control field is not a data length associated with a message ID in the data length list. The fraud-sensing ECU determines whether or not a fraud has occurred based on whether or not the received DCL is a data length allowed for each message ID in the data length list.

(10) While the embodiments described above focus in particular on a data frame, it is also possible for a fraud-sensing ECU to sense a certain fraud in a remote frame. For example, the fraud-sensing ECU may determine whether the message ID in a received remote frame is fraudulent or not by using the authorized-ID list illustrated in the first embodiment. Alternatively, the fraud-sensing ECU may determine whether or not a fraud has occurred on the basis of whether or not the data length (DLC) in the control field in a received remote frame is a data length allowed for each message ID by using the data length list described above. In addition, an error frame transmitted when a fraud-sensing ECU illustrated in the embodiments described above senses a fraud upon receiving a fraudulent frame is desirably transmitted rapidly after the sensing of the fraud. It is useful that a fraud-sensing ECU transmit an error frame, after the sensing of a fraud, before the end of the CRC sequence in the fraudulent frame is transmitted. Accordingly, any other ECU detects an error frame or detects an error by checking a CRC, and aborts processing of the fraudulent frame. Similarly to the data frame, the remote frame also includes a message ID, a control field, and a CRC sequence.

(11) In the embodiments described above, a fraud-sensing ECU transmits an error display message under a certain condition. Alternatively, no error display message may be transmitted. In this case, ECUs such as a gateway and a head unit do not need to hold a configuration (such as a reception-ID list for receiving an error display message) corresponding to that of a fraud-sensing ECU, in particular. A fraud-sensing ECU may provide an error notification instead of transmitting an error display message in a case where the fraud-sensing ECU includes a speaker, a display, or the like, or may record a log of an error on a storage medium or the like.

(12) The in-vehicle network system 13 illustrated in the fourth embodiment may include both a fraud-sensing ECU capable of switching an operation mode and a fraud-sensing ECU configured not to switch an operation mode (that is, a fraud-sensing ECU similar to that which is always in the check mode). In addition, besides a function of sensing a fraudulent message transmitted on a bus, similarly to any other ECU, a fraud-sensing ECU may have a function of performing a predetermined process in accordance with a message that is not fraudulent or a function of performing a process such as sensing the state of the vehicle or controlling the vehicle. When the operation mode is a standby mode in which specific fraud sensing is not performed, the effects such as reduced processing load on a fraud-sensing ECU and reduced traffic on a bus, as well as reduced power consumption, can also be achieved.

Figure 40:
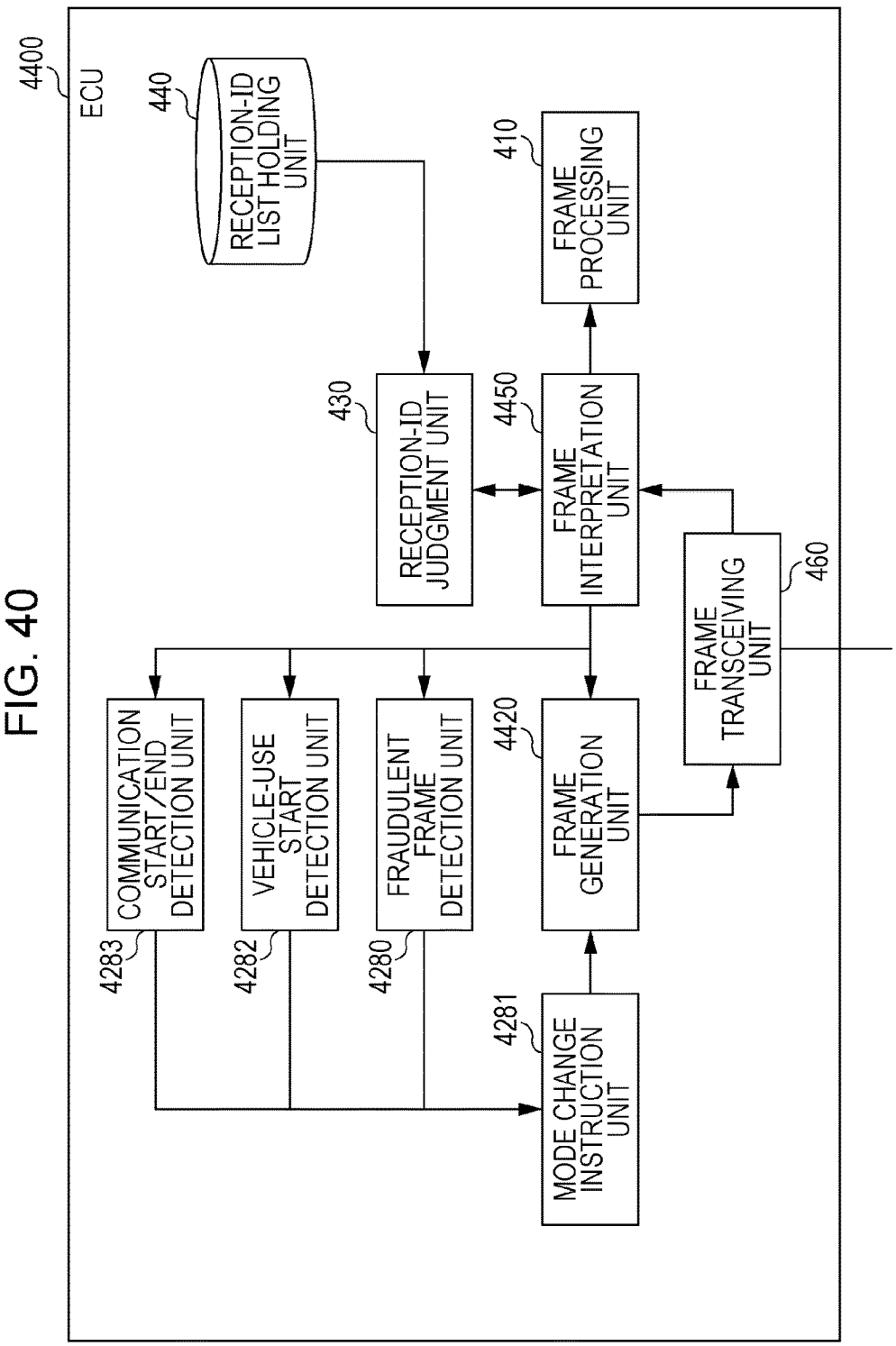
FIG. 40 is a configuration diagram of an ECU according to another embodiment.

(13) In the fourth embodiment, the head unit 4200 has a function of transmitting a trigger frame when the state of the vehicle satisfies a certain condition. Alternatively, any other ECU may have this function. The function of transmitting a trigger frame when the state of the vehicle satisfies a certain state may be included in a single ECU or a plurality of ECUs (either all the ECUs or some ECUs) in the in-vehicle network system 13. That is, the fraudulent frame detection unit 4280, the mode change instruction unit 4281, the vehicle-use start detection unit 4282, and the communication start/end detection unit 4283 of the head unit 4200 illustrated in the fourth embodiment may be included in any other ECU (such as the ECU 400a). FIG. 40 is a configuration diagram of an ECU 4400 that is constructed by partially modifying the ECU 400a and that is configured to include the fraudulent frame detection unit 4280, the mode change instruction unit 4281, the vehicle-use start detection unit 4282, and the communication start/end detection unit 4283. A frame interpretation unit 4450 in the ECU 4400 illustrated in FIG. 40 is obtained by partially modifying the frame interpretation unit 450 illustrated in the first embodiment. In addition to transferring data to the frame processing unit 410, a frame generation unit 4420, and the reception-ID judgment unit 430, the frame interpretation unit 4450 also transfers a received frame to the fraudulent frame detection unit 4280, the vehicle-use start detection unit 4282, and the communication start/end detection unit 4283. This transfer operation may involve transferring all the received frames or transferring only a frame associated with each detection unit. The fraudulent frame detection unit 4280 performs the same operation as that of the fraudulent frame detection unit 4280 in the fourth embodiment. The vehicle-use start detection unit 4282 and the communication start/end detection unit 4283 detect the start of the use of the vehicle body, the start of communication, the completion of communication, and so forth from frames received by the ECU 4400. For example, the head unit 4200 or an ECU having a function of communicating with the outside may transmit a frame that provides notification of the start or end of communication, and the communication start/end detection unit 4283 may detect the start of communication or the completion of communication in response to the receipt of the frame. The mode change instruction unit 4281 has a function similar to that in the fourth embodiment. The frame generation unit 4420 has a function corresponding to that of the frame generation unit 420 in the first embodiment. The frame generation unit 4420 further has a function of forming a trigger frame in accordance with a request for transmitting a trigger frame from the mode change instruction unit 4281 to change the mode and of notifying the frame transceiving unit 270 of the trigger frame for transmission. The ECU 4400 executes a process procedure similar to the process procedure illustrated in sequences S4002 to S4005 in FIG. 37, the process procedure illustrated in sequences S4102 to S4105 in FIG. 38, and the process procedure illustrated in sequences S4202 to S4205 in FIG. 39. The function of transmitting a trigger frame when the state of the vehicle satisfies a certain state may be included in a fraud-sensing ECU.

(14) The judgment of whether or not to provide instructions to transition to the standby mode (see FIG. 38 and FIG. 39), which is performed by the head unit 4200 illustrated in the fourth embodiment, is merely an example of useful judgment, and any other judgment can be performed. For example, instructions may be provided to transition to the standby mode simply when the end of communication is detected, or instructions may be provided to transition to the standby mode if a predetermined period of time has elapsed since the start of the use of the vehicle. This predetermined period of time may be a certain period of time such as several minutes, or may be a period of time required until a certain number of messages are transmitted on a bus after the use of the vehicle has been started, or a period of time required until a certain process procedure is executed after the use of the vehicle has been started. Alternatively, instructions may be provided to transition to the standby mode simply when no fraudulent message is sensed on a bus within a certain period. That is, in order to change the operation mode of a fraud-sensing ECU to the check mode or the standby mode in accordance with the state of the vehicle, any judgment method (such as a judgment algorithm) may be used based on any basis for judgment if it is useful, for example, experimentally or theoretically. For example, the head unit 4200 may not necessarily include both the vehicle-use start detection unit 4282 and the communication start/end detection unit 4283 but may include either of them, or may include a detection unit for detecting any other state of the vehicle. Examples of the detection unit may include a detection unit that detects whether the vehicle is parked, a detection unit that detects whether the vehicle is stopped, a detection unit that detects opening or closing of doors, a detection unit that detects opening or closing of a fuel tank cap, a detection unit that detects whether the vehicle is being charged, a detection unit that detects whether the vehicle is moving, a detection unit that detects whether passengers are sitting in the seats, a detection unit that detects whether passengers are entering the vehicle, a detection unit that detects whether passengers have entered the vehicle, and a detection unit that detects whether passengers are exiting the vehicle. It is sufficient that the in-vehicle network system be configured to switch, upon detecting that the state of the vehicle satisfies a certain condition, the operation mode of a fraud-sensing ECU between a first mode (check mode) in which a predetermined type of sensing process for sensing a fraudulent message in a bus is performed and a second mode (such as a standby mode) in which this type of sensing process is not performed. Instead of a method in which the process of sensing a fraudulent message is not completely performed in the second mode, a method may be adopted in which this predetermined type of sensing process is not performed in the second mode but a certain kind of fraudulent-message sensing process with a smaller amount of processing than that of the predetermined type of sensing process is performed in the second mode. Alternatively, the head unit 4200 may be provided with a button for changing the operation mode of a fraud-sensing ECU or any other user interface, and may instruct the fraud-sensing ECU to change the operation mode in accordance with the user operation, input, or the like on the user interface. Examples of the user interface may include a physical button, a button displayed on a touch panel or the like, and an audio input mechanism. When a change in the state of the vehicle is detected by a detection unit such as the vehicle-use start detection unit 4282 or the communication start/end detection unit 4283, the user may be inquired whether or not the change of the operation mode is needed via screen display, audio output, or the like. Upon acceptance of a response input from the user regarding the need for the change of the operation mode, the head unit 4200 may instruct the fraud-sensing ECU to change the operation mode if the input indicates the need for switching the operation mode. For example, the head unit 4200 may inquire of the user whether to transition to the standby mode or not after a certain period of time has elapsed since the start of the use of the vehicle, and the user may select the continuation of the check mode in response to the inquiry. Alternatively, the head unit 4200 may simply notify the fraud-sensing ECU 4100a and the like of only information on events such as the start of the use of the vehicle, the start of communication, and the end of communication, and the fraud-sensing ECU 4100a and the like may judge to which operation mode the transition is to lead.

Figure 41:
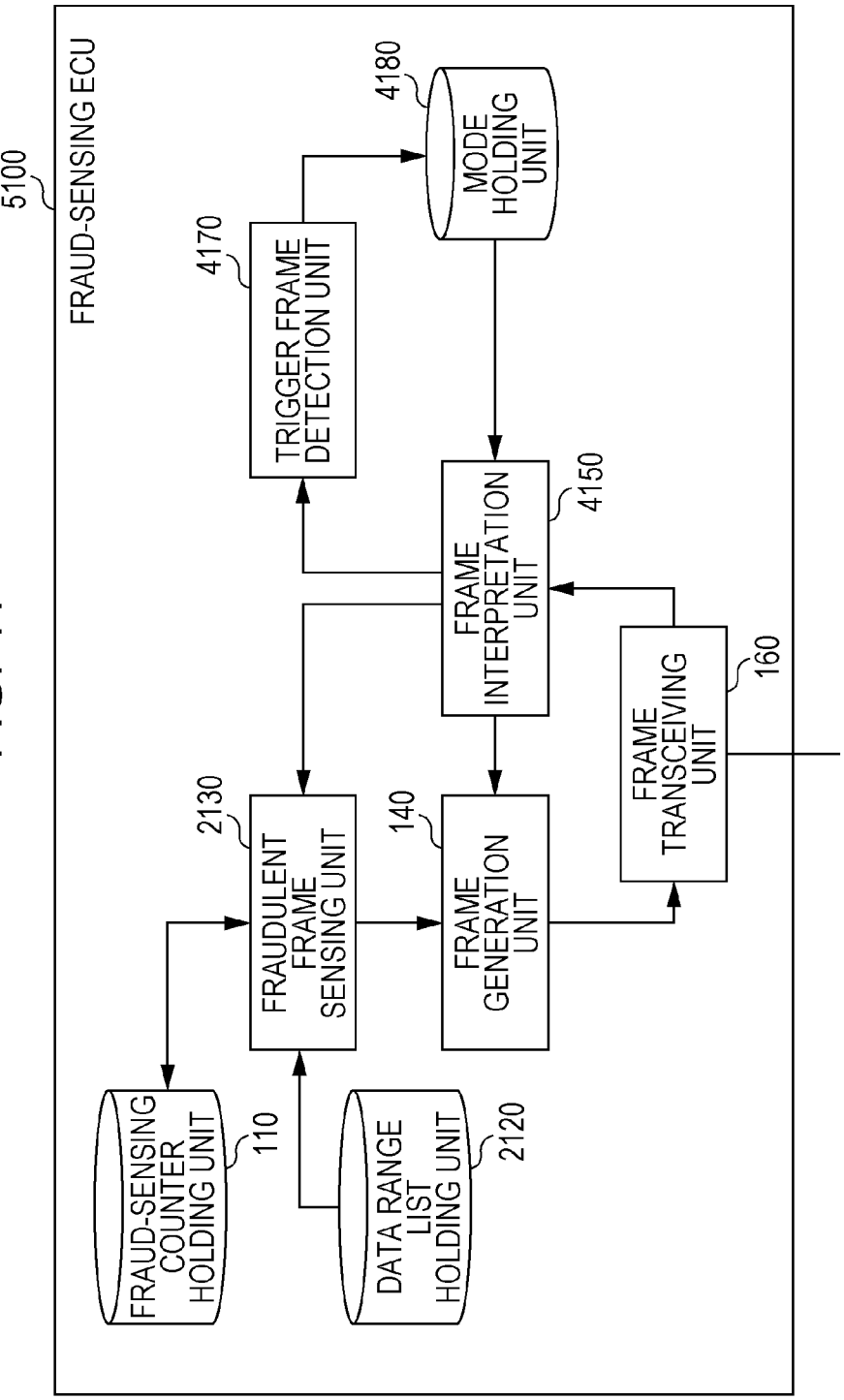
FIG. 41 is a configuration diagram of a fraud-sensing ECU according to another embodiment.
Figure 42:
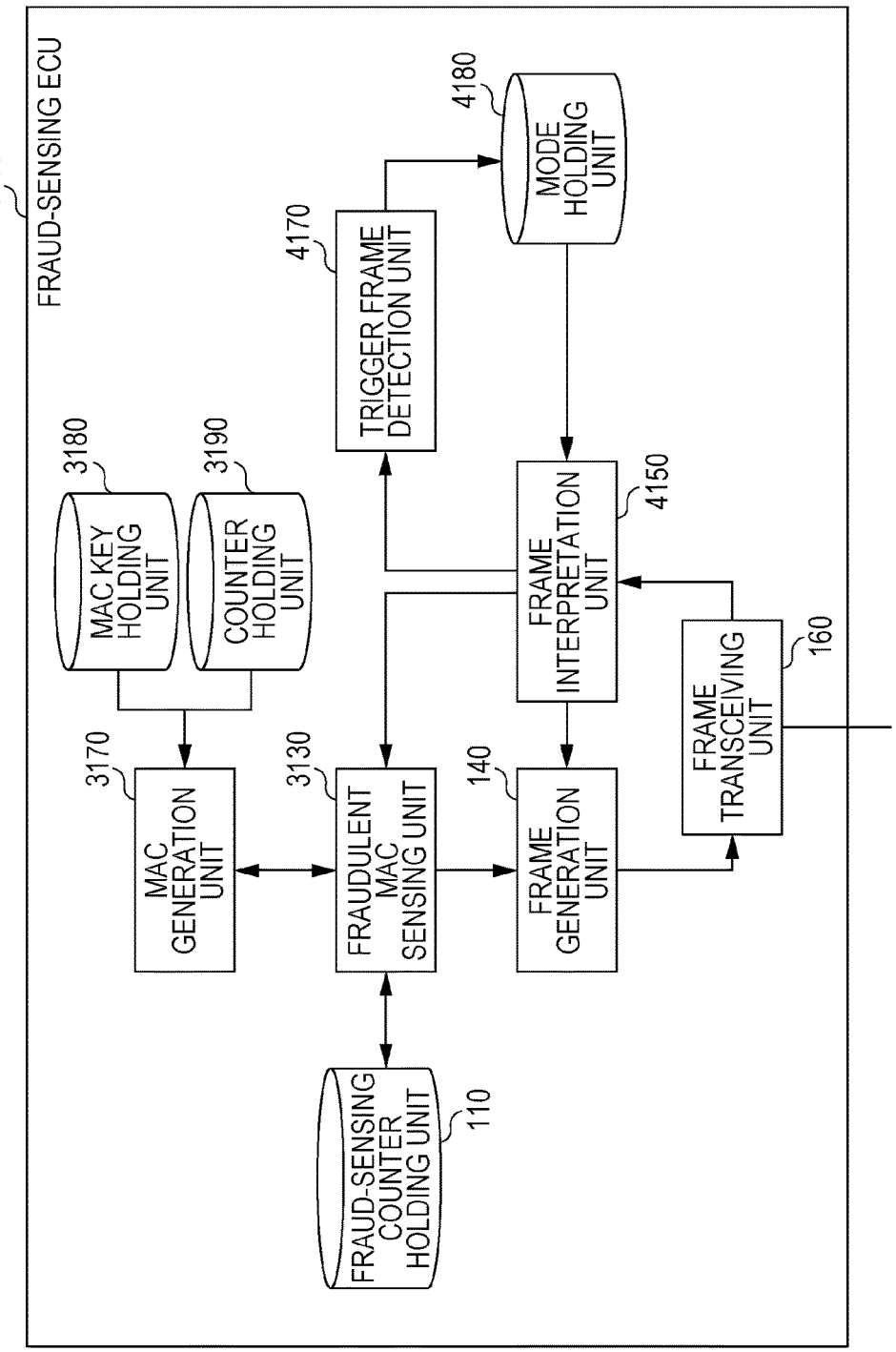
FIG. 42 is a configuration diagram of a fraud-sensing ECU according to another embodiment.

(15) While the fraud-sensing ECU 4100a illustrated in the fourth embodiment includes the function of the fraud-sensing ECU 100a in the first embodiment, a specific implementation of an anti-fraud method performed by a fraud-sensing ECU may be that illustrated in Embodiments 2 and 3. That is, the respective fraud-sensing ECUs (such as the fraud-sensing ECU 4100a) in the in-vehicle network system 13 may each be implemented as, for example, a fraud-sensing ECU 5100 illustrated in FIG. 41, which includes the function of the fraud-sensing ECU 2100a in the second embodiment. Alternatively, the fraud-sensing ECU 4100a and the like may each be implemented as a fraud-sensing ECU 6100 illustrated in FIG. 42, which includes the function of the fraud-sensing ECU 3100a in the third embodiment. Similarly to the fraud-sensing ECU 4100a, each of the fraud-sensing ECU 5100 illustrated in FIG. 41 and the fraud-sensing ECU 6100 illustrated in FIG. 42 includes the frame interpretation unit 4150, the trigger frame detection unit 4170, and the mode holding unit 4180. Alternatively, the fraud-sensing ECU 4100a may be configured to be capable of switching between and executing two or more of the fraud sensing process procedures illustrated in Embodiments 1 to 3. For example, a fraud-sensing ECU may switch its operation mode between the fraud sensing process procedure illustrated in the second embodiment or 3, which involves a relatively large amount of processing, and the fraud sensing process procedure illustrated in the first embodiment, which involves a relatively small amount of processing, in order to sense a fraudulent message. In this case, the operation mode is switched between, for example, a first mode in which a sensing process with a relatively large amount of processing is performed and a second mode in which the sensing process with a relatively large amount of processing is not performed but a sensing process with a relatively small amount of processing is performed.

(16) The fraudulent frame sensing unit and the fraudulent MAC sensing unit illustrated in the embodiments described above may be implemented by hardware called a CAN controller or by firmware running on a processor that operates when connected to the CAN controller. In addition, the MAC key holding unit, the counter holding unit, the authorized-ID list holding unit, and the data range list holding unit may be stored in a register of hardware called a CAN controller or in firmware running on a processor that operates when connected to the CAN controller.

(17) The individual ECUs (including a gateway and a head unit) in the embodiments described above are each assumed to be a device including, for example, digital circuits such as a processor and a memory, analog circuits, a communication circuit, and so forth, but may include other hardware components such as a hard disk drive, a display, a keyboard, and a mouse. In addition, instead of a control program stored in a memory being executed by a processor to implement functions in software, the functions may be implemented by dedicated hardware (such as a digital circuit).

(18) Some or all of the constituent elements included in each device in the embodiments described above may be constituted by a single system LSI (Large Scale Integration). The system LSI is a super-multifunctional LSI manufactured by integrating a plurality of configuration units on one chip, and is specifically a computer system configured to include a microprocessor, a ROM, a RAM, and so forth. The RAM has recorded thereon a computer program. The microprocessor operates in accordance with the computer program, thereby allowing the system LSI to achieve its function. In addition, constituent units included in each device may be integrated into individual chips or into a single chip that includes some or all of the units. While the system LSI is used here, an integrated circuit may also be referred to as an IC, an LSI, a super LSI, or an ultra LSI depending on the difference in the degree of integration. In addition, a technique for forming an integrated circuit is not limited to the LSI, and may be implemented by using a dedicated circuit or a general-purpose processor. FPGA (Field Programmable Gate Array) that can be programmed after the manufacture of the LSI or a reconfigurable processor capable of reconfiguring connection or setting of circuit cells in the LSI may be used. Additionally, if a technique for forming an integrated circuit is introduced in place of the LSI along with development in semiconductor technology or other derivative technology, it is a matter of course that the technique may be used for the integration of functional blocks. One potential approach is to apply biotechnology, for example.

(19) Some or all of the constituent elements included in each of the devices described above may be constituted by an IC card removably set in each device or a stand-alone module. The IC card or the module is a computer system constituted by a microprocessor, a ROM, a RAM, and so forth. The IC card or the module may include the super-multifunctional LSI described above. The microprocessor operates in accordance with a computer program, thereby allowing the IC card or the module to achieve its function. This IC card or module may be tamper-resistant.

(20) An aspect of the present disclosure may provide a method such as the fraud sensing method or anti-fraud method described above. An aspect of the present disclosure may also provide a computer program for implementing these methods by using a computer, or a digital signal including the computer program. In an aspect of the present disclosure, furthermore, the computer program or the digital signal may be recorded on a computer-readable recording medium such as a flexible disk, a hard disk, a CD-ROM, an MO, a DVD, a DVD-ROM, a DVD-RAM, a BD (Blu-ray (registered trademark) Disc), or a semiconductor memory. An aspect of the present disclosure may also provide the digital signal recorded on such recording media. In an aspect of the present disclosure, furthermore, the computer program or the digital signal may be transmitted via a telecommunication line, a wireless or wired communication line, a network represented by the Internet, data broadcasting, or the like. A further aspect of the present disclosure may provide a computer system including a microprocessor and a memory, in which the memory has recorded thereon the computer program described above and the microprocessor operates in accordance with the computer program. Moreover, the program or the digital signal may be recorded on the recording medium and transported, or the program or the digital signal may be transported via the network or the like, so as to be performed by any other independent computer system.

(21) Embodiments achieved by any combination of constituent elements and functions illustrated in the embodiments described above and the modifications described above also fall within the scope of the present disclosure.

An embodiment of the present disclosure is applicable for use in efficient suppression of the influence of a fraudulent ECU in an in-vehicle network system.

What is claimed is:

1. A fraud message detecting method for use in an in-vehicle network system, the in-vehicle network system including a plurality of first electronic control units that communicate with each other via one or more buses, the fraud message detecting method comprising:
    detecting whether a state of a vehicle including the in-vehicle network system satisfies a first condition or a second condition; and
    switching an operation mode of a second electronic control unit connected to the one or more buses:
        from a first mode in which a first type of detecting process for detecting a fraudulent message in the one or more buses is performed to a second mode in which the first type of detecting process is not performed, upon detecting, in the detecting, that the state of the vehicle satisfies the first condition; and
        from the second mode to the first mode, upon detecting, in the detecting, that the state of the vehicle satisfies the second condition,
    wherein in the detecting, a third electronic control unit that is one of the plurality of first electronic control units and different than the second electronic control unit detects whether the state of the vehicle satisfies the first condition or the second condition, and
    in the switching, upon detecting whether the state of the vehicle satisfies the first condition or the second condition:
        the third electronic control unit transmits a switching instruction message to the second electronic control unit; and
        the second electronic control unit, to which the switching instruction message is transmitted, switches the operation mode.

2. The fraud message detecting method according to claim 1, wherein the plurality of first electronic control units and the second electronic control unit perform communication via the one or more buses in accordance with a Controller Area Network (CAN) protocol.

3. The fraud message detecting method according to claim 1,
    wherein the second condition is that the third electronic control unit has detected a fraudulent message in the one or more buses, and
    in the switching:
        upon detecting, in the detecting, that the state of the vehicle satisfies the second condition, the third electronic control unit transmits the switching instruction message to the second electronic control unit; and
        the second electronic control unit, to which the switching instruction message is transmitted, switches the operation mode to the first mode.

4. The fraud message detecting method according to claim 1,
    wherein the first condition is that the third electronic control unit has detected no fraudulent message in the one or more buses within a predetermined period, and
    in the switching;
        upon detecting, in the detecting, that the state of the vehicle satisfies the first condition, the third electronic control unit transmits the switching instruction message to the second electronic control unit; and
        the second electronic control unit, to which the switching instruction message is transmitted, switches the operation mode to the second mode.

5. The fraud message detecting method according to claim 1, wherein the second condition is that any of the plurality of first electronic control units becomes ready to start communication with a device outside the vehicle.

6. The fraud message detecting method according to claim 1, wherein the first condition is that any of the plurality of first electronic control units has completed communication with a device outside the vehicle and has entered a predetermined state.

7. The fraud message detecting method according to claim 1,
    wherein the one or more buses include a first bus and a second bus, a fourth electronic control unit that is one of the plurality of first electronic control units is connected to the first bus, and the second electronic control unit is connected to the second bus,
    the in-vehicle network system further includes a gateway device that transfers a message between the first bus and the second bus,
    in the detecting, the fourth electronic control unit detects whether the state of the vehicle satisfies the first condition or the second condition, and
    in the switching, the fourth electronic control unit transmits a switching instruction message to the gateway device, and the second electronic control unit, which has received the switching instruction message from the gateway device, switches the operation mode.

8. The fraud message detecting method according to claim 1,
wherein the second mode performs a second type of detecting process for detecting the fraudulent message in the one or more buses, and
an amount of power consumption is less for the second type of detecting process than for the first type of detecting process.

9. A fraud message detecting method for use in an in-vehicle network system, the in-vehicle network system including a plurality of first electronic control units that communicate with each other via one or more buses, the fraud message detecting method comprising:
detecting whether a state of a vehicle including the in-vehicle network system satisfies a first condition or a second condition; and
switching an operation mode of a second electronic control unit connected to the one or more buses:
from a first mode in which a first type of detecting process for detecting a fraudulent message in the one or more buses is performed to a second mode in which the first type of detecting process is not performed, upon detecting, in the detecting, that the state of the vehicle satisfies the first condition; and
from the second mode to the first mode, upon detecting, in the detecting, that the state of the vehicle satisfies the second condition,
wherein in the detecting, a third electronic control unit that is one of the plurality of first electronic control units and different than the second electronic control unit detects whether the state of the vehicle satisfies the first condition or the second condition,
in the switching, upon detecting whether the state of the vehicle satisfies the first condition or the second condition:
the third electronic control unit transmits a switching instruction message to the second electronic control unit; and
the second electronic control unit, to which the switching instruction message is transmitted, switches the operation mode, and the second condition is start of use of the vehicle.

10. The fraud message detecting method according to claim 9, wherein the detecting detects an activation of an engine included in the vehicle as the start of the use of the vehicle.

11. The fraud message detecting method according to claim 9,
wherein the second mode performs a second type of detecting process for detecting the fraudulent message in the one or more buses, and
an amount of power consumption is less for the second type of detecting process than for the first type of detecting process.

12. A fraud message detecting method for use in an in-vehicle network system, the in-vehicle network system including a plurality of first electronic control units that communicate with each other via one or more buses, the fraud message detecting method comprising:
detecting whether a state of a vehicle including the in-vehicle network system satisfies a first condition or a second condition;
switching an operation mode of a second electronic control unit connected to the one or more buses:
from a first mode in which a first type of detecting process for detecting a fraudulent message in the one or more buses is performed to a second mode in which the first type of detecting process is not performed, upon detecting, in the detecting, that the state of the vehicle satisfies the first condition; and
from the second mode to the first mode, upon detecting, in the detecting, that the state of the vehicle satisfies the second condition; and
further switching the operation mode of the second electronic control unit from the first mode to the second mode when a predetermined period of time has elapsed since a start of use of the vehicle,
wherein in the detecting, a third electronic control unit that is one of the plurality of first electronic control units and different than the second electronic control unit detects whether the state of the vehicle satisfies the first condition or the second condition, and
in the switching, upon detecting whether the state of the vehicle satisfies the first condition or the second condition:
the third electronic control unit transmits a switching instruction message to the second electronic control unit; and
the second electronic control unit, to which the switching instruction message is transmitted, switches the operation mode.

13. The fraud message detecting method according to claim 12,
wherein the second mode performs a second type of detecting process for detecting the fraudulent message in the one or more buses, and
an amount of power consumption is less for the second type of detecting process than for the first type of detecting process.

14. A fraud message detecting method for use in an in-vehicle network system, the in-vehicle network system including a plurality of first electronic control units that communicate with each other via one or more buses, the fraud message detecting method comprising:
detecting whether a state of a vehicle including the in-vehicle network system satisfies a first condition or a second condition; and
switching an operation mode of a second electronic control unit connected to the one or more buses:
from a first mode in which a first type of detecting process for detecting a fraudulent message in the one or more buses is performed to a second mode in which the first type of detecting process is not performed, upon detecting, in the detecting, that the state of the vehicle satisfies the first condition; and
from the second mode to the first mode, upon detecting, in the detecting, that the state of the vehicle satisfies the second condition,
wherein in the detecting, a third electronic control unit that is one of the plurality of first electronic control units and different than the second electronic control unit detects whether the state of the vehicle satisfies the first condition or the second condition,
in the switching, upon detecting whether the state of the vehicle satisfies the first condition or the second condition:
the third electronic control unit transmits a switching instruction message to the second electronic control unit; and
the second electronic control unit, to which the switching instruction message is transmitted, switches the operation mode, and the first condition or the second condition is that:
an input indicating that switching of the operation mode is necessary has been accepted through a predetermined user interface in response to a change in the state of the vehicle.

15. The fraud message detecting method according to claim 14,
wherein the second mode performs a second type of detecting process for detecting the fraudulent message in the one or more buses, and
an amount of power consumption is less for the second type of detecting process than for the first type of detecting process.

16. A fraud message detecting method for use in an in-vehicle network system, the in-vehicle network system including a plurality of first electronic control units that communicate with each other via one or more buses, the fraud message detecting method comprising:
detecting whether a state of a vehicle including the in-vehicle network system satisfies a first condition or a second condition; and
switching an operation mode of a second electronic control unit connected to the one or more buses:
from a first mode in which a first type of detecting process for detecting a fraudulent message in the one or more buses is performed to a second mode in which the first type of detecting process is not performed, upon detecting, in the detecting, that the state of the vehicle satisfies the first condition; and
from the second mode to the first mode, upon detecting, in the detecting, that the state of the vehicle satisfies the second condition,
wherein in the detecting, a third electronic control unit that is one of the plurality of first electronic control units and different than the second electronic control unit detects whether the state of the vehicle satisfies the first condition or the second condition,
in the switching, upon detecting whether the state of the vehicle satisfies the first condition or the second condition:
the third electronic control unit transmits a switching instruction message to the second electronic control unit; and
the second electronic control unit, to which the switching instruction message is transmitted, switches the operation mode, and
in the second mode, a second type of detecting process having a different degree to which a fraudulent message is detectible than the first type of detecting process is performed.

17. The fraud message detecting method according to claim 16,
an amount of power consumption is less for the second type of detecting process than for the first type of detecting process.

18. An in-vehicle network system, comprising:
a plurality of first electronic control units that communicate with each other via one or more buses;
a second electronic control unit connected to the one or more buses;
a third electronic control unit that is one of the plurality of first electronic control units, different than the second electronic control unit, and detects whether or not a state of a vehicle satisfies a predetermined condition; and the third electronic control unit that, upon detecting whether or not the state of the vehicle satisfies the predetermined condition, transmits a switching instruction message to the second electronic control unit,
wherein the switching instruction message, which is transmitted to the second electronic control unit, causes an operation mode of the second electronic control unit connected to the one or more buses to be switched between a first mode in which a detecting process for detecting a fraudulent message in the one or more buses is performed and a second mode in which the detecting process is not performed.

19. The in-vehicle network system according to claim 18,
wherein the second mode performs a second type of detecting process for detecting the fraudulent message in the one or more buses, and
an amount of power consumption is less for the second type of detecting process than for the first type of detecting process.

20. A fraud-detecting electronic control unit for connection to a plurality of first electronic control units via one or more buses, the fraud-detecting electronic control unit comprising:
one or more memories; and
circuitry which, in operation:
detects whether or not a state of a vehicle satisfies a first condition or a second condition; and
causes, upon detecting, in the detecting, whether or not the state of the vehicle satisfies the first condition or the second condition, an operation mode of the fraud-detecting electronic control unit to be switched from:
a first mode in which a detecting process for detecting a fraudulent message in the one or more buses is performed to a second mode in which the detecting process is not performed, upon detecting, in the detecting, that the state of the vehicle satisfies the first condition; and
from the second mode to the first mode, upon detecting, in the detecting, that the state of the vehicle satisfies the second condition,
wherein at least a part of the circuitry is included in a third electronic control unit, the third electronic control unit being one of the plurality of first electronic control units and different than the fraud-detecting electronic control unit and detecting whether or not the state of the vehicle satisfies the first condition or the second condition,
in the causing, upon detecting whether or not the state of the vehicle satisfies the first condition or the second condition:
the third electronic control unit transmits a switching instruction message to the fraud-detecting electronic control unit; and
the fraud-detecting electronic control unit, to which the switching instruction message is transmitted, switches the operation mode.

21. The fraud-detecting electronic control unit according to claim 20,
wherein the second mode performs a second type of detecting process for detecting the fraudulent message in the one or more buses, and
an amount of power consumption is less for the second type of detecting process than for the first type of detecting process.

* * * * *